(12) United States Patent
Fukushige et al.

(10) Patent No.: US 7,862,886 B2
(45) Date of Patent: Jan. 4, 2011

(54) OPTICAL FILM, ANTIREFLECTION FILM, PROCESSES FOR PRODUCING THE SAME, AND POLARIZING PLATE AND DISPLAY EMPLOYING THE SAME

(75) Inventors: Yuuichi Fukushige, Minami-Ashigara (JP); Masaki Noro, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 878 days.

(21) Appl. No.: 11/502,367

(22) Filed: Aug. 11, 2006

(65) Prior Publication Data
US 2007/0036965 A1 Feb. 15, 2007

(30) Foreign Application Priority Data
Aug. 12, 2005 (JP) ............... 2005-234520

(51) Int. Cl.
*B32B 7/00* (2006.01)
*B32B 33/00* (2006.01)
*B05D 5/06* (2006.01)

(52) U.S. Cl. ............... 428/313.9; 428/447; 427/163.1; 427/167

(58) Field of Classification Search ............... None
See application file for complete search history.

(56) References Cited

U.S. PATENT DOCUMENTS

| | | | | |
|---|---|---|---|---|
| 2,902,421 A * | 9/1959 | Norrish | ............... | 522/70 |
| 3,337,518 A * | 8/1967 | Serniuk et al. | ............... | 526/222 |
| 3,466,269 A * | 9/1969 | Fivel | ............... | 526/64 |
| 5,332,779 A * | 7/1994 | Mohri et al. | ............... | 524/790 |
| 5,414,093 A * | 5/1995 | Wolter | ............... | 549/214 |
| 5,496,683 A * | 3/1996 | Asano | ............... | 430/269 |
| 5,523,365 A * | 6/1996 | Geck et al. | ............... | 526/194 |

(Continued)

FOREIGN PATENT DOCUMENTS

JP 09-040909 A 2/1997

(Continued)

OTHER PUBLICATIONS

George Odian "Principles of Polymerization" third edition, John Wiley & Sons, Inc., 1991, two cover pages and pp. 222-223.*

*Primary Examiner*—Randy Gulakowski
*Assistant Examiner*—Robert Loewe
(74) *Attorney, Agent, or Firm*—Buchanan Ingersoll & Rooney PC

(57) ABSTRACT

An optical film comprising a substrate and a layer, the layer comprising a cured object of a composition which contains at least one of: a hydrolyzate of at least one organosilane compound having a directly silicon-bonded hydroxyl or hydrolyzable group; and a partial condensate of the hydrolyzate, and further contains a compound having a polymerization initiation site, and an antireflection film comprising a substrate and at least one layer including an antireflection layer, wherein at least one of the at least one layer is a layer formed by curing, with at least one of a light and a heat energy, a composition which contains at least one of: a hydrolyzate of at least one organosilane compound having a directly silicon-bonded hydroxyl or hydrolyzable group; and a partial condensate of the hydrolyzate, and further contains a compound having a polymerization initiation site.

21 Claims, 7 Drawing Sheets

U.S. PATENT DOCUMENTS

| | | | | |
|---|---|---|---|---|
| 6,132,861 | A * | 10/2000 | Kang et al. | 428/323 |
| 6,268,457 | B1 * | 7/2001 | Kennedy et al. | 528/39 |
| 6,299,799 | B1 * | 10/2001 | Craig et al. | 252/500 |
| 6,791,649 | B1 * | 9/2004 | Nakamura et al. | 349/137 |
| 6,824,879 | B2 * | 11/2004 | Baldwin et al. | 428/447 |
| 7,250,253 | B1 * | 7/2007 | Klapproth et al. | 435/6 |
| 7,507,521 | B2 * | 3/2009 | Flanigan et al. | 430/270.1 |
| 2002/0095018 | A1 * | 7/2002 | Baldwin et al. | 528/39 |
| 2004/0114248 | A1 * | 6/2004 | Hokazono et al. | 359/603 |
| 2005/0053790 | A1 * | 3/2005 | Kato | 428/421 |
| 2005/0227085 | A1 * | 10/2005 | Okada et al. | 428/419 |
| 2006/0147177 | A1 * | 7/2006 | Jing et al. | 385/147 |
| 2006/0147723 | A1 * | 7/2006 | Jing et al. | 428/421 |
| 2006/0269724 | A1 * | 11/2006 | Ohashi et al. | 428/143 |

FOREIGN PATENT DOCUMENTS

| | | |
|---|---|---|
| JP | 09-169847 A | 6/1997 |
| JP | 11-189621 A | 7/1999 |
| JP | 11-228631 A | 8/1999 |
| JP | 2000-313709 A | 11/2000 |

* cited by examiner

OPTICAL FILM, ANTIREFLECTION FILM, PROCESSES FOR PRODUCING THE SAME, AND POLARIZING PLATE AND DISPLAY EMPLOYING THE SAME

FIELD OF THE INVENTION

The present invention relates to an optical film, an antireflect film, processes for producing these, and a polarizing plate and a display each employing the antireflection film. More particularly, the invention relates to an antireflection film having sufficient antireflection performance and further improved marring resistance, a process by which this antireflection film can be produced at low cost, and a polarizing plate and a display each employing the antireflection film.

BACKGROUND OF THE INVENTION

In applications such as adhesives, exterior coating materials, bard coats, and antireflection films, investigations are being made on techniques in which organic materials/inorganic materials are compounded to thereby improve marring resistance, cured-object strength, adhesion to contacting materials, etc. Of these, with respect to combinations with an organic material of the polymerization curing type, attention is focused on alkoxysilanes having a polymerizable group and/or products of the hydrolysis and condensation thereof. For example, JP-A-9-169847 proposes use of a combination of a specific polyalkoxypolysiloxane and a polymerizable silane coupling agent. However, the reaction between the polyalkoxypolysiloxane and the polymerizable silane coupling agent is difficult to conduct sufficiently, resulting in a low content of polymerizable groups introduced. Because of this, the cured object obtained is insufficient in marring resistance and strength. In JP-A-9-40909 is reported a product of the partial co-hydrolysis/condensation of an alkoxysilane containing an organic functional group and a tetraalkoxysilane. However, the liquid has insufficient storability.

On the other hand, the antireflection films used in displays such as cathode ray tube displays (CRTs), plasma displays (PDPs), electroluminescent displays (ELDs), and liquid-crystal displays (LCDs) are disposed generally on the outermost surface of the display so as to reduce reflectance on the principle of optical interference in order to prevent the contrast decrease and image reflection in the display which are attributable to the reflection of external light.

Such an antireflection film can be produced by forming a high-refractive-index layer on a substrate and further forming thereon a low-refractive-index layer having an appropriate thickness. In order for a low-refractive-index layer to realize a low reflectance, it is desirable that the layer be made of a material having a refractive index as low as possible. Furthermore, since the antireflection film is disposed on the outermost surface of a display, it is required to have high marring resistance. In order for a thin film having a thickness of around 100 nm to have high marring resistance, the strength of the film itself and adhesion to the underlying layer are necessary.

Techniques for reducing the refractive index of a material include (1) to incorporate fluorine atoms and (2) to reduce the density (to incorporate voids). However, these techniques each impair film strength and adhesion and this tends to result in a decrease in marring resistance. To reconcile a low refractive index with high marring resistance has been a subject difficult to accomplish.

For example, JP-A-11-189621, JP-A-11-228631 and JP-A-2000-313709 describe a technique in which a polysiloxane structure is incorporated into a fluoropolymer to reduce the coefficient of friction of the coating film surface and thereby improve marring resistance. This technique is effective in some degree in improving marring resistance. However, even when this technique alone is applied to coating films intrinsically deficient in coating film strength and interfacial adhesion, sufficient marring resistance is not obtained.

One technique for heightening coating film strength is to incorporate an inorganic filler into a low-refractive-index layer. By using fine inorganic particles having a low refractive index as a filler, coating film strength can be heightened without increasing the refractive index of the layer itself. However, it is difficult to improve adhesion to the underlying layer by the incorporation of an inorganic filler, and marring resistance is still insufficient.

SUMMARY OF THE INVENTION

An object of the invention is to provide an optical film having further improved marring resistance and an antireflection film having sufficient antireflection performance and further improved marring resistance. Another object of the invention is to provide processes by which these films can be produced at low cost. Still another object of the invention is to provide a polarizing plate and a display each employing the antireflection film.

The present inventors made intensive investigations. As a result, they have found that when a hydrolyzate of an organosilane compound having a directly silicon-bonded hydroxyl or hydrolyzable group and/or a product of the partial condensation thereof is added to a hard coat layer or a low-refractive-index layer together with a hydrolyzate of an organosilane compound having a polymerization initiation site and/or a product of the partial condensation thereof, then marked effects are obtained, i.e., rapid curing and a resultant improvement in marring resistance. The invention has been thus achieved.

The invention provides the following.

1) An optical film comprising a substrate and a layer, the layer comprising a cured object (cured material) obtained by curing a composition which contains a hydrolyzate of at least one organosilane compound having a directly silicon-bonded hydroxyl or hydrolyzable group (hydroxyl or hydrolyzable group directly bonded to a silicon atom) and/or a product of the partial condensation thereof (partial condensate of the hydrolyzate) and further contains a compound having a polymerization initiation site.

2) An antireflection film comprising a substrate and one or more layers including an antireflection layer, wherein at least one of the layers is a layer formed by curing, with light and/or heat energy, a composition which contains a hydrolyzate of at least one organosilane compound having a directly silicon-bonded hydroxyl or hydrolyzable group and/or a product of the partial condensation thereof (partial condensate of the hydrolyzate) and further contains a compound having a polymerization initiation site.

3) The antireflection film as described under 2) above which comprises a transparent substrate, a hard coat layer and a low-refractive-index layer containing a binder polymer, wherein at least one of the hard coat layer and the low-refractive-index layer contains a hydrolyzate of an organosilane compound having a directly silicon-bonded hydroxyl or hydrolyzable group and/or a product of the partial condensation thereof (partial condensate of the hydrolyzate), and further contains a hydrolyzate of an organosilane compound having a polymerization initiation site and represented by the following formula (A) and/or a product of the partial condensation thereof (partial condensate of the hydrolyzate):

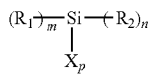
Formula (A)

(wherein $R_1$ represents a substituted or unsubstituted alkyl or aryl group having a polymerization initiation site; $R_2$ represents a substituted or unsubstituted alkyl group or a substituted or unsubstituted alkyl group having a polymerizable group having an unsaturated bond; X represents a hydroxyl group or a hydrolyzable group; and m, n, and p represent an integer of 1-3, an integer of 0-2, and an integer of 1-3, respectively, provided that the sum of m, n, and p is 4).

4) The antireflection film as described under 3) above wherein the low-refractive-index layer contains at least one inorganic filler selected from the group consisting of inorganic particles, hollow silica particles, and magnesium fluoride.

5) The antireflection film as described under 4) above wherein at least one of the inorganic particles and the hollow silica particles have been surface-treated with an organosilane compound represented by the formula (A) given in 3) above.

6) The antireflection film as described under any one of 3) to 5) above wherein the hard coat layer contains an inorganic filler comprising an oxide of at least one member selected from the group consisting of zirconium, titanium, aluminum, indium, zinc, tin, antimony, and silicon.

7) The antireflection film as described under any one of 3) to 6) above wherein the binder polymer of the low-refractive-index layer is a heat-cured and/or ionizing-radiation-cured fluoropolymer.

8) A process for producing the optical film as described under 1) above which includes a step in which a coating solution for forming the layer is applied to a transparent substrate by die coating.

9) A process for producing the antireflection film as described under any one of 2) to 7) above which includes a step in which a coating solution for forming the hard coat layer and a coating solution for forming the low-refractive-index layer are applied to a transparent substrate by die coating.

10) The process for optical film or antireflection film production as described under 8) or 9) above which has a step in which after the coating solution for hard-coat layer formation and the coating solution for low-refractive-index layer formation are applied to the transparent substrate by die coating, the resultant coating layer is irradiated with an ionizing radiation in an atmosphere having an oxygen concentration of 3% by volume or lower.

11) The process for optical film or antireflection film production as described under 8) or 9) above which has a step in which after the coating solution for hard-coat layer formation and the coating solution for low-refractive-index layer formation are applied to the transparent substrate by die coating, the resultant coating layer is heat-cured and then irradiated with an ionizing radiation in an atmosphere having an oxygen concentration of 3% by volume or lower.

12) A polarizing plate comprising a polarizing film and protective films which respectively protect both sides of the polarizing film, wherein at least one of the protective films comprises the antireflection film as described under any one of 2) to 7) above.

13) A display having the antireflection film as described under any one of 2) to 7) above or the polarizing plate as described under 12) above, wherein the antireflection film or the polarizing plate has been disposed so that the low-refractive-index layer faces the viewing side.

The following embodiments also are preferred in the invention.

14) The antireflection film as described under any one of 2) to 7) above wherein the hydrolyzate of an organosilane compound having a directly silicon-bonded hydroxyl or hydrolyzable group and/or the product of the partial condensation thereof is a hydrolyzate of an organosilane compound represented by the following formula (B) and/or a product of the partial condensation thereof.

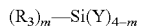
Formula (B)

(In the formula, $R_3$ represents a substituted or unsubstituted alkyl group or a substituted or unsubstituted aryl group; Y represents a hydroxyl group or a hydrolyzable group; and m represents an integer of 1-3.)

15) The antireflection film as described under 14) above wherein $R_3$ contains a polymerizable substituent.

16) The antireflection film as described under 15) above wherein the polymerizable substituent is a radical-polymerizable group.

17) The antireflection film as described under 16) above wherein the organosilane compound containing a polymerizable substituent is represented by the following formula (C).

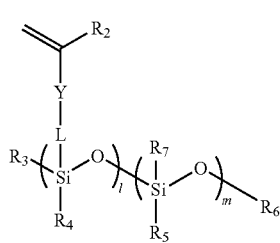
Formula (C)

In formula (C), $R_2$ represents a hydrogen atom, methyl, methoxy, alkoxycarbonyl group, cyano, fluorine atom, or chlorine atom. Examples of the alkoxycarbonyl group include methoxycarbonyl and ethoxycarbonyl. Preferred are a hydrogen atom, methyl, methoxy, methoxycarbonyl, cyano, fluorine atom, and chlorine atom. More preferred are a hydrogen atom, methyl, methoxycarbonyl, fluorine atom, and chlorine atom. Especially preferred are a hydrogen atom and methyl.

$R_3$ to $R_5$ each represent a halogen atom, hydroxyl, unsubstituted alkoxy group, or unsubstituted alkyl group. $R_3$ to $R_5$ each more preferably are a chlorine atom, hydroxyl, or unsubstituted alkoxy group having 1-6 carbon atoms, even more preferably are hydroxyl or an alkoxy group having 1-3 carbon atoms, and especially preferably are hydroxyl or methoxy.

$R_6$ represents a hydrogen atom or an alkyl group. $R_6$ preferably is a hydrogen atom or an alkyl group having 1-3 carbon atoms, and especially preferably is a hydrogen atom or methyl.

$R_7$ represents a substituted or unsubstituted alkyl group or a substituted or unsubstituted aryl group. The alkyl group is an alkyl group preferably having 1-30 carbon atoms, more preferably having 1-16 carbon atoms, especially preferably having 1-6 carbon atoms. Examples of the alkyl group include methyl, ethyl, propyl, isopropyl, hexyl, decyl, and hexadecyl. Examples of the aryl group include phenyl and naphthyl. The aryl group preferably is phenyl. The substituents which may be contained in $R_7$ are not particularly limited, and examples thereof include halogen atoms (e.g., fluorine, chlorine, and bromine), hydroxyl, mercapto, carboxyl, epoxy, alkyl groups (e.g., methyl, ethyl, isopropyl, propyl, and t-butyl), aryl groups (e.g., phenyl and naphthyl), aromatic heterocyclic groups (e.g., furyl, pyrazolyl, and pyridyl), alkoxy groups (e.g., methoxy, ethoxy, isopropoxy, and hexyloxy), aryloxy groups (e.g., phenoxy), alkylthio groups (e.g., methylthio and ethylthio), arylthio groups (e.g., phenylthio), alkenyl groups (e.g., vinyl and 1-propenyl), acyloxy groups (e.g., acetoxy, acryloyloxy, and methacryloyloxy), alkoxycarbonyl groups (e.g., methoxycarbonyl and ethoxycarbonyl), aryloxycarbonyl groups (e.g., phenoxycarbonyl), carbamoyl groups (e.g., carbamoyl, N-methylcarbamoyl, N,N-dimethylcarbamoyl, and N-methyl-N-octylcarbamoyl), and acylamino groups (e.g., acetylamino, benzoylamino, acryloylamino, and methacryloylamino). These substituents may be further substituted. Other preferred examples of the substituents include polymerizable functional groups other than vinyl-polymerizable groups, such as epoxy and isocyanate groups. The substituents in $R_7$ more preferably are hydroxyl or an unsubstituted allyl group, even more preferably are hydroxyl or an alkyl group having 1-3 carbon atoms, and especially preferably are hydroxyl or methyl.

Y represents a single bond, *—COO—**, *—CONH—**, or *—O—**. Preferred of these are a single bond, *—COO—**, and *—CONH—. More preferred are a single bond and —COO—. Especially preferred is —COO—**. Symbol * indicates the position in which Y is bonded to the =C($R_2$)—, while ** indicates the position in which Y is bonded to the L.

L represents a divalent connecting chain. Examples thereof include substituted or unsubstituted alkylene groups, substituted or unsubstituted arylene groups, substituted or unsubstituted alkylene groups having a connecting group (e.g., an ether, ester, or amide) in an inner part thereof, and substituted or unsubstituted arylene groups having a connecting group in an inner part thereof. Preferred of these are substituted or unsubstituted alkylene groups, substituted or unsubstituted arylene groups, and alkylene groups having a connecting group in an inner part thereof. More preferred are unsubstituted alkylene groups, unsubstituted arylene groups, and alkylene groups having a connecting ether or ester group in an inner part thereof. Especially preferred are unsubstituted alkylene groups and alkylene groups having a connecting ether or ester group in an inner part thereof. Examples of the substituents include halogens and hydroxyl, mercapto, carboxyl, epoxy, alkyl, and aryl groups. These substituents may be further substituted.

Symbol l represents a number satisfying the mathematical expression l=100−m. Symbol m represents a number of 0-50, more preferably 0-40, especially preferably 0-30. Numbers of m larger than 50 are undesirable because the liquid yields a solid matter therein, opacifies, or comes to have an impaired pot life, and because it is difficult to regulate molecular weight (molecular weight becomes high). In addition, since the content of polymerizable groups is low, improvements in performances (e.g., marring resistance of the antireflection film) through a polymerization treatment are less apt to be obtained.

18) The antireflection film as described under 4) above wherein the inorganic filler in the low-refractive-index layer has an average particle diameter of 0.001-0.2 μm.

19) The antireflection film as described under any one of 3) to 7) above wherein the hard coat layer comprises one or more layers and at least one layer thereof is an antiglare hard coat layer.

20) The antireflection film as described under 19) above which further has a hard coat layer having no antiglare properties as a layer underlying the antiglare hard coat layer.

21) The antireflection film as described under 19) or 20) above wherein the antiglare hard coat layer is constituted of a binder and matting particles having an average particle diameter of 1.0-10.0 μm and has a refractive index of 1.48-2.00.

22) The antireflection film as described under any one of 19) to 21) above wherein the antiglare hard coat layer contains a fluorochemical and/or silicone surfactant.

23) The antireflection film as described under any one of 3) to 7) above which has a haze of 3.0-50.0% and an average reflectance, as measured with light having wavelengths of 450-650 nm, of 2.2% or lower.

24) The antireflection film as described under any one of 3) to 7) above wherein the transparent substrate is triacetyl cellulose, poly(ethylene terephthalate), or poly(ethylene naphthalate).

25) The process for antireflection film production as described under 9) above which comprises continuously unwinding the transparent substrate in a roll form and applying the coating solution for hard-coat layer formation and the coating solution for low-refractive-index layer formation by die coating on one side of the transparent substrate unwound.

According to the invention, an optical film having further improved marring resistance and an antireflection film having sufficient antireflection performance and further improved marring resistance can be provided by using a hydrolyzate of an organosilane compound represented by formula (A) and/or a product of the partial condensation thereof in at least one of a hard coat layer and a low-refractive-index layer. Furthermore, a production process by which this antireflection film can be stably produced at low cost with high productivity is provided by the invention. A display can be further provided by the invention which employs the antireflection film or polarizing plate and is hence prevented from suffering external-light reflection or background reflection therein and which attains exceedingly high visibility.

DETAILED DESCRIPTION OF THE INVENTION

Figure 1:
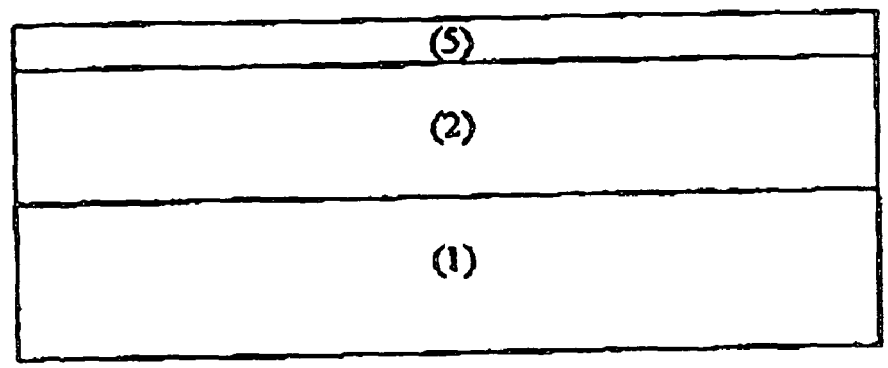
FIG. 1 is a diagrammatic sectional view schematically illustrating a preferred embodiment of the films of the invention
Figure 2:
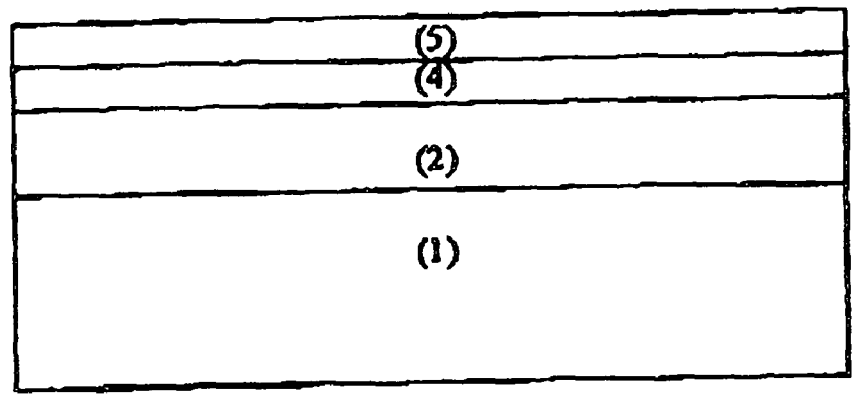
FIG. 2 is a diagrammatic sectional view schematically illustrating another preferred embodiment of the films of the invention.
Figure 3:
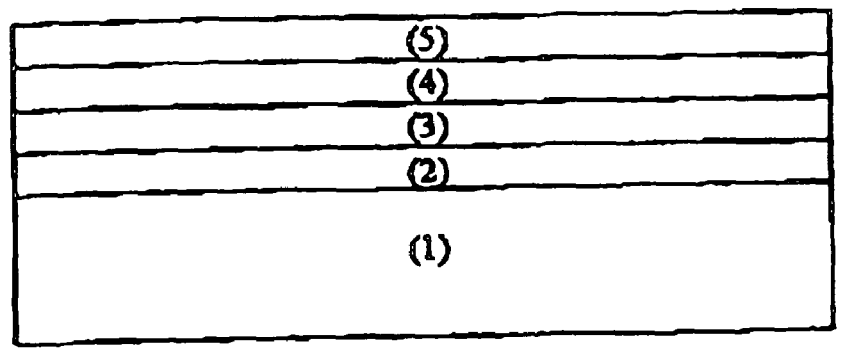
FIG. 3 is a diagrammatic sectional view schematically illustrating still another preferred embodiment of the films of the invention.
Figure 4:
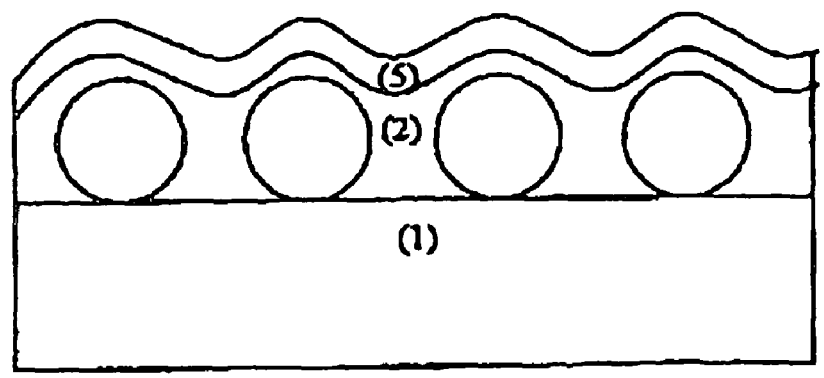
FIG. 4 is a diagrammatic sectional view schematically illustrating a further preferred embodiment of the films of the invention.
Figure 5:
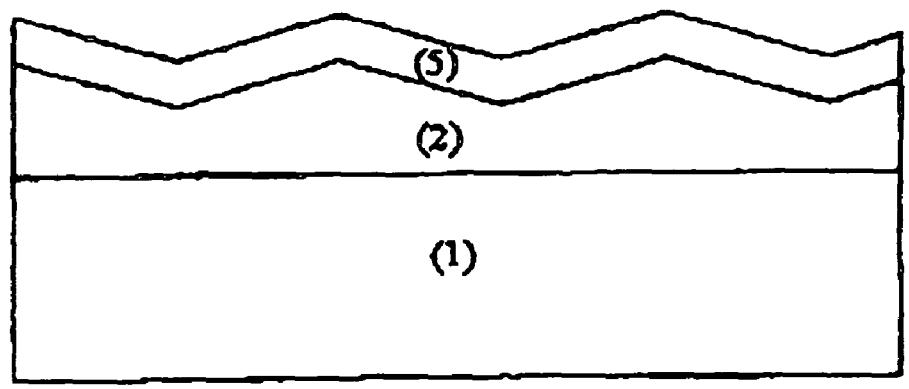
FIG. 5 is a diagrammatic sectional view schematically illustrating still a further preferred embodiment of the films of the invention.

The invention will be explained below in detail. In this specification, the expression "(numeral 1)-(numeral 2)" indicating a range of a property, etc. means "(numeral-1) or higher and (numeral 2) or lower".

[Optical Film]

The optical film is a member used for a display, and examples of the optical film are a diffusion sheet, a polarizing plate, a retardation film, a transparent conductive film and a near infrared ray-absorbing film. Especially, the optical film in which at least a hard coat layer (discussed below) is provided on a transparent support is preferably used, and more preferably, the optical film in which functional layer such as, e.g., an antistatic layer is provided is used.

[Layer Constitution of Antireflection Film]

The antireflection film of the invention may comprise a transparent substrate (hereinafter often referred to as base film), the hard coat layer formed thereover which will be described later, and an antireflection layer formed over the hard coat layer and comprising one or more layers superposed while taking account of refractive index, film thickness, number of layers, sequence of layer superposition, etc. so as to reduce reflectance by optical interference. The simplest constitution of the antireflection film is one obtained by forming a hard coat layer and a low-refractive-index layer only on a base film. For further reducing the reflectance, it is preferred to constitute an antireflection layer by forming a high-refractive-index layer having a higher refractive index than the base film in combination with a low-refractive-index layer having a lower refractive index than the base film. Constitution examples include: one comprising a base film, a hard coat layer formed thereon, and two layers, i.e., a high-refractive-index layer/low-refractive-index layer, formed on the hard coat layer; and one in which three layers differing in refractive index, i.e., a medium-refractive-index layer (layer having a refractive index higher than that of the base film or hard coat layer and lower than that of the high-refractive-index layer)/high-refractive-index layer/low-refractive-index layer, have been superposed in this order on a hard coat layer. Furthermore, one having a larger number of antireflection layers superposed has been proposed. Preferred of these from the standpoints of durability, optical properties, cost, productivity, etc. is the one comprising a base film, a hard coat layer formed thereon, and a medium-refractive-index layer/high-refractive-index layer/low-refractive-index layer superposed in this order on the hard coat layer. The antireflection film of the invention may have functional layers such as, e.g., an antiglare layer and an antistatic layer.

Preferred examples of the constitution of the antireflection film of the invention are shown below. Diagrammatic views are shown in FIGS. 1 to 5. In FIGS. 1 to 5, symbol (1) denotes a substrate, (2) a hard coat layer, (3) a medium-refractive-index layer, (4) a high-refractive-index layer, and (5) a low-refractive-index layer.

Base film/hard coat layer/antiglare layer/low-refractive-index layer;

base film/hard coat layer/high-refractive-index layer/low-refractive-index layer;

base film/hard coat layer/medium-refractive-index layer/high-refractive-index layer/low-refractive-index layer;

base film/antistatic layer/hard coat layer/medium-refractive-index layer/high-refractive-index layer/low-refractive-index layer;

antistatic layer/base film/hard coat layer/medium-refractive-index layer/high-refractive-index layer/low-refractive-index layer.

The antireflection film of the invention should not be construed as being limited especially to those layer constitutions only, and may have any layer constitution as long as it can reduce reflectance based on optical interference. The high-refractive-index layer may be a light-diffusing layer which does not have antiglare properties. The antistatic layer preferably is a layer containing electrically conductive polymer particles or fine metal oxide particles (e.g., $SnO_2$ or ITO). Such an antistatic layer can be formed by coating solution application, atmospheric-pressure plasma treatment, etc.

In the invention, at least one of the hard coat layer and the low-refractive-index layer contains a hydrolyzate of an organosilane compound having a directly silicon-bonded hydroxyl or hydrolyzable group and/or a product of the partial condensation thereof, i.e., a sol ingredient.

Furthermore, at least one of the hard coat layer and the low-refractive-index layer in the invention may contain a hydrolyzate of an organosilane compound having a polymerization initiation site and represented by the following formula (A) and/or a product of the partial condensation thereof. The compound having a polymerization initiation site bonded thereto enables, for example, nearby polymerizable groups to efficiently polymerize, whereby bonding between layers can be more effectively enhanced. Use of this compound can hence further improve marring resistance.

In this specification, a hydrolyzate of an organosilane compound represented by the following formula (A) or (B) and/or a product of the partial condensation thereof is often referred to as a sol ingredient or organosilane sol.

Organosilane Compound Represented by Formula (A)

Formula (A)

In formula (A), $R_1$ represents a substituted or unsubstituted alkyl or aryl group having a polymerization initiation site, and $R_2$ represents a substituted or unsubstituted alkyl group or a substituted or unsubstituted alkyl group having a polymerizable group having an unsaturated bond.

Examples of the alkyl groups include methyl, ethyl, propyl, isopropyl, hexyl, t-butyl, sec-butyl, hexyl, decyl, and hexadecyl. The alkyl groups preferably are ones having 1-30 carbon atoms, and more preferably are ones having 1-16, especially 1-6 carbon atoms. Examples of the aryl group include phenyl and naphthyl. The aryl group preferably is phenyl.

X represents a hydroxyl or hydrolyzable group. Examples of the hydrolyzable group include alkoxy groups (alkoxy groups having 1-5 carbon atoms are preferred, such as, e.g., methoxy and ethoxy), halogen atoms (e.g., Cl, Br, and I), and $R^2COO$ ($R^2$ preferably is a hydrogen atom or an alkyl group having 1-5 carbon atoms; examples include $CH_3COO$ and C₂H₅COO). The hydrolyzable group preferably is an alkoxy group, and especially preferably is methoxy or ethoxy.

The substituents which may be contained in $R_1$ and $R_2$ are not particularly limited. Examples thereof include halogen atoms (e.g., fluorine, chlorine, and bromine atoms), hydroxyl, mercapto, carboxyl, epoxy, alkyl groups (e.g., methyl, ethyl, isopropyl, propyl, and t-butyl), aryl groups (e.g., phenyl and naphthyl), aromatic heterocyclic groups (e.g., furyl, pyrazolyl, and pyridyl), alkoxy groups (e.g., methoxy, ethoxy, isopropoxy, and hexyloxy), aryloxy groups (e.g., phenoxy), alkylthio groups (e.g., methylthio and ethylthio), arylthio groups (e.g., phenylthio), alkenyl groups (e.g., vinyl and 1-propenyl), alkoxysilyl groups (e.g., trimethoxysilyl and triethoxysilyl), acyloxy groups (e.g., acetoxy, acryloyloxy, and methacryloyloxy), alkoxycarbonyl groups (e.g., methoxycarbonyl and ethoxycarbonyl), aryloxycarbonyl groups (e.g., phenoxycarbonyl), carbamoyl groups (e.g., carbamoyl, N-methylcarbamoyl, N,N-dimethylcarbamoyl, and N-methyl-N-octylcarbamoyl), and acylamino groups (e.g., acetylamino, benzoylamino, acryloylamino, and methacryloylamino). These substituents may be further substituted.

Preferred of these are hydroxyl, mercapto, carboxyl, epoxy, alkyl groups, alkoxysilyl groups, acyloxy groups, and acylamino groups. More preferred are epoxy, (meth)acryloyloxy, and (meth)acryloylamino.

Symbol m represents an integer of 1-3, and n represents an integer of 0-2. When there are two or more $R_1$'s, $R_2$'s, or X's, then the $R_1$'s, $R_2$'s, or X's may be the same or different. Symbol m preferably is 1 or 2, and more preferably is 1.

Symbol p represents an integer of 1-3, provided that the sum of m, n, and p is 4.

[Organosilane Compound for Use in Combination]

The organosilane compound having a directly silicon-bonded hydroxyl or hydrolyzable group, which can be used in combination with the hydrolyzate of an organosilane compound having a polymerization initiation site and represented by formula (A) and/or product of the partial condensation thereof according to the invention, is represented by the following formula (B).

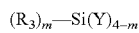  Formula (B)

(In the formula, $R_3$ represents a substituted or unsubstituted alkyl group or a substituted or unsubstituted aryl group; Y represents a hydroxyl group or a hydrolyzable group; and m represents an integer of 1-3.)

In formula (B), $R_3$ represents a substituted or unsubstituted alkyl group or a substituted or unsubstituted aryl group. Examples of the alkyl group include methyl, ethyl, propyl, isopropyl, hexyl, t-butyl, sec-butyl, hexyl, decyl, and hexadecyl. The alkyl group preferably is one having 1-30 carbon atoms, and more preferably is one having 1-16, especially 1-6 carbon atoms. Examples of the aryl group include phenyl and naphthyl. The aryl group preferably is phenyl.

Y represents hydroxyl or a hydrolyzable group. Examples of the hydrolyzable group include alkoxy groups (alkoxy groups having 1-5 carbon atoms are preferred, such as, e.g., methoxy and ethoxy), halogen atoms (e.g., Cl, Br, and I), and $R^2COO(R^2$ preferably is a hydrogen atom or an alkyl group having 1-5 carbon atoms; examples include $CH_3COO$ and $C_2H_5COO$). The hydrolyzable group preferably is an alkoxy group, and especially preferably is methoxy or ethoxy.

Symbol m represents an integer of 0-3. When there are two or more $R_3$'s or Y's, then the $R_3$'s or Y's may be the same or different. Symbol m is preferably 0, 1, or 2, more preferably 1 or 2, especially preferably 1.

The substituents which may be contained in $R_3$ are not particularly limited. Examples thereof include halogen atoms (e.g., fluorine, chlorine, and bromine atoms), hydroxyl, mercapto, carboxyl, epoxy, alkyl groups (e.g., methyl, ethyl, isopropyl, propyl, and t-butyl), aryl groups (e.g., phenyl and naphthyl), aromatic heterocyclic groups (e.g., furyl, pyrazolyl, and pyridyl), alkoxy groups (e.g., methoxy, ethoxy, isopropoxy, and hexyloxy), aryloxy groups (e.g., phenoxy), alkylthio groups (e.g., methylthio and ethylthio), arylthio groups (e.g., phenylthio), alkenyl groups (e.g., vinyl and 1-propenyl), alkoxysilyl groups (e.g., trimethoxysilyl and triethoxysilyl), acyloxy groups (e.g., acetoxy, acryloyloxy, and methacryloyloxy), alkoxycarbonyl groups (e.g., methoxycarbonyl and ethoxycarbonyl), aryloxycarbonyl groups (e.g., phenoxycarbonyl), carbamoyl groups (e.g., carbamoyl, N-methylcarbamoyl, N,N-dimethylcarbamoyl, and N-methyl-N-octylcarbamoyl), and acylamino groups (e.g., acetylamino, benzoylamino, acryloylamino, and methacryloylamino). These substituents may be further substituted.

Preferred of these are hydroxyl, mercapto, carboxyl, epoxy, alkyl groups, alkoxysilyl groups, acyloxy groups, and acylamino groups. More preferred are epoxy, (meth)acryloyloxy, and (meth)acryloylamino.

In the invention, when the organosilane compound represented by formula (B) has two or more $R_3$'s, it is preferred that at least one of these should be a substituted alkyl group or a substituted aryl group. It is more preferred that the $R_3$ be a polymerizable substituent, in particular, a radical-polymerizable group. Especially preferred of such compounds is an organosilane compound having a vinyl-polymerizable group and represented by formula (C).

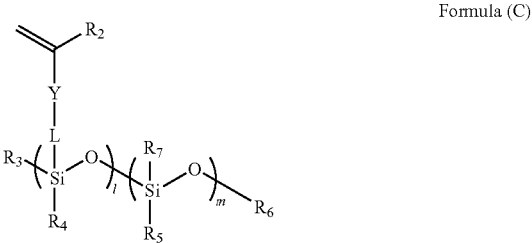

Formula (C)

In formula (C), $R_2$ represents a hydrogen atom, methyl, methoxy, alkoxycarbonyl group, cyano, fluorine atom, or chlorine atom. Examples of the alkoxycarbonyl group include methoxycarbonyl and ethoxycarbonyl. Preferred are a hydrogen atom, methyl, methoxy, methoxycarbonyl, cyano, fluorine atom, and chlorine atom. More preferred are a hydrogen atom, methyl, methoxycarbonyl, fluorine atom, and chlorine atom. Especially preferred are a hydrogen atom and methyl.

$R_3$ to $R_5$ each represent a halogen atom, hydroxyl, unsubstituted alkoxy group, or unsubstituted alkyl group. $R_3$ to $R_5$ each more preferably are a chlorine atom, hydroxyl, or unsubstituted alkoxy group having 1-6 carbon atoms, even more preferably are hydroxyl or an alkoxy group having 1-3 carbon atoms, and especially preferably are hydroxyl or methoxy.

$R_6$ represents a hydrogen atom or an alkyl group. $R_6$ preferably is a hydrogen atom or an alkyl group having 1-3 carbon atoms, and especially preferably is a hydrogen atom or methyl.

$R_7$ represents a substituted or unsubstituted alkyl group or a substituted or unsubstituted aryl group. The alkyl group is an alkyl group preferably having 1-30 carbon atoms, more preferably having 1-16 carbon atoms, especially preferably having 1-6 carbon atoms. Examples of the alkyl group include methyl, ethyl, propyl, isopropyl, hexyl, decyl, and hexadecyl. Examples of the aryl group include phenyl and naphthyl. The aryl group preferably is phenyl. The substituents which may be contained in $R_7$ are not particularly limited, and examples thereof include halogen atoms (e.g., fluorine, chlorine, and bromine), hydroxyl, mercapto, carboxyl, epoxy, alkyl groups (e.g., methyl, ethyl, isopropyl, propyl, and t-butyl), aryl groups (e.g., phenyl and naphthyl), aromatic heterocyclic groups (e.g., furyl, pyrazolyl, and pyridyl), alkoxy groups (e.g., methoxy, ethoxy, isopropoxy, and hexyloxy), aryloxy groups (e.g., phenoxy), alkylthio groups (e.g., methylthio and ethylthio), arylthio groups (e.g., phenylthio), alkenyl groups (e.g., vinyl and 1-propenyl), acyloxy groups (e.g., acetoxy, acryloyloxy, and methacryloyloxy), alkoxycarbonyl groups (e.g., methoxycarbonyl and ethoxycarbonyl), aryloxycarbonyl groups (e.g., phenoxycarbonyl), carbamoyl groups (e.g., carbamoyl, N-methylcarbamoyl, N,N-dimethylcarbamoyl, and N-methyl-N-octylcarbamoyl), and acylamino groups (e.g., acetylamino, benzoylamino, acryloylamino, and methacryloylamino). These substituents may be further substituted. Other preferred examples of the substituents include polymerizable functional groups other than vinyl-polymerizable groups, such as epoxy and isocyanate groups. The substituents in $R_7$ more preferably are hydroxyl or an unsubstituted alkyl group, even more preferably are hydroxyl or an alkyl group having 1-3 carbon atoms, and especially preferably are hydroxyl or methyl.

Y represents a single bond, *—COO—**, *—CONH—**, or *—O—**. Preferred of these are a single bond, *—COO—**, and *—CONH—**. More preferred are a single bond and *—COO—*. Especially preferred is *—COO—. Symbol * indicates the position in which Y is bonded to the =C($R_2$)—, while ** indicates the position in which Y is bonded to the L.

L represents a divalent connecting chain. Examples thereof include substituted or unsubstituted alkylene groups, substituted or unsubstituted arylene groups, substituted or unsubstituted alkylene groups having a connecting group (e.g., an ether, ester, or amide) in an inner part thereof, and substituted or unsubstituted arylene groups having a connecting group in an inner part thereof. Preferred of these are substituted or unsubstituted alkylene groups, substituted or unsubstituted arylene groups, and alkylene groups having a connecting group in an inner part thereof. More preferred are unsubstituted alkylene groups, unsubstituted arylene groups, and alkylene groups having a connecting ether or ester group in an inner part thereof. Especially preferred are unsubstituted alkylene groups and alkylene groups having a connecting ether or ester group in an inner part thereof. Examples of the substituents include halogens and hydroxyl, mercapto, carboxyl, epoxy, alkyl, and aryl groups. These substituents may be further substituted.

Symbol l represents a number satisfying the mathematical expression l=100−m. Symbol m represents a number of 0-50, more preferably 0-40, especially preferably 0-30. Numbers of m larger than 50 are undesirable because the liquid yields a solid matter therein, opacifies, or comes to have an impaired pot life, and because it is difficult to regulate molecular weight (molecular weight becomes high). In addition, since the content of polymerizable groups is low, improvements in performances (e.g., marring resistance of the antireflection film) through a polymerization treatment are less apt to be obtained.

Preferred examples of the compound represented by formula (C) are the compounds shown in JP-A-2004-170901, pp. 12-21 as examples of formula (2).

[Polymerization Initiation Site]

As the polymerization initiation site in the compound having a polymerization initiation site, such as, e.g., the organosilane compound represented by formula (A), use can be made of, for example, any of the following free-radical photopolymerization initiators and free-radical heat polymerization initiators which has been bonded as a basic framework to a part of an organosilane.

Examples of the free-radical photopolymerization initiators include acetophenone compounds, benzoin compounds, benzophenone compounds, phosphine oxides, ketals, anthraquinone compounds, thioxanthone compounds, azo compounds, peroxides (e.g., those given in JP-A-2001-139663), 2,3-dialkyldione compounds, disulfide compounds, fluoroamine compounds, aromatic sulfonium compounds, active halogen compounds, and the various compounds shown below.

Examples of the acetophenone compounds include 2,2-diethoxyacetophenone, p-dimethylacetophenone, 1-hydroxydimethylphenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone.

Examples of the benzoin compounds include benzoin, benzoin methyl ether, benzoin ethyl ether, benzoin isopropyl ether, benzoin dimethyl ketal, benzoin ester of benzenesulfonic acid, benzoin ester of toluenesulfonic acid, benzoin methyl ether, benzoin ethyl ether, and benzoin isopropyl ether.

Examples of the benzophenone compounds include benzophenone, hydroxybenzophenone, 4-benzyol-4'-methyldiphenyl sulfide, 2,4-dichlorobenzophenone, 4,4-dichlorobenzophenone, and p-chlorobenzophenone.

Examples of the phosphine oxides include 2,4,6-trimethylbenzoyldiphenylphosphine oxide.

Examples of active ester compounds which can be used include 1,2-octanedione, 1-[4-(phenylthio)-2-(O-benzoyloxime)], sulfonic acid esters, and cyclic active ester compounds.

Especially preferred examples thereof are the compounds 1 to 21 given in the Examples in JP-A-2000-80068.

Examples of onium salts which can be used include aromatic diazonium salts, aromatic iodonium salts, and aromatic sulfonium salts.

Examples of borates which can be used include the organic boric-acid salts given in, e.g., Japanese Patent No. 2764769, JP-A-2002-116539, and Kunz, Martin, *Rad Tech '98. Proceeding April*, pp. 19-22, 1998, Chicago. Specific examples thereof include the compounds shown in JP-A-2002-116539, paragraphs Nos. [0022] to [0027]. Other usable organic boron compounds include the organic boron-transition metal coordination complexes given in, e.g., JP-A-6-348011, JP-A-7-128785, JP-A-7-140589, JP-A-7-306527, and JP-A-7-292014. Specific examples thereof include ion complexes with cationic dyes.

Furthermore, examples of the active halogen compounds include the compounds given in, e.g., Wakabayashi et al., *Bull. Chem. Soc. Japan*, Vol. 42, p. 2924 (1969), U.S. Pat. No. 3,905,815, JP-A-5-27830, and M. P. Hutt, *Journal of Heterocyclic Chemistry*, Vol. 1 (No. 3) (1970). In particular, examples thereof include oxazole compounds or s-triazine compounds substituted by trihalomethyl. More preferred examples thereof include s-triazine derivatives having at least one mono-, di-, or trihalogenomethyl group bonded to the s-triazine ring. Specifically, especially preferred examples thereof are the compounds shown in JP-A-58-15503, pp. 14-30 and JP-A-55-77742, pp. 6-10, compounds Nos. 1 to 8 shown in JP-B-60-2767, p. 287, compounds Nos. 1 to 17 shown in JP-A-60-239736, and compounds Nos. 1 to 19 shown in U.S. Pat. No. 4,701,339.

Examples of inorganic complexes which can be used include bis($\eta^5$-2,4-cyclopentadien-1-yl)bis(2,6-difluoro-3-(1H-pyrrol-1-yl)phenyl)titanium.

Examples of coumarin compounds which can be used include 3-ketocoumarin.

Those initiators may be used either alone or as a mixture of two or more thereof.

Examples of various free-radical photopolymerization initiators are given also in *Saishin UV Kōka Gijutsu* (p. 159, published by Kazuhiro Takahaku from Technical Information Institute Co., Ltd. (1991) and *Shigaisen Kōka Sisutemu*, written by Kiyoshi Kato, 1989, published from Sogo Gijutsu Center, pp. 65-148. These polymerization initiators also are useful in the invention.

Preferred examples of commercial free-radical photopolymerization initiators of the photocleavage type include Irgacure ((651, 184, 819, 907, 1870 (CGI-403/Irg184=7/3 mixture initiator), 500, 369, 1173, 2959, 4265, 4263, etc.), and OXE 01) manufactured by Ciba Specialty Chemicals, Co., KAYACURE (DETX-S, BP-100, BDMK, CTX, BMS, 2-EAQ, ABQ, CPTX, EPD, ITX, QTX, BTC, MCA, etc.) manufactured by Nippon Kayaks Co., Ltd., Esacure (KIP100F, KB1, EB3, BP, X33, KT046, KT37, KIP150, and TZT) manufactured by Sartomer Company Inc., and combinations thereof.

As the free-radical heat polymerization initiator can be used an organic or inorganic peroxide, an organic azo or diazo compound, etc.

Examples of the organic peroxide include benzoyl peroxide, halogenobenzoyl peroxides, lauroyl peroxide, acetyl peroxide, dibutyl peroxide, cumene hydroperoxide, and butyl hydroperoxide. Examples of the inorganic peroxide include hydrogen peroxide, ammonium persulfate, and potassium persulfate. Examples of the azo compound include 2,2'-azobis(isobutyronitrile), 2,2'-azobis(propinonitrile), and 1,1'-azobis(cyclohexanecarbonitrile). Examples of the diazo compound include diazoaminobenzene and p-nitrobenzenediazoniums.

The compound represented by formula (A) can be synthesized, for example, by subjecting a compound having a polymerization initiation site and an organosilane compound having a directly silicon-bonded hydrolyzable group to a urethane bond formation reaction, amide bond formation reaction, alkylation reaction, or the like by a known method. Reagent combinations to be used are not particularly limited.

Specific examples of the compound represented by formula (A) are shown below, but the compound to be used for the invention should not be construed as being limited to the following examples.

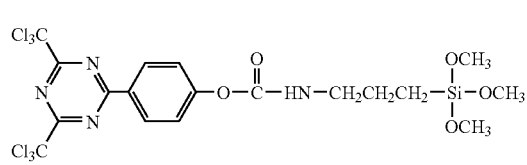

1-1

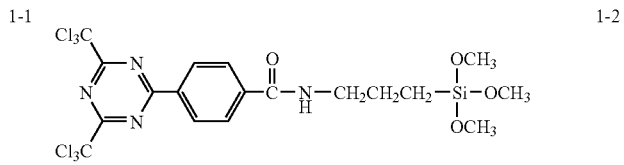

1-2

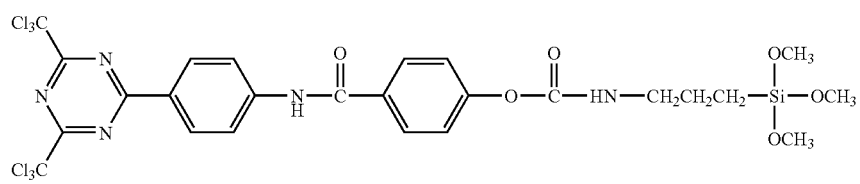

1-3

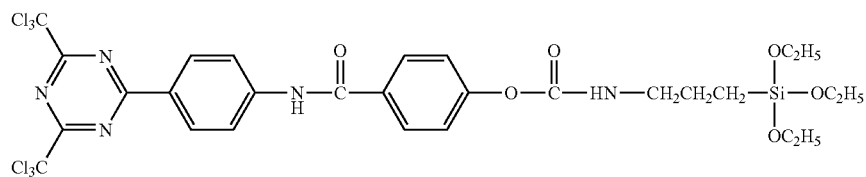

1-4

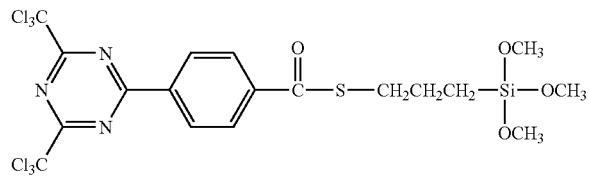

1-5

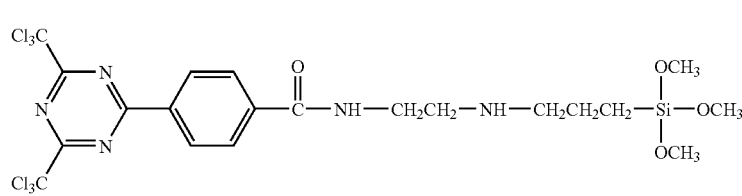

1-6

-continued
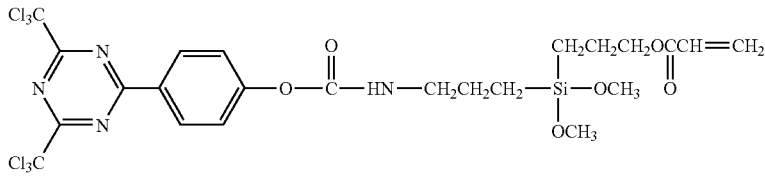
1-7
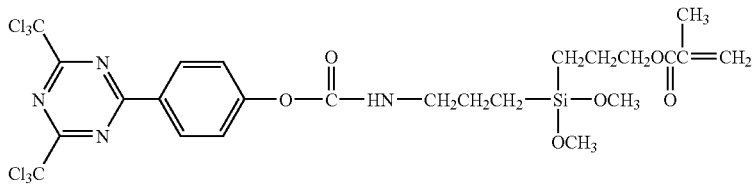
1-8
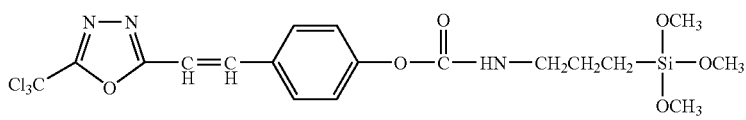
2-1
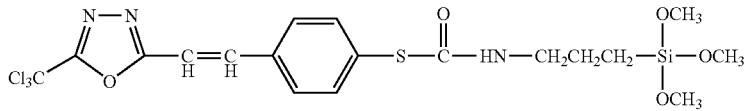
2-2
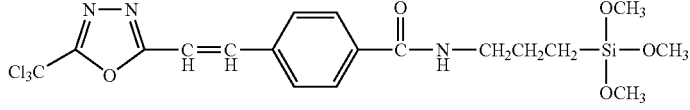
2-3
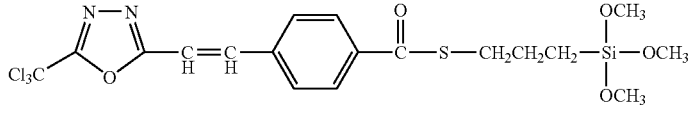
2-4
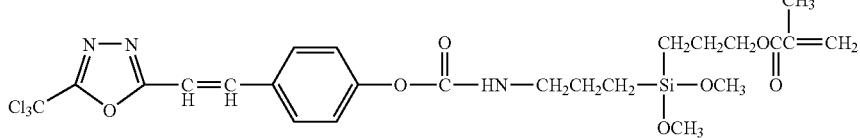
2-5
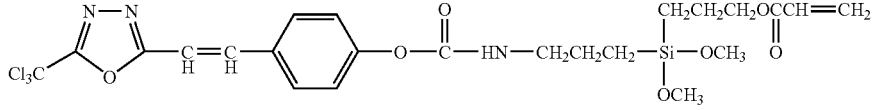
2-6
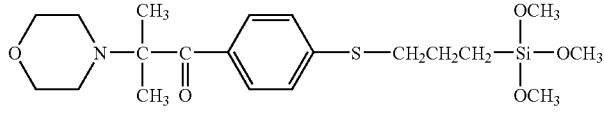
3-1
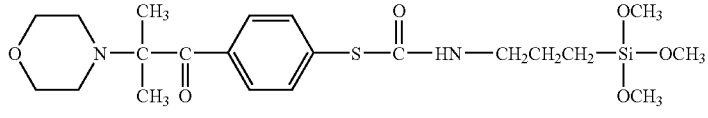
3-2
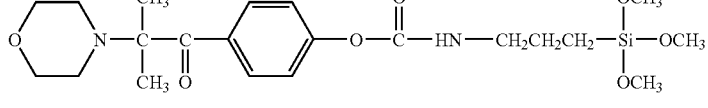
3-3

-continued
3-4
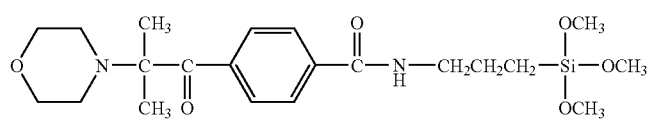
3-5
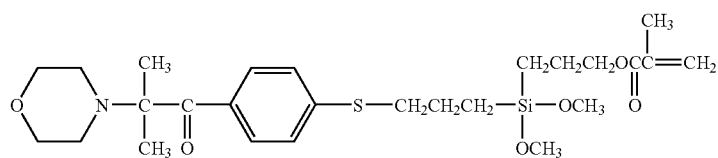
3-6
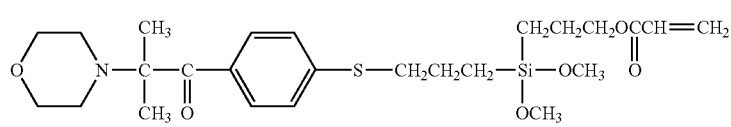
4-1
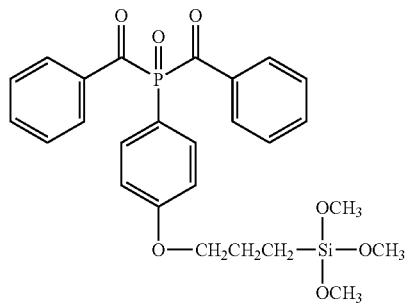
4-2
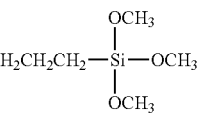
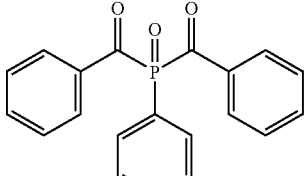
4-3 4-4
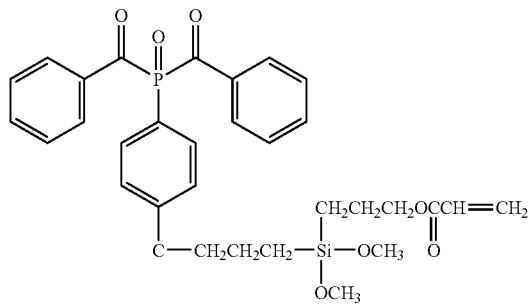
4-5
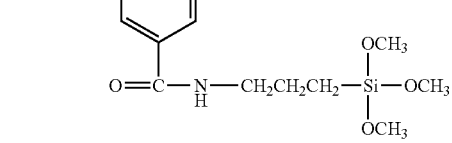
5-1
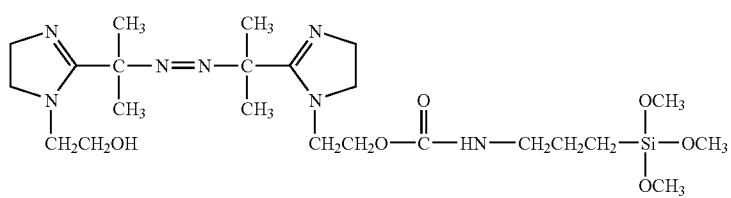

-continued
5-2
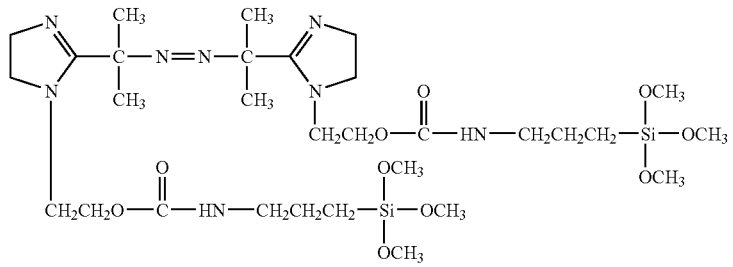
5-3
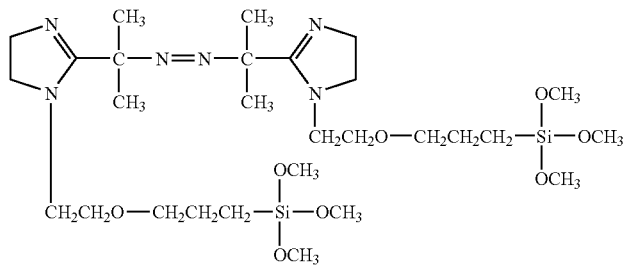
5-4
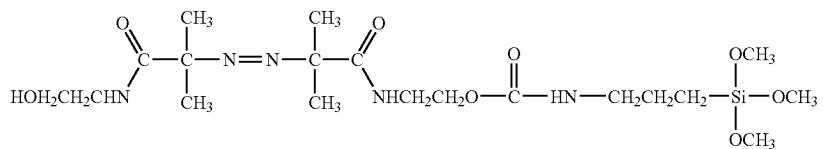
5-5
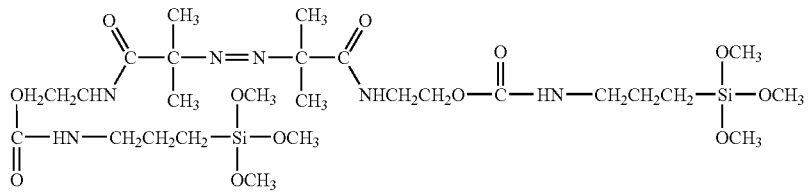
5-6
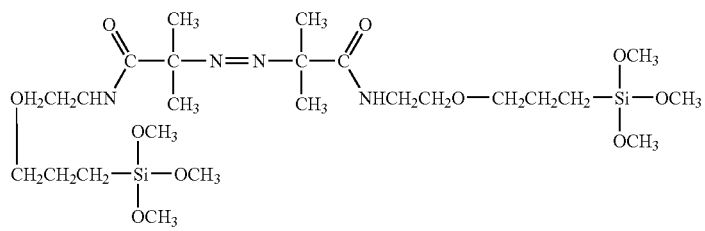
5-7
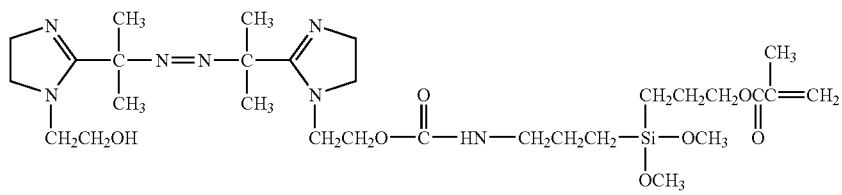
5-8
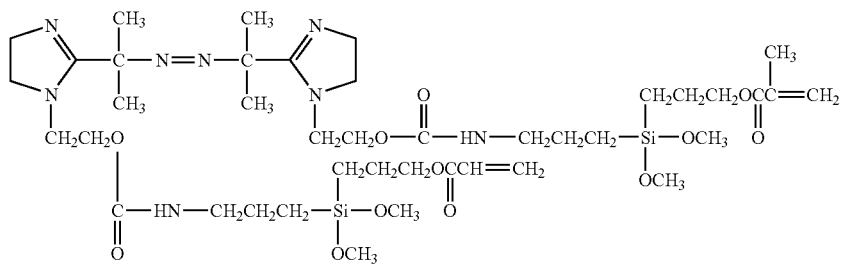

The amount of those organosilane compounds represented by formula (A) to be used, which have one or more polymerization initiation sites, is not particularly limited. However, the amount of the compounds to be used is in the range of preferably 0.1-20 parts by mass, more preferably 1-10 parts by mass, per 100 parts by mass of the polymerizable compound to be used in combination therewith. Those organosilane compounds may be used alone or in combination of two or more thereof, and may be used in combination with other ingredients, e.g., a photosensitizer. Examples of the photosensitizer include n-butylamine, triethylamine, tri-n-butylphosphine, Michler's ketone, and thioxanthone.

Furthermore, one or more of auxiliary agents such as, e.g., azide compounds, thiourea compounds, and mercapto compounds may be used in combination with the organosilane compound.

A method for preparing an organosilane sol will be explained next.

A hydrolysis and/or condensation reaction is conducted, for example, by adding water in an amount of 0.3-2.0 mol, preferably 0.5-1.0 mol, per mol of hydrolyzable groups and stirring the mixture at 25-100° C. in the presence of a metal chelate compound.

The mass-average molecular weight of the organosilane sol excluding the components thereof having a molecular weight lower than 300 is preferably 1,000-20,000, more preferably 1,000-10,000, even more preferably 1,000-5,000, especially 1,200-3,000, most preferably 1,200-2,000.

In those components of the organosilane sol which have a molecular weight of 300 or higher, the content of components having a molecular weight higher than 20,000 is preferably 20% by mass or lower, more preferably 15% by mass or lower, even more preferably 10% by mass or lower, furthermore preferably 6% by mass or lower, especially preferably 4% by mass or lower.

In those components of the organosilane sol which have a molecular weight of 300 or higher, the content of components having a molecular weight of 1,000-20,000 is preferably 80% by mass or higher. When the proportion of components having a molecular weight of 1,000-20,000 is too low, there are cases where cured coating films obtained by curing a curable composition containing such an organosilane sol are poor in transparency and adhesion to the base film.

The values of mass-average molecular weight and of molecular weight herein mean ones obtained through a measurement made with a GPC apparatus employing column TSKgel GMHxL, TSKgel G4000HxL, or TSKgel G2000HxL (trade names; each manufactured by Tosoh Corp.) using THF as a solvent and a differential refractometer for detection and through calculation for standard polystyrene. Each content means the proportion in terms of % of the peak area for that molecular-weight range to the peak area for the components having a molecular weight of 300 or higher.

The dispersity ratio (mass-average molecular weight/number-average molecular weight) thereof is preferably 3.0-1.1, more preferably 2.5-1.1, even more preferably 2.0-1.1, especially preferably 1.5-1.1.

The hydrolysis and/or condensation reaction of the organosilane compounds can be conducted without using a solvent or in a solvent. Through this reaction, a curable composition can be produced. In the case of using a solvent, the organosilane sol can be made to have a suitable concentration. The solvent to be used preferably is an organic solvent from the standpoint of evenly mixing the ingredients. Preferred examples thereof include alcohols, aromatic hydrocarbons, ethers, ketones, and esters.

The solvent preferably is one in which the organosilanes and the catalyst are soluble. From the standpoint of steps, it is preferred that the organic solvent be used as the solvent to be used in a coating solution or as part of the solvent for a coating solution, and it is preferred to use one which, when mixed with other materials, e.g., a fluoropolyrer, does not impair solubility or dispersibility.

Examples of the alcohols, among the preferred solvents, include monohydric alcohols and dihydric alcohols. The monohydric alcohols preferably are saturated aliphatic alcohols having 1-8 carbon atoms. Specific examples of those alcohols include methanol ethanol, n-propyl alcohol, isopropyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate.

Examples of the aromatic hydrocarbons include benzene, toluene, and xylene. Examples of the ethers include tetrahydrofuran and dioxane. Examples of the ketones include acetone, methyl ethyl ketone, methyl isobutyl ketone, and diisobutyl ketone. Examples of the esters include ethyl acetate, propyl acetate, butyl acetate, and propylene carbonate.

Those organic solvents may be used alone or as a mixture of two or more thereof. In the reaction, the solid concentration is not particularly limited, but is generally in the range of 1-90% by mass, preferably 20-70% by mass, based on the solvent.

It is preferred that the hydrolysis and/or condensation reaction of the organosilane compounds be conducted in the presence of a catalyst. Examples of the catalyst include inorganic acids such as hydrochloric acid, sulfuric acid, and nitric acid; organic acids such as oxalic acid, acetic acid, formic acid, methanesulfonic acid, and toluenesulfonic acid; inorganic bases such as sodium hydroxide, potassium hydroxide, and ammonia; organic bases such as triethylamine and pyridine; and metal alkoxides such as triisopropoxyaluminum and tetrabutoxyzirconium. However, an acid catalyst (inorganic acid or organic acid) is used in the invention from the standpoint of sol liquid stability during production and storage. Preferred inorganic acids are hydrochloric acid and sulfuric acid, while preferred organic acids are ones having an acid dissociation constant in water ($pK_a$ value (25° C.)) of 4.5 or lower. More preferred are hydrochloric acid, sulfuric acid, and organic acids having an acid dissociation constant in water of 3.0 or lower. Even more preferred are hydrochloric acid, sulfuric acid, and organic acids having an acid dissociation constant in water of 2.5 or lower. Furthermore preferred are organic acids having an acid dissociation constant in water of 2.5 or lower, such as methanesulfonic acid, oxalic acid, phthalic acid, and malonic acid. Oxalic acid is especially preferred.

The hydrolysis/condensation reaction is generally conducted by adding water in an amount of 0.3-2 mol, preferably 0.5-1 mol, per mol of hydrolyzable groups of the organosilane compounds and stirring the mixture in the presence of an acid catalyst and a metal chelate compound at 25-100° C. in the presence or absence of the solvent.

In the case where the hydrolyzable groups are alkoxy groups and the acid catalyst is an organic acid, the amount of the water to be added can be reduced because the carboxyl or sulfo group of the organic acid supplies a proton. In this case, the amount of the water to be added is 0-2 mol, preferably 0-1.5 mol, more preferably 0-1 mol, especially preferably 0-0.5 mol, per mol of the hydrolyzable groups, e.g., alkoxy groups, of the organosilane compounds. When an alcohol is used as the solvent, the reaction can be conducted using substantially no water. This case also is preferred.

The amount of the acid catalyst to be used may be as follows. In the case where the acid catalyst is an inorganic acid, the amount thereof is 0.01-10% by mole, preferably 0.1-5% by mole, based on the hydrolyzable groups. In the case where the acid catalyst is an organic acid, the optimal amount of the organic acid to be used varies depending on the amount of water added. When water is added, the amount of the organic acid to be added is 0.01-10% by mole, preferably 0.1-5% by mole, based on the hydrolyzable groups. When substantially no water is added, the amount of the organic acid to be added is 1-500% by mole, preferably 10-200% by mole, more preferably 20-200% by mole, even more preferably 50-150% by mole, especially preferably 50-120% by mole, based on the hydrolyzable groups.

Although the reaction is conducted with stirring at 25-100° C., it is preferred to regulate the conditions according to the reactivity of the organosilane compounds.

The content of the organosilane sol varies depending on the layer to which the sol is added. The amount of the sol to be added to the low-refractive-index layer is preferably 0.1-50% by mass, more preferably 0.5-20% by mass, especially preferably 1-10% by mass, based on all solid components of the layer in which the sol is to be contained (the layer to which the sol is to be added). The amount of the sol to be added to a layer other than the low-refractive-index layer is preferably 0.001-50% by mass, more preferably 0.01-20% by mass, even more preferably 0.05-10% by mass, especially preferably 0.1-5% by mass, based on all solid components of the layer in which the sol is to be contained (the layer to which the sol is to be added).

The amount (proportion) of the organosilane sol to be used is, for example, preferably 5-100% by mass, more preferably 5-40% by mass, even more preferably 8-35% by mass, especially preferably 10-30% by mass, based on the fluoropolymer in the low-refractive-index layer. To small amounts thereof are undesirable because the effects of the invention are difficult to obtain. Too large amounts thereof are undesirable because the results are an increased refractive index, impaired shape/surface state of the film, etc.

Metal Chelate Compound

The metal chelate compound is not particularly limited as long as it is one comprising an alcohol represented by the formula $R^3OH$ (wherein $R^3$ represents an alkyl group having 1-10 carbon atoms) and a compound represented by the formula $R^4COCH_2COR^5$ (wherein $R^4$ represents an alkyl group having 1-10 carbon atoms and $R^5$ represents an alkyl group having 1-10 carbon atoms or an alkoxy group having 1-10 carbon atoms) as ligands and a metal selected from zirconium, titanium, and aluminum as a central metal. Any of such compounds can be advantageously used. A combination of two or more metal chelate compounds may be used as long as these compounds are within that range. The metal chelate compounds to be used in the invention preferably are ones selected from the group consisting of compounds represented by the formulae $Zr(OR^3)_{p1}(R^4COCH_2COR^5)_{p2}$, $Ti(OR^3)_{q1}(R^4COCH_2COR^5)_{q2}$, and $Al(OR^3)_{r1}(R^4COCH_2COR^5)_{r2}$. These metal chelate compounds serve to accelerate the condensation reaction of the ingredient (A).

$R^3$ and $R^4$ in the metal chelate compounds may be the same or different, and are alkyl groups having 1-10 carbon atoms. Examples thereof include ethyl, n-propyl, isopropyl, n-butyl, sec-butyl, t-butyl, n-pentyl, and phenyl. $R^5$ is an alkyl group having 1-10 carbon atoms, examples of which are the same as those shown above, or an alkoxy group having 1-10 carbon atoms. Examples of the alkoxy group include methoxy, ethoxy, n-propoxy, isopropoxy, n-butoxy, sec-butoxy, and t-butoxy. Furthermore, symbols p1, p2, q1, q2, r1, and r2 in the metal chelate compounds are integers determined so as to result in tetra- or hexadentate coordination.

Examples of those metal chelate compounds include zirconium chelate compounds such as tri-n-butoxy(ethyl acetoacetate)zirconium, di-n-butoxybis(ethyl acetoacetate) zirconium, n-butoxytris(ethyl acetoacetate)zirconium, tetrakis(n-propyl acetoacetate)zirconium, tetrakis(acetylacetoacetate)zirconium, and tetrakis(ethyl acetoacetate) zirconium; titanium chelate compounds such as diisopropoxybis(ethyl acetoacetate)titanium, diisopropoxybis(acetylacetate)titanium, and diisopropoxybis(acetylacetone)titanium; and aluminum chelate compounds such as diisopropoxy(ethyl acetoacetate)aluminum, diisopropoxyacetylacetonatoaluminum, isopropoxybis(ethyl acetoacetate)aluminum, isopropoxybis(acetylacetonato)aluminum, tris(ethyl acetoacetate)aluminum, tris(acetylacetonato)aluminum, and monoacetylacetonatobis(ethyl acetoacetate)aluminum.

Preferred of those metal chelate compounds are tri-n-butoxy(ethyl acetoacetate)zirconium, diisopropoxybis(acetylacetonato)titanium, diisopropoxy(ethyl acetoacetate)aluminum, and tris(ethyl acetoacetato)aluminum. Those metal chelate compounds can be used alone or as a mixture of two or more thereof. A product of the partial hydrolysis of any of those metal chelate compounds may be used as the metal chelate compound.

The metal chelate compound is used in an amount of preferably 0.01-50% by mass, more preferably 0.1-50% by mass, even more preferably 0.5-10% by mass, based on the organosilane compound represented by formula (A) or (B). Too small amounts of the metal chelate compound ingredient are undesirable because there is a possibility that the condensation reaction of the organosilane compound represented by formula (A) or (B) might be slow, resulting in impaired coating film durability. On the other hand, too large amounts thereof are undesirable because a composition containing the organosilane compound represented by formula (A) or (B) and the metal chelate compound ingredient might have impaired storage stability.

Although the antireflection film of the invention may comprise a transparent substrate, a hard coat layer formed over the substrate, and a low-refractive-index layer formed thereover, it can be an antireflection film in which the hard coat comprises one or more layers and one of these is an antiglare hard coat layer.

In this antireflection film of the invention, a hard coat layer which does not have antiglare properties may be further formed as a layer underlying the antiglare hard coat layer, for the purpose of improving film strength.

It is also preferred to add an inorganic filler to each of the layers to be formed over the transparent substrate. The inorganic fillers to be added respectively to the layers may be the same or different. It is preferred to regulate the kind and amount of the filler to be added to each layer according to necessary performances such as the refractive index, film strength, and thickness of the layer, applicability, etc.

The shapes of the inorganic fillers to be used in the invention are not particularly limited. For example, any of spherical, platy, fibrous, rod, irregular, hollow, and other shapes can be advantageously used. However, spherical fillers are preferred because of their satisfactory dispersibility. Furthermore, the kinds of the inorganic fillers also are not particularly limited. However, amorphous ones are preferred and fillers made of an oxide, nitride, sulfide, or halide of one or more metals are preferred. Metal oxides are especially preferred.

Examples of metal atoms include Zr, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni. The average particle diameter of each inorganic filler is in the range of preferably 0.001-0.2 µm, more preferably 0.001-0.1 µm, even more preferably 0.001-0.06 µm, from the standpoint of obtaining a transparent cured film. The average particle diameter of particles is herein determined with a Coulter counter.

Methods for using an inorganic filler in the invention are not particularly limited. For example, an inorganic filler in a dry state can be used, or an inorganic filler in the state of being dispersed in water or an organic solvent may be used.

It is preferred in the invention to use a dispersion stabilizer for the purpose of inhibiting the inorganic filler from aggregating or sedimenting. As the dispersion stabilizer can be used poly(vinyl alcohol), polyvinylpyrrolidone, cellulose derivatives, polyamides, phosphoric esters, polyethers, and surfactants. Also usable besides these are silane coupling agents including the hydrolyzate of an organosilane compound represented by formula (A) or (B) and/or product of the partial condensation thereof according to the invention, titanate coupling agents, and the like. Silane coupling agents are especially preferred because they give cured films having high strength. Although the amount of the silane coupling agent to be added as a dispersion stabilizer is not particularly limited, it preferably is, for example, 1 part by mass or larger per 100 parts by mass of the inorganic filler. Methods for adding a dispersion stabilizer also are not particularly limited. Use may be made of a method in which a dispersion stabilizer which has undergone hydrolysis beforehand is added or a method which comprises mixing a silane coupling agent as a dispersion stabilizer with an inorganic filler and subjecting this mixture to hydrolysis and condensation. However, the latter method is preferred.

It is preferred that besides being used as a dispersion stabilizer for inorganic fillers, the hydrolyzate of an organosilane compound represented by formula (A) or (B) and/or product of the partial condensation thereof according to the invention be used as an additive constituting part of the binder ingredient for each layer in coating solution preparation.

Inorganic fillers suitable for each layer will be described later.

The antiglare hard coat layer according to the invention will be explained below.

The antiglare hard coat layer may be constituted of a binder for imparting hard-coat characteristics, matting particles for imparting antiglare properties, and an inorganic filler for imparting a higher refractive index, preventing crosslinking shrinkage, and increasing strength.

The binder preferably is a polymer having a saturated hydrocarbon chain or polyether chain as the main chain, and more preferably is a polymer having a saturated hydrocarbon chain as the main chain.

Furthermore, it is preferred that the binder polymer should have a crosslinked structure.

The binder polymer having a saturated hydrocarbon chain as the main chain preferably is a polymer of an ethylenically unsaturated monomer. The binder polymer having a saturated hydrocarbon chain as the main chain and further having a crosslinked structure preferably is a (co)polymer of a monomer having two or more ethylenically unsaturated groups.

In order for the binder polymer to have a higher refractive index, it is preferred that the monomer should contain in the structure thereof an aromatic ring or one or more atoms of at least one kind selected from halogen atoms other than fluorine and sulfur, phosphorus, and nitrogen atoms.

Examples of the monomer having two or more ethylenically unsaturated groups include esters of a polyhydric alcohol with (meth)acrylic acid (e.g., ethylene glycol di(meth)acrylate, 1,4-cyclohexane di(meth)acrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetra(meth)acrylate, polyurethane poly(meth)acrylates, and polyester poly(meth)acrylates), vinylbenzenes and derivatives thereof (e.g., 1,4-divinylbenzene, 2-acryloylethyl 4-vinylbenzoate, and 1,4-divinylcyclohexane), vinyl sulfones (e.g., divinyl sulfone), acrylamides (e.g., methylenebisacrylamide), and methacrylamide. These monomers may be used in combination of two or more thereof.

Examples of the monomer imparting a high refractive index include bis(4-methacryloylthiophenyl)sulfide, vinylnaphthalene, vinyl phenyl sulfide, and 4-methacryloxyphenyl 4'-methoxyphenyl thioether. These monomers also may be used in combination of two or more thereof.

The polymerization of those monomers having one or more ethylenically unsaturated groups can be conducted by irradiating the monomers with an ionizing radiation or heating the monomers in the presence of a free-radical photopolymerization initiator or a free-radical heat polymerization initiator.

Consequently, the antiglare hard coat layer of the antireflection film can be formed by preparing a coating solution comprising a monomer having one or more ethylenically unsaturated groups, a free-radical photopolymerization initiator or free-radical heat polymerization initiator, matting particles, and an inorganic filler, applying the coating solution to a transparent substrate, and then causing the monomer to undergo polymerization reaction by irradiation with an ionizing radiation or heating to thereby cure the coating.

Examples of the free-radical photopolymerization initiator include acetophenone compounds, benzoin compounds, benzophenone compounds, phosphine oxides, ketals, anthraquinone compounds, thioxanthone compounds, azo compounds, peroxides, 2,3-dialkyldione compounds, disulfide compounds, fluoroamine compounds, and aromatic sulfonium compounds. Examples of the acetophenone compounds include 2,2-diethoxyacetophenone, p-dimethylacetophenone, 1-hydroxydimethylphenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone. Examples of the benzoin compounds include benzoin ester of benzenesulfonic acid, benzoin ester of toluenesulfonic acid, benzoin methyl ether, benzoin ethyl ether, and benzoin isopropyl ether. Examples of the benzophenone compounds include benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

Examples of various free-radical photopolymerization initiators are given also in *Saishin UV Köka Gijutsu* (p. 159, published by Kazuhiro Takahaku from Technical Information Institute Co., Ltd. (1991). These polymerization initiators also are useful in the invention.

Preferred examples of commercial free-radical photopolymerization initiators of the photocleavage type include Irgacure (651, 184, and 907) manufactured by Ciba-Geigy Japan Ltd.

The photopolymerization initiator is used in an amount in the range of preferably 0.1-15 parts by mass, more preferably 1-10 parts by mass, per 100 parts by mass of the polyfunctional monomer.

A photosensitizer may be used in combination with the photopolymerization initiator. Examples of the photosensitizer include n-butylamine, triethylamine, tri-n-butylphosphine, Michler's ketone, and thioxanthone.

As the free-radical heat polymerization initiator can be used an organic or inorganic peroxide, an organic azo or diazo compound, etc.

Examples of the organic peroxide include benzoyl peroxide, halogenobenzoyl peroxides, lauroyl peroxide, acetyl peroxide, dibutyl peroxide, cumene hydroperoxide, and butyl hydroperoxide. Examples of the inorganic peroxide include hydrogen peroxide, ammonium persulfate, and potassium persulfate. Examples of the azo compound include 2-azobis (isobutyronitrile), 2-azobis(propinonitrile), and 2-azobis(cyclohexanedinitrile). Examples of the diazo compound include diazoaminobenzene and p-nitrobenzenediazoniums.

The polymer having a polyether as the main chain preferably is a polymer formed by the ring-opening polymerization of a polyfunctional epoxy compound. The ring-opening polymerization of a polyfunctional epoxy compound can be conducted by irradiating the compound with an ionizing radiation or heating the compound, in the presence of a photo-acid generator or thermo-acid generator.

Consequently, the antiglare hard coat layer can be formed by preparing a coating solution comprising a polyfunctional epoxy compound, a photo-acid generator or thermo-acid generator, matting particles, and an inorganic filler, applying the coating solution to a transparent substrate, and then causing the epoxy compound to undergo polymerization reaction by irradiation with an ionizing radiation or heating to thereby cure the coating.

A monomer having a crosslink-able functional group may be used in place of or besides the monomer having two or more ethylenically unsaturated groups to thereby introduce crosslinkable functional groups into a polymer. By reacting these crosslinkable functional groups, a crosslinked structure can be introduced into the binder polymer.)

Examples of the crosslinkable functional group include isocyanate, epoxy, aziridine, oxazoline, aldehyde, carbonyl, hydrazine, carboxyl, methylol, and active methine groups. Vinylsulfonic acids, acid anhydrides, cyanoacrylate derivatives, melamine, etherified methylol compounds, esters and urethanes, and metal alkoxides such as tetramethoxysilane are also usable as monomers for introducing a crosslinked structure. A functional group which comes to show crosslinkability as a result of a decomposition reaction, such as a blocked isocyanate group, may also be used. Namely, the crosslinkable functional groups in the invention may be ones which initially have no reactivity but come to show reactivity as a result of decomposition.

A binder polymer having those functional groups can be made to have a crosslinked structure by heating after application.

For the purpose of imparting antiglare properties, matting particles which are larger than the filler particles and have an average particle diameter of 1.0-10.0 μm, preferably 1.5-7.0 μm, are incorporated in the antiglare hard coat layer. For example, particles of an inorganic compound or resin particles are incorporated.

Specific examples of the matting particles include particles of inorganic compounds, such as silica particles and $TiO_2$ particles; and resin particles such as crosslinked-acrylic particles, crosslinked-styrene particles, melamine resin particles, and benzoguanamine resin particles. Of these, crosslinked-styrene particles are preferred.

The shape of the matting particles may be either spherical or irregular.

Two or more different kinds of matting particles may be used in combination.

The matting particles are incorporated in the antiglare hard coat layer so that the amount of the matting particles in the antiglare hard coat layer formed is preferably 10-1,000 mg/m$^2$, more preferably 30-100 mg/m$^2$.

In an especially preferred embodiment, crosslinked-styrene particles are used as the matting particles and 40-100% of all the crosslinked styrene particles are accounted for by crosslinked-styrene particles each having a particle diameter larger than one-half the thickness of the antiglare hard coat layer. A particle size distribution of the matting particles is determined by the Coulter counter method and this distribution determined is converted to a particle number distribution.

Matting particles of two or more kinds differing in particle diameter may be used in combination. It is possible to impart antiglare properties with matting particles having a larger particle diameter and to impart other optical properties with matting particles having a smaller particle diameter. For example, the application of an antireflection film to high-resolution displays of 133 dpi or higher may result in the phenomenon called glittering, and the optical ability to prevent this phenomenon is required. This phenomenon is attributable to delicate recesses and protrusions present on the film surface which enlarge or contract pixels to impair display evenness. This phenomenon can be considerably mitigated by using the matting particles for imparting antiglare properties in combination with matting particles having a particle diameter smaller than those matting particles by 5-50%.

It is preferred that the particle diameter distribution of the matting particles be a monodisperse one. The closer the particle diameters of all particles to one value, the better. For example, when particles each having a particle diameter larger than the average particle diameter by 20% or more are referred to as coarse particles, then the proportion of the coarse particles is preferably 1% or lower, more preferably 0.1% or lower, even more preferably 0.01% or lower, in terms of proportion by number to all particles. Matting particles having such a particle diameter distribution are obtained by conducting classification after an ordinary synthesis reaction. A matting material having a more preferred distribution can be obtained by increasing the number of classification operations or heightening the degree of classification.

It is preferred that the antiglare hard coat layer should contain an inorganic filler comprising an oxide of at least one metal selected from zirconium, titanium, aluminum, indium, zinc, tin, and antimony and having an average particle diameter of 0.2 μm or smaller, preferably 0.1 μm or smaller, more preferably 0.06 μm or smaller, besides the matting particles so as to have an increased refractive index.

Conversely, in the case of an antiglare hard coat layer containing high-refractive-index matting particles so as to attain a larger difference in refractive index between the binder and the matting particles, it is also preferred to use an oxide of silicon so that the layer retains a relatively low refractive index. The preferred range of the particle diameter thereof is the same as that of the inorganic filler described above.

Examples of the inorganic filler to be used in the antiglare hard coat layer include $TiO_2$, $ZrO_2$, $Al_2O_3$, $In_2O_3$, $ZnO$, $SnO_2$, $Sb_2O_3$, ITO (indium-tin oxide), and $SiO_2$. $TiO_2$ and $ZrO_2$ are especially preferred from the standpoint of heightening refractive index.

It is preferred that the surface of the inorganic filler be subjected to a silane coupling treatment or titanate coupling treatment. It is preferred to use a surface-treating agent which imparts to the filler surface a functional group capable of reacting with a binder species.

The amount of those inorganic fillers to be added is preferably 10-90% by mass, more preferably 20-80% by mass, especially preferably 30-75% by mass, based on the whole antiglare hard coat layer.

Such a filler does not cause scattering because its particle diameter is sufficiently smaller than the wavelengths of visible light. A dispersion of this filler in a binder polymer hence functions as an optically homogeneous substance.

The overall refractive index of the mixture of the binder and inorganic filler in the antiglare hard coat layer in the invention is preferably 1.48-2.00, more preferably 1.50-1.80. The refractive index may be regulated so as to be in that range by selecting the kinds of the binder and inorganic filler and the proportions thereof. How to select these can be found experimentally beforehand.

The antiglare hard coat layer in the invention may be formed from a coating solution which contains either of a fluorochemical surfactant and a silicone surfactant or both for the purpose of, in particular, inhibiting planar defects such as coating unevenness, drying unevenness, and spot defects to thereby secure planar evenness. To use a fluorochemical surfactant is especially preferred because this surfactant, even when added in a smaller amount, produces the effect of mitigating planar defects such as coating unevenness, drying unevenness, and spot defects in the antireflection film of the invention.

Preferred examples of the fluorochemical surfactant include perfluoroalkyl-containing oligomers such as Megafac F-171, F-172, F-173, and F-176 (trade names), manufactured by Dainippon K.K. & Chemicals, Inc. Examples of the silicone surfactant include polydimethylsiloxanes modified at a side chain or main-chain end with any of various substituents such as oligomers of, e.g., ethylene glycol or propylene glycol.

However, use of a surfactant such as those shown above poses the following problem. In the antiglare hard coat layer obtained, functional groups containing fluorine atoms and/or functional groups having silicon atoms are present in a higher concentration in the surface of the layer. This antiglare hard coat layer hence has a reduced surface energy. As a result, the formation of a low-refractive-index layer over this antiglare hard coat layer results in impaired antireflection performance. This problem is presumed to be attributable to the following. The coating solution for forming the low-refractive-index layer shows impaired wetting properties and, hence, the low-refractive-index layer formed has enhanced film thickness unevenness which is too fine to detect visually. In overcoming this problem, it is effective to regulate the structure and addition amount of the fluorochemical and/or silicone surfactant and thereby regulate the surface energy of the antiglare layer to preferably 25-70 mN·m$^{-1}$, more preferably 35-70 mN·m$^{-1}$. It was further found that to use a coating solution for low-refractive-index layer formation in which 50-100% by mass of the solvent is accounted for by one or more compounds having a boiling point of 100° C. or lower is effective as will be described later. In order for the antiglare layer to have that surface energy, the layer should satisfy the following. When the layer is examined by X-ray photoelectron spectroscopy, the ratio of the peak attributable to fluorine atoms to the peak attributable to carbon atoms, F/C, is 0.40 or lower and/or the ratio of the peak attributable to silicon atoms to the peak attributable to carbon atoms, Si/C, is 0.30 or lower.

The thickness of the antiglare hard coat layer is preferably 1-10 μm, more preferably 1.2-6 μm.

In the antireflection film of the invention, a smooth hard coat layer which does not have antiglare properties is also advantageously used for the purpose of improving film strength. This smooth hard coat layer is disposed between the transparent substrate and the antiglare hard coat layer.

The materials to be used for forming the smooth hard coat layer are the same as those enumerated above with regard to the antiglare hard coat layer, except that the matting particles for imparting antiglare properties are not used. Namely, the smooth hard coat layer is constituted of a binder and an inorganic filler.

In the smooth hard coat layer in the invention, the inorganic filler preferably is silica or alumina, especially silica, from the standpoints of strength and suitability for general-purpose use. It is preferred that the surface of the inorganic filler be treated with a silane coupling agent. It is preferred to use a surface-treating agent which imparts to the filler surface a functional group capable of reacting with a binder species.

The amount of those inorganic fillers to be added is preferably 10-90% by mass, more preferably 20-80% by mass, especially preferably 30-75% by mass, based on the whole hard coat layer. The thickness of the smooth hard coat layer is preferably 1-10 μm, more preferably 1.2-6 μm.

The low-refractive-index layer in the invention will be explained below.

The refractive index of the low-refractive-index layer in the antireflection film of the invention is in the range of preferably 1.38-1.49, more preferably 1.38-1.44.

It is preferred from the standpoint of reducing reflectance that the low-refractive-index layer should satisfy the following numerical expression (I).

$$m\lambda/4 \times 0.7 < n_1 d_1 < m\lambda/4 \times 1.3 \qquad \text{numerical expression (I)}$$

In the expression, m is a positive odd number; $n_1$ is the refractive index of the low-refractive-index layer; $d_1$ is the thickness (nm) of the low-refractive-index layer; and λ is a value of wavelength in the range of 500-550 nm.

To satisfy numerical expression (I) means that there is a value of m (positive odd number, which usually is 1) satisfying numerical expression (I) in that wavelength range.

Materials for constituting the low-refractive-index layer in the invention will be explained below.

It is preferred in the invention that the binder polymer for the low-refractive-index layer be a heat-curable and/or ionizing-radiation-curable fluoropolymer. The structure of the fluorine-containing monomer units contained in the fluoropolymer is not particularly limited. Examples thereof include the monomer units derived from fluorine-containing olefins (e.g., fluoroethylene, vinylidene fluoride, tetrafluoroetbylene, hexafluoropropylene, and perfluoro-2,2-dimethyl-1,3-dioxole), perfluoroalkyl vinyl ethers, vinyl ethers and (meth)acrylates having a fluorine-containing alkyl group, and perfluorinated alkyl ester derivatives (e.g., Biscoat 6FM (trade name; manufactured by Osaka Organic Chemical Industry Ltd.) and M-2020 (trade name; manufactured by Daikin Industries, Ltd.). From the standpoints of suitability for production and properties required of the low-refractive-index layer, such as refractive index and film strength, the fluoropolymer preferably is a copolymer of one or more fluorine-containing olefins and one or more vinyl ethers, and more preferably is a copolymer of one or more perfluoroolefins and one or more vinyl ethers. The fluoropolymer may contain units derived from comonomer ingredients such as a perfluoroalkyl vinyl ether and a vinyl ether or (meth)acrylate having a fluorine-containing alkyl group so as to have a reduced refractive index. It is preferred in the invention that one or more fluorine-containing vinyl monomers be introduced so as to produce a copolymer having a fluorine content of 20-60% by mass. The fluorine content of the polymer is more preferably 25-55% by mass, especially preferably 30-50% by mass.

The perfluoroolefins preferably are ones having 3-7 carbon atoms. From the standpoint of reactivity in polymerization, perfluoropropylene or perfluorobutylene is preferred. From the standpoint of availability, perfluoropropylene is especially preferred.

The perfluoroolefin content in the polymer may be 25-75% by mole. For imparting a lower refractive index to the material, it is desired to heighten the degree of perfluoroolefin introduction. However, from the standpoint of reactivity in polymerization, the amount of perfluoroolefins which can be introduced through general radical polymerization reaction conducted in a solution system is about 50-70% by mole at the most, and it is difficult to introduce in an amount larger than that. In the invention, the content of perfluoroolefin units is preferably 30-70% by mole, more preferably 30-60% by mole, even more preferably 35-60% by mole, especially preferably 40-60% by mole.

A perfluoroalkyl vinyl ether represented by the following M2 may be copolymerized in the invention in order to attain a lower refractive index. The amount of units derived from this comonomer ingredient introduced into the polymer may be 0-40% by mole, and is preferably 0-30% by mole, more preferably 0-20% by mole, especially preferably 0-15% by mole.

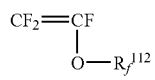

M2

In M2, $Rf^{112}$ represents a fluorine-containing alkyl group having 1-30 carbon atoms, preferably 1-20 carbon atoms, especially preferably 1-10 carbon atoms. $Rf^{112}$ more preferably is a perfluoroalkyl group having 1-10 carbon atoms. This fluorinated alkyl group may have one or more substituents. Examples of $Rf^{112}$ include —$CF_3$ {M2-(1)}, —$CF_2CF_3$ {M2-(2)}, —$CF_2CF_2CF_3$ {M2-(3)}, and —$CF_2CF(OCF_2CF_2CF_3)CF_3$ {M2-(4)}.

(Hydroxyl-Containing Vinyl Monomer Unit)

The fluoropolymer to be used in the invention can contain hydroxyl-containing vinyl monomer units. The content of these units is not particularly limited. Hydroxyl groups function to react with a crosslinking agent to cure the polymer. Because of this, higher hydroxyl group contents enable the formation of rigid films and are hence preferred. The content thereof is preferably 10-70% by mole, and is more preferably higher than 20% by mole and 60% by mole or lower, even more preferably 25-55% by mole.

Any hydroxyl-containing vinyl monomer selected from, e.g., vinyl ethers, (meth)acrylates, styrene compounds, and the like can be used without particular limitations as long as it is copolymerizable with the fluorine-containing vinyl monomer units described above. For example, in the case where a perfluoroolefin (e.g., hexafluoropropylene) is used as the fluorine-containing vinyl monomer, it is preferred to use a hydroxyl-containing vinyl ether having satisfactory copolymerizability. Examples thereof include 2-hydroxyethyl vinyl ether, 4-hydroxybutyl vinyl ether, 6-hydroxyhexyl vinyl ether, 8-hydroxyoctyl vinyl ether, diethylene glycol vinyl ether, triethylene glycol vinyl ether, and 4-(hydroxymethyl)cyclohexylmethyl vinyl ether. However, the vinyl ether should not be construed as being limited to these examples.

A vinyl ether having a fluorine-containing alkyl group and represented by the following M1 may be copolymerized in the invention in order to attain a lower refractive index. The amount of units derived from this comonomer ingredient introduced into the polymer may be 0-40% by mole, and is preferably 0-30% by mole, especially preferably 0-20% by mole.

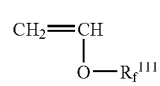

M1

In M1, $Rf^{111}$ represents a fluorine-containing alkyl group having 1-30 carbon atoms, preferably 1-20 carbon atoms, especially preferably 1-15 carbon atoms. This alkyl group may have a linear structure {e.g., —$CF_2CF_3$, —$CH_2(CF_2)_aH$, or —$CH_2CH_2(CF_2)$, (a: integer of 2-12)}, a branched structure {e.g., —$CH(CF_3)_2$, —$CH_2CF(CF_3)_2$, —$CH(CH_3)CF_2CF_3$, or —$CH(CH_3)(CF_2)_5CF_2H$}, or an alicyclic structure (preferably, 5- or 6-membered ring, e.g., perfluorocyclohexyl, perfluorocyclopentyl, or an alkyl group substituted by these). Furthermore, the alkyl group may have an ether bond {e.g., —$CH_2OCH_2CF_2CF_3$, —$CH_2CH_2OCH_2(CF_2)_bH$, —$CH_2CH_2OCH_2(CF_2)_bF$ (b: integer of 2-12), or —$CH_2CH_2OCF_2CF_2OCF_2CF_2H$}. The substituent represented by $Rf^{111}$ should not be construed as being limited to the substituents shown above.

The monomer represented by M1 can be synthesized by: a method in which a fluorine-containing alcohol is caused to act on a leaving-group-substituted alkyl vinyl ether compound such as a vinyloxyalkylsulfonate or vinyloxyalkyl chloride in the presence of a base catalyst as described in, e.g., *Macromolecules*, Vol. 32 (21), p. 7122 (1999) and JP-A-2-721; a method in which a fluorine-containing alcohol is mixed with a vinyl ether, e.g., butyl vinyl ether, in the presence of a palladium catalyst to conduct vinyl group exchange as described in International Patent Application No. 92/05135, pamphlet; or a method in which a fluorine-containing ketone is reacted with dibromoethane in the presence of a potassium fluoride catalyst and an HBr-eliminating reaction is then conducted with an alkali catalyst as described in U.S. Pat. No. 3,420,793.

Examples of the constituent units for imparting reactivity in crosslinking include constituent units obtained by the polymerization of a monomer which itself has a self-crosslinkable functional group in the molecule, such as glycidyl(meth)acrylate or glycidyl vinyl ether, constituent units obtained by the polymerization of a monomer having a carboxyl, hydroxy, amino, or sulfo group or the like (e.g., (meth)acrylic acid, methylol (meth)acrylate, hydroxyalkyl(meth)acrylate, allyl acrylate, hydroxyethyl vinyl ether, hydroxybutyl vinyl ether, maleic acid, or crotonic acid), and constituent units obtained by introducing a group having reactivity in crosslinking, e.g., a (meth)acryloyl group, into those constituent units by a polymer reaction (for example, the group can be introduced by causing acryloyl chloride to act on a hydroxy group).

The copolymer may be one which has repeating units having a (meth)acryloyl group in a side chain as an essential constituent ingredient. This copolymer also is preferred.

Higher proportions of these repeating units containing a (meth)acryloyl group improve coating film strength but result in an increased refractive index. In general, the repeating units containing a (meth)acryloyl group account for preferably 5-90% by mass, more preferably 30-70% by mass, especially preferably 40-60% by mass, of the copolymer, although the proportion thereof varies depending on the kind of the repeating units derived from a fluorine-containing vinyl monomer.

In producing a copolymer useful in the invention, other suitable vinyl monomers may be copolymerized to introduce repeating units besides repeating units derived from the fluorine-containing monomers and repeating units having a (meth)acryloyl group in a side chain, from various standpoints such as, e.g., adhesion to the base, polymer $T_g$ (which contributes to coating film hardness), solubility in solvents, transparency, slipping properties, and dustproof/antifouling properties. Such vinyl monomers may be used in combination of two or more thereof according to purposes, and the total proportion of the units thereof introduced in the copolymer may be in the range of preferably 0-65% by mole, more preferably 0-40% by mole, especially preferably 0-30% by mole, based on the copolymer.

The vinyl monomers which can be used are not particularly limited. Examples thereof include olefins (e.g., ethylene, propylene, isoprene, vinyl chloride, and vinylidene chloride), acrylic esters (e.g., methyl acrylate, ethyl acrylate, 2-ethylhexyl acrylate, and 2-hydroxyethyl acrylate), methacrylic esters (e.g., methyl methacrylate, ethyl methacrylate, butyl methacrylate, and 2-hydroxyethyl methacrylate), styrene derivatives (e.g., styrene, p-hydroxymethylstyrene, and p-methoxystyrene), vinyl ethers (e.g., methyl vinyl ether, ethyl vinyl ether, cyclohexyl vinyl ether, hydroxyethyl vinyl ether, and hydroxybutyl vinyl ether), vinyl esters (e.g., vinyl acetate, vinyl propionate, and vinyl cinnamate), unsaturated carboxylic acids (e.g., acrylic acid, methacrylic acid, crotonic acid, maleic acid, and itaconic acid), acrylamide derivatives (e.g., N,N-dimethylacrylamide, N-tert-butylacrylamide, and N-cyclohexylacrylamide), methacrylamide derivatives (e.g., N,N-dimethylmethacrylamide), and acrylonitrile.

In the invention, it is preferred to use a fluorine-containing polymer represented by the following formula 1.

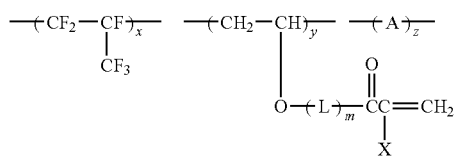

Formula 1

In formula 1, L represents a connecting group having 1-10 carbon atoms, more preferably 1-6 carbon atoms, especially preferably 2-4 carbon atoms. This connecting group may have a linear or branched structure or a cyclic structure, and may have one or more heteroatoms selected from oxygen, nitrogen, and sulfur atoms.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—, "—CONH—$(CH_2)_3$—O—, *—$CH_2CH(OH)CH_2$—O—**, and *—$CH_2CH_2OCONH(CH_2)_3$—O—*" (* indicates the connecting site on the polymer main chain side, and ** indicate the connecting site on the (meth)acryloyl group side). Symbol m represents 0 or 1.

In formula 1, X represents a hydrogen atom or methyl. From the standpoint of reactivity in curing, X more preferably is a hydrogen atom.

In formula 1, A represents a repeating unit derived from any desired vinyl monomer. This repeating unit is not particularly limited as long as it is a constituent ingredient derived from a monomer copolymerizable with hexafluoropropylene. The repeating unit may be suitably selected from various standpoints such as, e.g., adhesion to the base, polymer $T_g$ (which contributes to coating film hardness), solubility in solvents, transparency, slipping properties, and dustproof/antifouling properties. The repeating units A may be constituted of one kind of vinyl monomer or of two or more kinds of vinyl monomers according to purposes.

Preferred examples of the vinyl monomer include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, and allyl vinyl ether, vinyl esters such as vinyl acetate, vinyl propionate, and vinyl butyrate, (meth)acrylates such as methyl(meth)acrylate, ethyl(meth)acrylate, hydroxyethyl(meth)acrylate, glycidyl methacrylate, allyl(meth)acrylate, and (meth)acryloyloxypropyltrimethoxysilane, styrene and styrene derivatives such as p-hydroxymethylstyrene, and unsaturated carboxylic acids such as crotonic acid, maleic acid, and itaconic acid and derivatives thereof. More preferred are vinyl ethers and vinyl esters. Especially preferred are vinyl ethers.

Symbols x, y, and z represent the proportions, in terms of % by mole, of the respective components, and are numbers satisfying $30 \leq x \leq 60$, $5 \leq y \leq 70$, and $0 \leq z \leq 65$. They preferably satisfy $35 \leq x \leq 55$, $30 \leq y \leq 60$, and $0 \leq z \leq 20$, and especially preferably satisfy $40 \leq x \leq 55$, $40 \leq y \leq 55$, and $0 \leq z \leq 10$. In formula 1, x+y+z=100.

Especially preferred embodiments of the copolymer for use in the invention are represented by formulae 2 and 3.

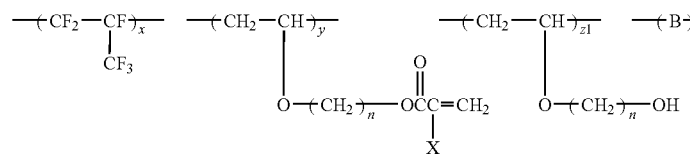

Formula 2

In formula 2, X, x, and y have the same meanings as in formula 1 and the preferred ranges thereof also are the same as in formula 1.

Symbol n represents an integer satisfying $2 \leq n \leq 10$, preferably $2 \leq n \leq 6$, especially preferably $2 \leq n \leq 4$.

B represents a repeating unit derived from any described vinyl monomer. The repeating units may have a single composition or be constituted of two or more compositions. Examples thereof may be the same as those shown above as examples of A in formula 1.

Symbols z1 and z2 represent the proportions, in terms of mol %, of the respective repeating units, and are numbers satisfying $0 \leq z1 \leq 65$ and $0 \leq z2 \leq 65$. They preferably satisfy $0 \leq z1 \leq 30$ and $0 \leq z2 \leq 10$, especially preferably $0 \leq z1 \leq 10$ and $0 \leq z2 \leq 5$. In formula 2, $x+y+z1+z2=100$.

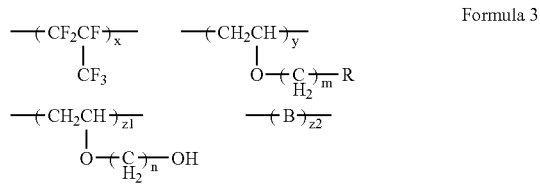

Formula 3

In formula 3, R represents an alkyl group having 1-10 carbon atoms or (meth)acryloyloxy group.

Symbol m represents an integer satisfying $1 \leq m \leq 10$, preferably $1 \leq m \leq 6$, especially preferably $1 \leq m \leq 4$.

Symbol n represents an integer satisfying $2 \leq n \leq 10$, preferably $2 \leq n \leq 6$, especially preferably $2 \leq n \leq 4$.

B represents a repeating unit derived from any vinyl monomer. The repeating units may have a single composition or be constituted of two or more compositions, and may have a silicone moiety.

Symbols x, y, z1, and z2 represent the proportions, in terms of mol %, of the respective repeating units. Symbols x and y are numbers respectively satisfying preferably $30 \leq x \leq 60$ and $0 \leq y \leq 70$, more preferably $35 \leq x \leq 55$ and $0 \leq y \leq 60$, especially preferably $40 \leq x \leq 55$ and $0 \leq y \leq 55$. Symbols z1 and z2 are numbers satisfying preferably $1 \leq z1 \leq 65$ and $1 \leq z2 \leq 65$, more preferably $1 \leq z1 \leq 40$ and $1 \leq z2 \leq 10$, especially preferably $1 \leq z1 \leq 30$ and $1 \leq z2 \leq 5$. In formula 3, $x+y+z1+z2=100$.

The copolymers represented by formulae 1 to 3 can be synthesized, for example, by introducing (meth)acryloyl groups into a copolymer comprising hexafluoropropylene units and hydroxyalkyl vinyl ether units.

Copolymers useful in the invention preferably are the copolymers shown in JP-A-2004-45462, paragraphs [0043] to [0047].

Copolymers for use in the invention can be synthesized by the method described in JP-A-2004-45462. Copolymers for use in the invention can be synthesized by any of various polymerization methods other than that. For example, the copolymers may be produced by synthesizing a precursor such as, e.g., a hydroxyl-containing polymer by solution polymerization, precipitation polymerization, suspension polymerization, bulk polymerization, or emulsion polymerization and then introducing (meth)acryloyl groups into the precursor by the polymer reaction. The polymerization reaction can be conducted by a known operation such as, e.g., a batch, semicontinuous, or continuous process.

Examples of methods for polymerization initiation include a method in which a free-radical initiator is used and a method in which the monomers are irradiated with an ionizing radiation. Those polymerization methods and methods for polymerization initiation are described in, e.g., Teiji Tsuruta, *Kōbunshi Gōsei Hōhō*, revised edition, The Nikken Kogyo Shinbun, Ltd., 1971 and Takayuki Ohtsu and Masaetsu Kinoshita, *Kōbunshi Gōsei No Jikken-hō*, Tokyo Kagaku Dozin Co., Ltd., 1972, pp. 124-154.

Especially preferred of those polymerization methods is the solution polymerization method using a free-radical initiator. For the solution polymerization method may be used any one of or a mixture of two or more of various organic solvents such as ethyl acetate, butyl acetate, acetone, methyl ethyl ketone (MEK), methyl isobutyl ketone (MK), cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. A mixed solvent comprising water and one or more of these organic solvents may also be used.

The polymerization temperature should be determined while taking account of the molecular weight of the polymer to be produced, kind of the initiator, etc. Although temperatures ranging from below 0° C. to above 100° C. are possible, it is preferred to conduct the polymerization at a temperature in the range of 50-100° C.

A suitably selected reaction pressure can be used. However, the pressure is generally desirably 1-100 kPa, especially about 1-30 kPa. The reaction time may be about 5-30 hours.

For the reprecipitation of the polymer obtained, it is preferred to use a solvent such as isopropanol, hexane, methanol, or the like.

From the standpoints of solubility in solvents, coating film transparency, etc., monomers containing no fluorine atom may be suitably copolymerized to incorporate units other than the fluorine-containing monomer units and constituent units for imparting reactivity in crosslinking. The monomers which can be optionally used are not particularly limited, and examples thereof include olefins (e.g., ethylene, propylene, isoprene, vinyl chloride, and vinylidene chloride), acrylic esters (e.g., methyl acrylate, ethyl acrylate, and 2-ethylhexyl acrylate), methacrylic esters (e.g., methyl moethacrylate, ethyl methacrylate, butyl methacrylate, and ethylene glycol dimethacrylate), styrene derivatives (e.g., styrene, divinylbenzene, vinyltoluene, and α-methylstyrene), vinyl ethers (e.g., methyl vinyl ether, ethyl vinyl ether, and cyclohexyl vinyl ether), vinyl esters (e.g., vinyl acetate, vinyl propionate, and vinyl cinnamate), acrylamide derivatives (e.g., N-tert-butylacrylamide and N-cyclohexylacrylamide), methacrylamide derivatives, and acrylonitrile derivatives.

The polymers described above may be suitably used in combination with a hardener as described in JP-A-10-25388 and JP-A-10-147739.

An especially useful fluoropolymer in the invention is a random copolymer of a perfluoroolefin and either a vinyl ether or a vinyl ester. It is especially preferred that this copolymer should have groups capable of undergoing a self-crosslinking reaction (e.g., radical-reactive groups such as (meth)acryloyl groups or groups undergoing ring-opening polymerization, such as epoxy groups or oxetanyl groups). It is preferred that monomer units containing such a group having reactivity in crosslinking account for 5-70 mol %, especially preferably 30-60 mol %, of all monomer units in the polymer.

It is preferred that the fluoropolymer in the invention have a polysiloxane structure introduced therein for the purpose of imparting antifouling properties. Methods for introducing a polysiloxane structure are not particularly limited. However, preferred methods are: a method in which a polysiloxane block comonomer ingredient is introduced using a silicone macro-azo initiator as described in, e.g., JP-A-11-189621, JP-A-11-228631, and JP-A-2000-313709; and a method in which a polysiloxane graft comonomer ingredient is introduced using a silicone macromer as described in JP-A-2-251555 and JP-A-2-308806. The proportion of these polysiloxane ingredients is preferably 0.5-10% by mass, especially preferably 1-5% by mass, based on the polymer.

Besides the technique described above, a method effective in imparting antifouling properties is to add a polysiloxane containing a reactive group (e.g., KF-100T, X-22-169AS, KF-102, X-22-3701IE, X-22-164B, X-22-5002, X-22-173B, X-22-174D, X-22-167B, and X-22-161AS (trade names; manufactured by Shin-Etsu Chemical Co., Ltd.); AK-5, AK-30, and AK-32 (trade names; manufactured by Toagosei Co., Ltd.); and Silaplane FM0725 and Silaplane FM0721 (trade names; manufactured by Chisso Corp.). In this case, these polysiloxanes are added in an amount in the range of preferably 0.5-10% by mass, especially preferably 1-5% by mass, based on all solid components of the low-refractive-index layer.

The inorganic filler to be used in the low-refractive-index layer preferably is one having a low refractive index. A preferred inorganic filler comprises at least one member selected from the group consisting of inorganic particles, hollow silica particles, and magnesium fluoride. Especially preferred are inorganic particles of silica, hollow silica particles, and magnesium fluoride. More preferred are hollow silica particles. It is especially preferred in the invention that at least either of the inorganic particles and the hollow silica particles have been surface-treated with an organosilane compound represented by formula (A) given above. At least either of the inorganic particles and the hollow silica particles may have been surface-treated with an organosilane compound represented by formula (B) given above.

The average particle diameter of the inorganic filler is preferably 0.001-0.2 μm, more preferably 0.001-0.05 μm. It is preferred that the particle diameters of the filler be as even as possible (monodisperse).

The average particle diameter of the silica particles is preferably 30-150%, more preferably 35-80%, even more preferably 40-60%, of the thickness of the low-refractive-index layer. Namely, when the thickness of the low-refractive-index layer is 100 nm, the particle diameter of the silica particles is preferably 30-150 nm, more preferably 35-80 nm, even more preferably 40-60 nm.

Too small particle diameters of the silica particles result in a decrease in the effect of improving marring resistance. Too large particle diameters thereof result in the formation of fine recesses and protrusions on the surface of the low-refractive-index layer and this results in an impaired appearance such as black contraction and in an impaired integrated reflectance. The silica particles may be either crystalline or amorphous, and may be either monodisperse particles or aggregates which satisfy the given particle-diameter requirement. The shape thereof most preferably is spherical. However, particles of irregular shapes may be satisfactorily used. The average particle diameter of the inorganic particles is determined through a measurement with a Coulter counter.

It is preferred to use hollow silica particles for reducing the refractive index of the low-refractive-index layer. The refractive index of the hollow silica particles is preferably 1.15-1.40, more preferably 1.17-1.35, most preferably 1.17-1.30. The refractive index of the hollow silica particles means the refractive index of the whole particles and does not mean the refractive index of the silica shells only, which constitute the hollow silica particles. In the hollow silica particles, the porosity x represented by the following numerical expression (VIII):

$$x = (4\pi a^3/3)/(4\pi b^3/3) \times 100 \qquad \text{(Numerical expression VIII)}$$

wherein a is the radius of the cavity of each particle and b is the radius of the particle shell, is preferably 10-60%, more preferably 20-60%, most preferably 30-60%. Particles having a refractive index of 1.15 or higher are preferred from the standpoint of marring resistance because such hollow particles have a sufficiently large shell thickness and satisfactory particle strength.

Processes for producing hollow silica are described in, e.g., JP-A-2001-233611 and JP-A-2002-79616. Especially preferred are particles each comprising a shell which has a cavity inside and in which the pores have been closed. The refractive index of such hollow silica particles can be calculated by the method described in JP-A-2002-79616.

The amount of the hollow silica to be deposited by coating is preferably 1-100 mg/m$^2$, more preferably 5-80 mg/m$^2$, even more preferably 10-60 mg/m$^2$. Too small amounts thereof result in decreases in the effect of lowering refractive index and in the effect of improving marring resistance. Too large amounts thereof result in the formation of fine recesses and protrusions on the surface of the low-refractive-index layer and this results in an impaired appearance such as black contraction and in an impaired integrated reflectance.

The average particle diameter of the hollow silica is preferably 30-150%, more preferably 35-80%, even more preferably 40-60%, of the thickness of the low-refractive-index layer. Namely, when the thickness of the low-refractive-index layer is 100 nm, the particle diameter of the hollow silica particles is preferably 30-150 nm, more preferably 35-100 nm, even more preferably 40-65 nm.

In case where the particle diameter of the hollow silica particles is too small, the proportion of cavities is reduced and a reduction in refractive index cannot be expected. On the other hand, too large particle diameters thereof result in the formation of fine recesses and protrusions on the surface of the low-refractive-index layer and this results in an impaired appearance such as black contraction and in an impaired integrated reflectance. The hollow silica particles may be either crystalline or amorphous, and preferably are monodisperse particles. Although the shape thereof most preferably is spherical, hollow particles of irregular shapes may be satisfactorily used.

Hollow silica particles of two or more kinds differing in average particle size can be used in combination. The average particle diameter of hollow silica can be determined from an electron photomicrograph.

The specific surface area of the hollow silica in the invention is preferably 20-300 m$^2$/g, more preferably 30-120 m$^2$/g, most preferably 40-90 m$^2$/g. The specific surface area can be determined by the BET method using nitrogen.

Solid silica particles can be used in combination with the hollow silica in the invention. The particle size of the solid silica particles is preferably 30-150 nm, more preferably 35-100 nm, most preferably 40-80 nm.

Furthermore, at least one kind of silica particles having an average particle diameter less than 25% of the thickness of the low-refractive-index layer (referred to as "silica particles of a smaller particle diameter") may be used in combination with silica particles having the particle diameter described above (referred to as "silica particles of a larger particle diameter").

The silica particles of a smaller particle diameter can be present in spaces among the silica particles of a larger particle diameter and, hence, can function as an agent for holding the silica particles of a larger particle diameter.

The average particle diameter of the silica particles of a smaller particle diameter is preferably 1-20 nm, more preferably 5-15 nm, especially preferably 10-15 nm. Use of such silica particles is preferred from the standpoints of raw-material cost and holding-agent effect.

The silica particles may have undergone a physical surface treatment such as a plasma discharge treatment or corona discharge treatment or a chemical surface treatment with a surfactant, coupling agent, or the like so as to have enhanced dispersion stability in a dispersion or coating solution or to have enhanced affinity for or bondability by the binder ingredient. To use a coupling agent is especially preferred. Preferred examples of the coupling agent are alkoxymetal compounds (e.g., titanate coupling agents and silane coupling agents). In particular, a treatment with an organosilane compound represented by formula (A) according to the invention or with a silane coupling agent having an acryloyl or methacryloyl group is especially effective.

The coupling agent is used beforehand as a surface-treating agent for the surface treatment of the inorganic filler for the low-refractive-index layer prior to the preparation of a coating solution for forming the layer. It is, however, preferred that the coupling agent be further added as an additive in preparing the coating solution for the layer to thereby incorporate the coupling agent into the layer.

For reducing the burden of the surface treatment, it is preferred that the silica particles be dispersed beforehand in a medium prior to the surface treatment. Specific examples of the surface-treating agent and a catalyst which can be advantageously used in the invention include the organosilane compounds and catalysts described in, e.g., WO 2004/017105.

The inorganic filler may comprise a combination of two or more fillers differing in particle diameter. In particular, use of an inorganic filler having a particle diameter of 0.02-0.05 µm and an inorganic filler having a particle diameter of 0.01 µm or smaller in combination can reconcile reflectance and marring resistance. The proportion of the amount of each of the two inorganic fillers differing in particle diameter can be varied at will between 0 and 100% according to a balance between the desired reflectance and marring resistance. In the case where reflectance is desired to be reduced, it is preferred that most of the inorganic filler be accounted for by that having a smaller particle diameter. When marring resistance is desired to be enhanced, it is preferred to increase the proportion of the inorganic filler having a larger particle diameter.

The amount of the inorganic filler to be added is preferably 5-90% by mass, more preferably 10-70% by mass, especially preferably 10-50% by mass, based on the whole low-refractive-index layer.

It is also preferred that the inorganic filler to be used should be one which has undergone a surface treatment. Examples of the surface treatment include a physical surface treatment such as a plasma discharge treatment or corona discharge treatment and a chemical surface treatment with a coupling agent. However, to use a coupling agent is preferred. Preferred examples of the coupling agent are alkoxymetal compounds (e.g., titanate coupling agents and silane coupling agents) which include the organosilane sol according to the invention. In the case where the inorganic filler is silica, a silane coupling treatment is especially effective.

The organosilane sol according to the invention may be used beforehand as a surface-treating agent for the surface treatment of the inorganic filler for the low-refractive-index layer prior to the preparation of a coating solution for forming the layer. It is, however, preferred that the organosilane sol be further added as an additive in preparing the coating solution for the layer to thereby incorporate the sol into the layer.

In each of the coating solutions to be used for forming the hard coat layer and low-refractive-index layer according to the invention, the solvent may consist of a single solvent or a mixture of two or more solvents. In the case of a mixture, the proportion of one or more solvents having a boiling point of 100° C. or lower is preferably 50-100% by mass, more preferably 80-100% by mass, even more preferably 90-100% by mass, especially preferably 100% by mass, based on all solvents. Too low proportions of solvents having a boiling point of 100° C. or lower are undesirable because the results are an exceedingly low drying rate, impaired coating film surface state, and unevenness of coating film thickness. There is hence a possibility that optical properties including reflectance might become worse. In the invention, this problem can be eliminated by using a coating solution containing a larger proportion of one or more solvents having a boiling point of 100° C. or lower.

Examples of the solvents having a boiling point of 100° C. or lower include hydrocarbons such as hexane (boiling point, 68.7° C.; hereinafter "° C." is omitted), heptane (98.4), cyclohexane (80.7), and benzene (80.1), halogenated hydrocarbons such as dichloromethane (39.8), chloroform (61.2), carbon tetrachloride (76.8), 1,2-dichloroethane (83.5), and trichloroethylene (87.2), ethers such as diethyl ether (34.6), diisopropyl ether (68.5), dipropyl ether (90.5), and tetrahydrofuran (66), esters such as ethyl formate (54.2), methyl acetate (57.8), ethyl acetate (77.1), and isopropyl acetate (89), ketones such as acetone (56.1) and 2-butanone (=methyl ethyl ketone, 79.6), alcohols such as methanol (64.5), ethanol (78.3), 2-propanol (82.4), and 1-propanol (97.2), cyano compounds such as acetonitrile (81.6) and propinonitrile (97.4), and carbon disulfide (46.2). Preferred of these are ketones and esters. Especially preferred are ketones. In particular, 2-butanone is preferred of the ketones.

Examples of solvents having a boiling point not lower than 100° C. include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (=MIBK, 115.9), 1-butanol (117.7), N,N-dimethylformamide (153), N,N-dimethylacetamide (166), and dimethyl sulfoxide (189). Preferred are cyclohexanone and 2-methyl-4-pentanone.

Coating solutions for forming the hard coat layer and low-refractive-index layer according to the invention each may be prepared by diluting the ingredients for the layer with a solvent having the composition described above. It is preferred that the concentration of each coating solution be regulated while taking account of the viscosity of the coating solution, specific gravity of a layer material, etc. However, the concentration thereof is preferably 0.1-20% by mass, more preferably 1-10% by mass.

The transparent substrate in the antireflection film of the invention preferably is a plastic film. Examples of the polymer constituting the plastic film include cellulose esters (e.g., triacetyl cellulose and diacetyl cellulose; typical examples include trade names TAC-TD80U, TD80U, and TD80UF, manufactured by Fuji Photo Film Co., Ltd.), polyamides, polycarbonates, polyesters (e.g., poly(ethylene terephthalate) and poly(ethylene naphthalate)), polystyrene, polyolefins, norbornene resins (trade name Arton; manufactured by JSR Co., Ltd.), and amorphous polyolefins (trade name, Zeonex; manufactured by Nippon Zeon Co., Ltd.). Preferred of these are triacetyl cellulose, poly(ethylene terephthalate), and poly(ethylene naphthalate). Especially preferred is triacetyl cellulose.

The triacetyl cellulose is constituted of a single layer or two or more layers. The single-layer triacetyl cellulose may be produced by the drum casting disclosed in, e.g., JP-A-7-11055 or by band casting or the like, while the latter triacetyl cellulose, which is constituted of two or more layers, may be produced by the so-called co-casting process disclosed in, e.g., JP-A-61-94725 and JP-B-62-43846. Specifically, the production processes are as follows. Raw-material flakes are dissolved in a solvent such as a halogenated hydrocarbon solvent (e.g., dichloromethane), alcohol (e.g., methanol, ethanol, or butanol), ester (e.g., methyl formate or methyl acetate), or ether (e.g., dioxane, dioxolane, or diethyl ether), and various additives such as, e.g., a plasticizer, ultraviolet absorber, antioxidant, slip agent, and release agent are added thereto to prepare a solution (referred to as dope). This dope is cast on a support comprising a horizontal endless metallic belt or a rotating drum with a dope supply device (referred to as die). In the case of a single-layer film, one dope thus prepared is cast alone. In the case of a multilayer film, a high-concentration cellulose ester dope is cast together with a low-concentration dope so that the latter dope is disposed on each side of the former dope. The cast is dried to some degree on the support and the resultant film having rigidity is released from the support and then passed through a drying part with any of various conveying devices to remove the solvent.

The solvent for dissolving triacetyl cellulose therein typically is dichloromethane. However, from the standpoints of the global environment and working environment, it is preferred that the solvent should contain substantially no halogenated hydrocarbon, e.g., dichloromethane. The term "contain substantially no halogenated hydrocarbon" means that the proportion of any halogenated hydrocarbon in the organic solvent is less than 5% by mass (preferably less than 2% by mass). For preparing a triacetyl cellulose dope with a solvent containing substantially no dichloromethane or the like, it is essential to employ any of the special dissolution techniques described below.

The first dissolution technique is called a cooling dissolution method, which is explained below. First, triacetyl cellulose is gradually added to a solvent with stirring at a temperature around room temperature (from −10° C. to 40° C.). Subsequently, the mixture is cooled to −100 to −10° C. (preferably −80 to −10° C., more preferably −50 to −20° C., most preferably −50 to −30° C.). This cooling can be conducted, for example, in a dry ice/methanol bath (−75° C.) or in a cooled diethylene glycol solution (−30 to −20° C.). As a result of this cooling, the triacetyl cellulose/solvent mixture solidifies. Furthermore, this solid is heated to 0-200° C. (preferably 0-150° C., more preferably 0-120° C., most preferably 0-50° C.), whereby the mixture becomes a solution in which the triacetyl cellulose flows in the solvent. The heating may be accomplished by merely allowing the solid to stand at room temperature or by heating the solid in a warm bath.

The second technique is called a high-temperature dissolution method, which is explained below. First, triacetyl cellulose is gradually added to a solvent with stirring at a temperature around room temperature (from −10° C. to 40° C.). In preparing a triacetyl cellulose solution in the invention, it is preferred that triacetyl cellulose be added to a mixed solvent comprising various solvents to swell it beforehand. In this method, the concentration in which triacetyl cellulose is dissolved is preferably 30% by mass or lower. However, concentrations on the highest possible level are preferred from the standpoint of drying efficiency in film formation. Subsequently, the organic-solvent mixture is heated to 70-240° C. (preferably 80-220° C., more preferably 100-200° C., most preferably 100-190° C.) at an elevated pressure of 0.2-30 MPa. The solution thus obtained through heating should be cooled to or below the lowest boiling point of the solvents used, because the solution in the hot state cannot be applied. In this case, the general method is to cool the solution to −10 to 50° C. before the pressure is returned to ordinary pressure. This cooling may be accomplished by merely allowing the high-pressure high-temperature vessel or line containing the triacetyl cellulose solution therein to stand at room temperature or by cooling the apparatus with a coolant, e.g., cooling water, the latter method is preferred. A cellulose acetate film containing substantially no halogenated hydrocarbon such as dichloromethane and a process for producing the film are described in *Journal of Technical Disclosure*, Publication No. 2001-1745, published on Mar. 15, 2001, Japan Institute of Invention and Innovation (hereinafter abbreviated as "Technical Disclosure No. 2001-1745").

In the case where the antireflection film of the invention is to be applied to a display, e.g., a liquid-crystal display, it is disposed on the outermost surface of the display, for example, after a pressure-sensitive adhesive layer is formed on one side of the film. In the case where the transparent substrate is triacetyl cellulose, it is preferred from the standpoint of cost that the antireflection film of the invention be used as it is as a protective film because triacetyl cellulose is used as the protective film for protecting the polarizing layer of the polarizing plate.

When the antireflection film of the invention is to be disposed on the outermost surface of a display after formation of a pressure-sensitive adhesive layer on one side thereof or to be used without any treatment as a polarizer-protective film, then it is preferred to form on the transparent substrate an outermost layer consisting mainly of a fluoropolymer and then conduct a saponification treatment for the purpose of attaining sufficient adhesion. The saponification treatment may be conducted by a known technique, e.g., by immersing the film in an alkali solution for an appropriate time period. It is preferred that after the immersion in an alkali solution, the film be sufficiently washed with water or immersed in a dilute acid to neutralize the alkali ingredient so as not to allow the alkali ingredient to remain in the film.

By the saponification treatment, that surface of the transparent substrate which is on the side opposite to the outermost layer is hydrophilized.

The surface hydrophilized is especially effective in improving adhesion to a polarizing film comprising poly(vinyl alcohol) as the main component. Furthermore, the surface hydrophilized is less apt to suffer the adhesion of airborne dust particles thereto and, hence, when this antireflection film is bonded to a polarizing film, dust particles are less apt to come between the polarizing film and the antireflection film. Consequently, the saponification treatment is effective in preventing spot defects attributable to dust particles.

It is preferred that the saponification treatment be conducted so that the transparent-substrate surface on the side opposite to the outermost layer comes to have a contact angle with water of 40° or smaller. The contact angle is more preferably 30° or smaller, especially preferably 20° or lower.

For the alkali saponification treatment, a technique selected from the following two can be used. The following technique (1) is superior because the treatment can be conducted by the same step as for general-purpose triacetyl cellulose films. However, this technique can have drawbacks that the antireflection layer also is saponified and, hence, the surface of the layer is hydrolyzed by the alkali to cause film deterioration and that the saponification liquid is causative of fouling if it remains. In this case, the following technique (2) is superior although it includes a special step.

(1) After an antireflection layer is formed on a transparent substrate, this film is immersed in an alkali solution at least once to thereby saponify the back surface of the film.
(2) Before or after the formation of an antireflection layer on a transparent substrate, an alkali solution is applied to that side of the transparent substrate which is opposite to the side on which the antireflection layer has been formed or is to be formed, and the substrate is then subjected to heating and water washing and/or neutralization to thereby saponify the film back surface only.

[Formation of Antireflection Film]

Each layer of the antireflection film having a multilayer constitution can be formed through coating solution application by dip coating, air-knife coating, curtain coating, roller coating, die coating, wire-wound bar coating, gravure coating, or extrusion coating (described in U.S. Pat. No. 2,681,294). However, application by die coating is preferred. It is more preferred to conduct coating solution application with the novel die coater which will be described later. Two or more layers may be simultaneously applied. Methods of simultaneous coating are described in U.S. Pat. Nos. 2,761,791, 2,941,898, 3,508,947, and 3,526,528 and Yuji Harazaki, *Kōtingu Kōgaku*, Asakura Shoten (1973), p. 253.

A process for continuously producing the antireflection film of the invention comprises, for example, a step in which a base film in a roll form is continuously unwound, a step in which coating solutions are applied/dried, a step in which the coating film is cured, and a step in which the base film having the cured layer is wound up.

Specifically, the steps can be conducted in the following manners.

A base film in a roll form is continuously unwound in a clean room. In the clean room, the static charge built up on the base film is neutralized with a static eliminator, and foreign matters adherent to the base film are then removed with a dust remover. Subsequently, coating solutions are applied to the base film in a coating part disposed in the clean room, and the base film coated is sent to a drying chamber and dried.

The base film having the coating layer dried is sent from the drying chamber to a heat-curing part, where the coating layer is cured by heating. The base film is then sent to a radiation-curing chamber, where the cured coating layer is irradiated with a radiation to polymerize and cure the monomer contained in the coating layer. In some cases, the base film having the coating layer dried is directly sent to the radiation-curing chamber, where the coating layer is irradiated with a radiation to polymerize the monomer contained in the coating layer to complete curing. The base film having the layer which has been completely cured is wound into a roll.

From the standpoint of attaining a higher production rate, it is preferred in the invention to employ die coating as a technique for coating solution application. Use of die coating is preferred because productivity and a surface state free from coating unevenness can be reconciled on a high level.

A preferred process for producing the antireflection film of the invention employs the following technique for coating solution application by such die coating.

Namely, the production process includes a coating step in which the lands of the end lips of a slot die are brought close to a surface of a web which is continuously running while being supported by a back-up roll, and a coating solution is applied through the slot of the end lips. In the invention, it is preferred that the coating solutions be applied with a coater having a slot die in which the end lip on the web traveling direction side has a land length in the web running direction of 30-100 μm and which has been set in the coating position so that the distance between the end lip on the side opposite to the web traveling direction side and the web is larger by 30-120 μm than the distance between the end lip on the web traveling direction side and the web (hereinafter, that numerical value is referred to as "over-bite length").

A die coater which can be especially advantageously used in the process according to the invention will be explained below by reference to accompanying drawings. This die coater is preferred because it can be used when the wet coating amount is small (20 mL/m² or smaller).

<Constitution of Die Coater>

Figure 6:
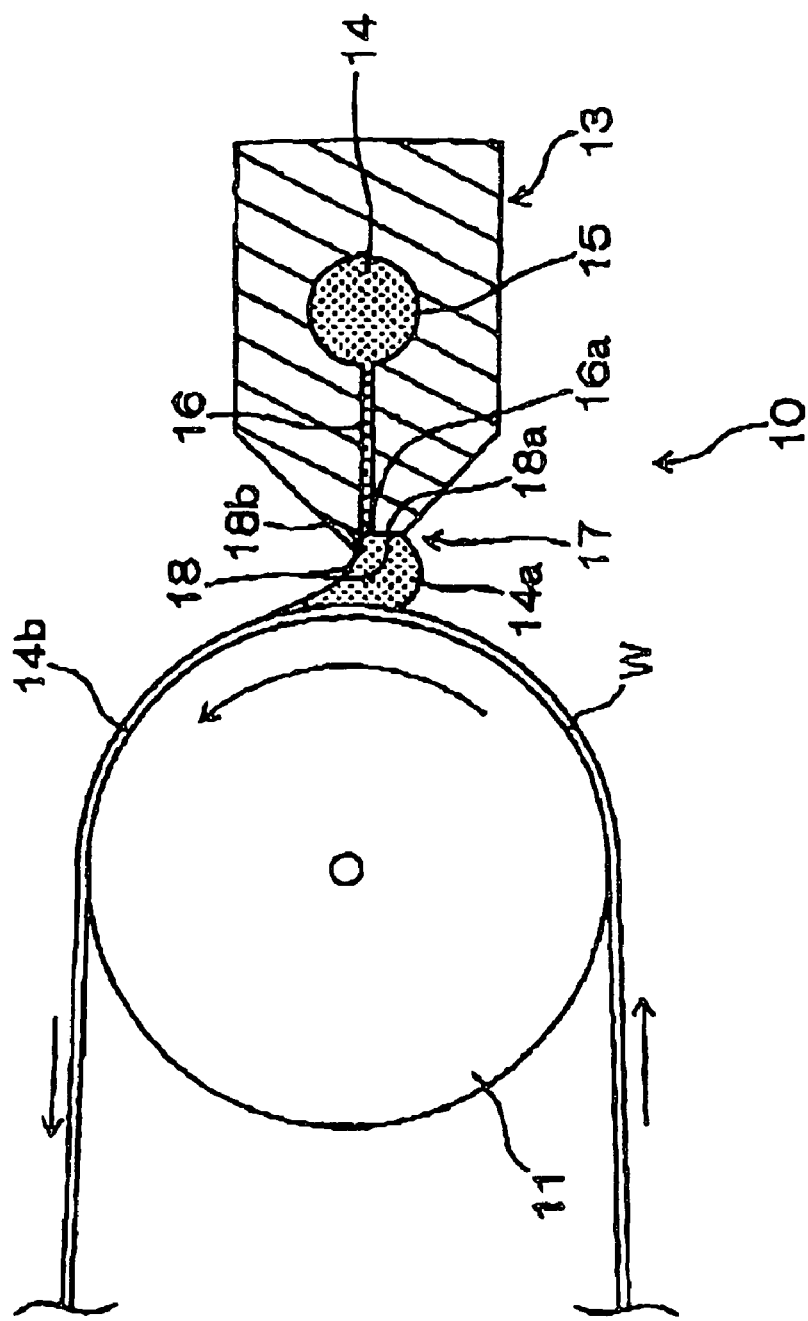
FIG. 6 is a sectional view of a coater 10 employing a slot die 13 with which the invention was practiced.

FIG. 6 is a sectional view of one example of coaters employing a slot die with which the invention can be advantageously practiced.

This coater 10 comprises a back-up roll 11 and a slot die 13. A coating solution 14 is ejected in a bead form 14a from the slot die 13 and applied to a web W which is continuously running while being supported by the back-up roll 11. Thus, a coating film 14b is formed on the web W.

The slot die 13 has a pocket 15 and a slot 16 formed therein. The pocket 15 has a section which is constituted of curved and straight lines and may be nearly circular or semi-circular. The pocket 15 is a space for coating solution storage which extends in the width direction for the slot die 13 (the term "width direction for the slot die 13" herein means the direction perpendicular to the plane of the drawing in FIG. 6) while having that sectional shape. In general, the effective length of the pocket 15 has been regulated so as to be equal to or slightly longer than the coating width. The coating solution 14 is supplied to the pocket 15 via a side of the slot die 13 or via a central part of the side opposite to the slot opening 16a. The pocket 15 is equipped with a plug (not shown) for preventing the coating solution 14 from leaking out.

The slot 16 serves as a channel through which the coating solution 14 is sent from the pocket 15 to the web W. Like the pocket 15, the slot 16 extends in the width direction for the slot die 13 while having the sectional shape. The opening 16a located on the web side is generally regulated with a member such as a width regulation plate (not shown) so as to have a length almost equal to the coating width. The angle formed by this slot 16 and that tangent to the back-up roll 11 which ex-tends in the web W running direction at the slot end is preferably 30°-90°.

The end lips 17 of the slot die 13, where the opening 16a of the slot 16 is located, are tapered, and the ends thereof constitute flat parts 18 called lands. Of these lands 18, that located upstream from the slot 16 with respect to the web W traveling direction (located on the side opposite to the traveling direction, i.e., opposite to the direction indicated by the arrow in the drawing) is referred to as an upstream-side lip land 18a, while that located downstream from the slot 16 (located on the traveling direction side) is referred to as a downstream-side lip land 18b.

Figure 7A:
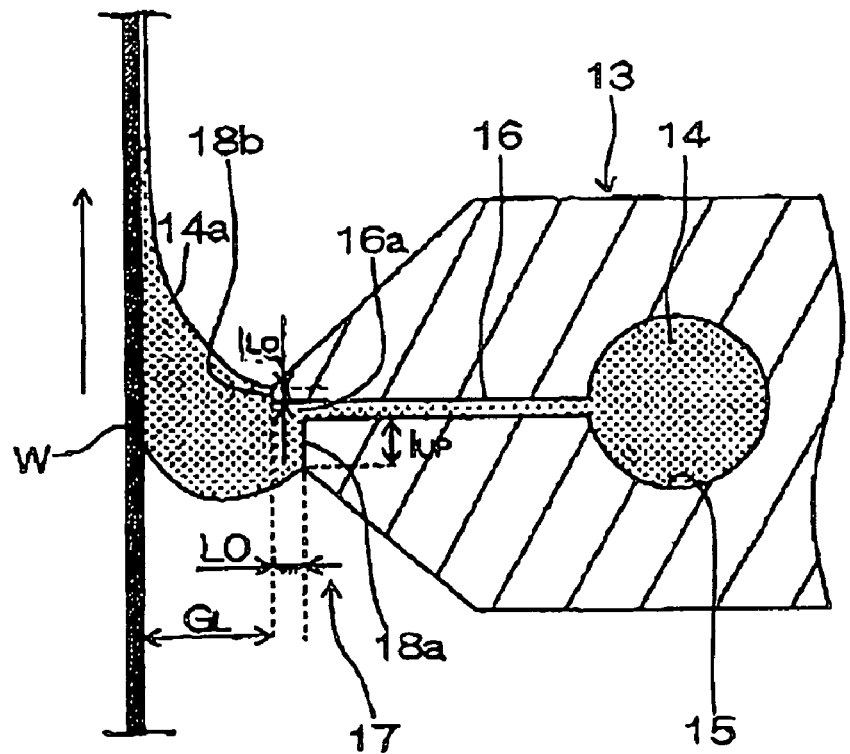
FIG. 7A illustrates a sectional shape of a slot die 13 for practicing the invention.
Figure 7B:
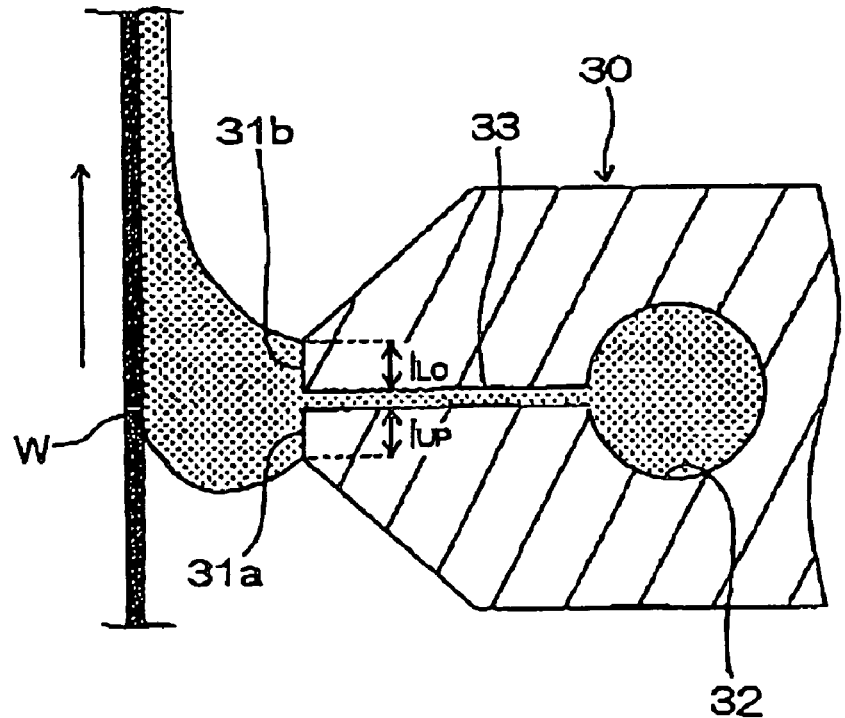
FIG. 7B illustrates a sectional shape of a slot die 30 heretofore in use.

FIG. 7A and FIG. 7B show the sectional shape of the slot die 13 in comparison with that of a slot die heretofore in use; FIG. 7A shows the slot die 13 for use in the invention, while FIG. 7B shows a slot die 30 heretofore in use. In the conventional slot die 30, the distance between the upstream-side lip land 31a and the web is equal to that between the downstream-side lip land 31b and the web. Reference numeral 32 denotes a pocket and 33 denotes a slot. In contrast, in the slot die 13 according to the invention, the downstream-side lip land has a length $I_{LO}$ which is short, whereby application in a wet thickness of 20 μm or smaller can be conducted with satisfactory accuracy.

The land length $I_{UP}$ of the upstream-side lip land 18a is not particularly limited, but is preferably in the range of from 500 μm to 1 mm. The land length $I_{LO}$ of the downstream-side lip land 18b is 30-100 μm, preferably 30-80 μm, more preferably 30-60 μm. In case where the land length $I_{LO}$ of the downstream-side lip is shorter than 30 μm, the edge or land of the land lip is apt to chip and the coating film is apt to have streaks, which makes the application impossible. Furthermore, such too short lengths $I_{LO}$ pose a problem that it is difficult to set the position of a wetting line on the downstream side and the coating solution is apt to spread on the downstream side. This spread of the coating solution on the downstream side means an uneven wetting line. It has been known that the spread leads to a problem that the uneven wetting line results in defectives in the coating surface, such as streaks. On the other hand, in case where the downstream-side lip land length $I_{LO}$ is longer than 100 μm, bead formation itself is impossible and, hence, application in a small thickness is impossible.

Furthermore, this slot die 13 has an over-bite shape in which the downstream-side lip land 18b is closer to the web W than the upstream-side lip land 18a. Because of this shape, the degree of vacuum can be reduced and bead formation suitable for application in a small thickness is possible. The difference between the distance between the downstream-side lip land 18b and the web W and that between the upstream-side lip land 18a and the web W (hereinafter, that difference is referred to as over-bite length LO) is preferably 30-120 μm, more preferably 30-100 μm, most preferably 30-80 μm. When the slot die 13 has an over-bite shape, the gap GL between the end lips 17 and the web W means the gap between the downstream-side lip land 18b and the web W.

Figure 8:
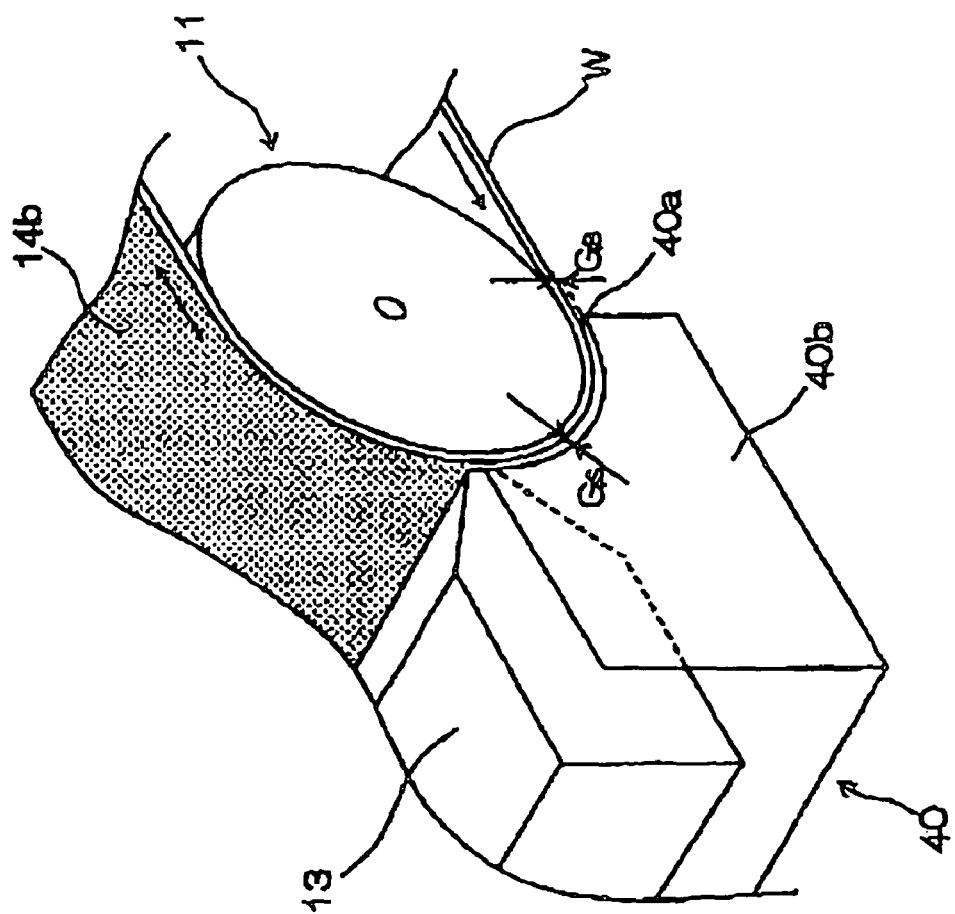
FIG. 8 is a slant view illustrating a slot die 13 and peripheral devices in a coating step in which the invention was practiced.
Figure 9:
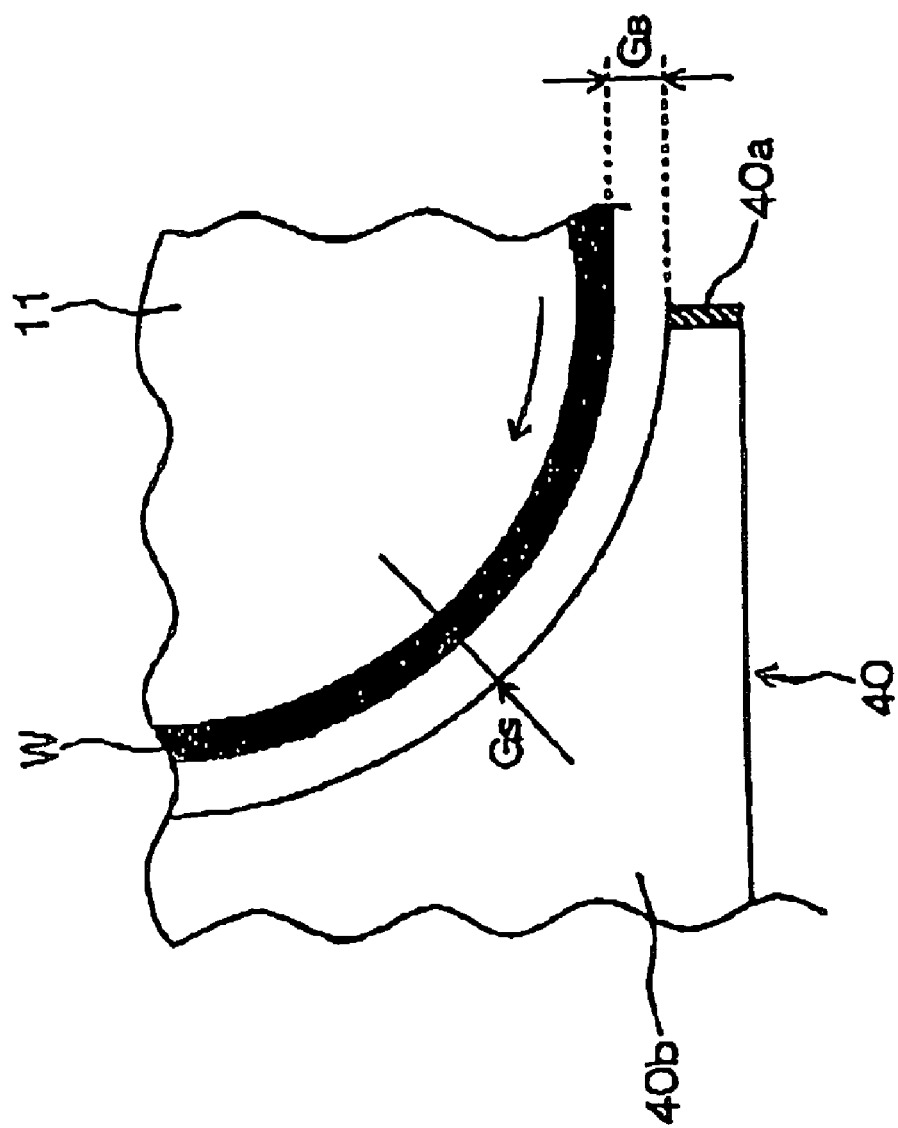
FIG. 9 is a sectional view showing a vacuum chamber 40 and a web W located close to the chamber. (The back plate 40a has been united with the main body of the chamber 40.)
Figure 10:
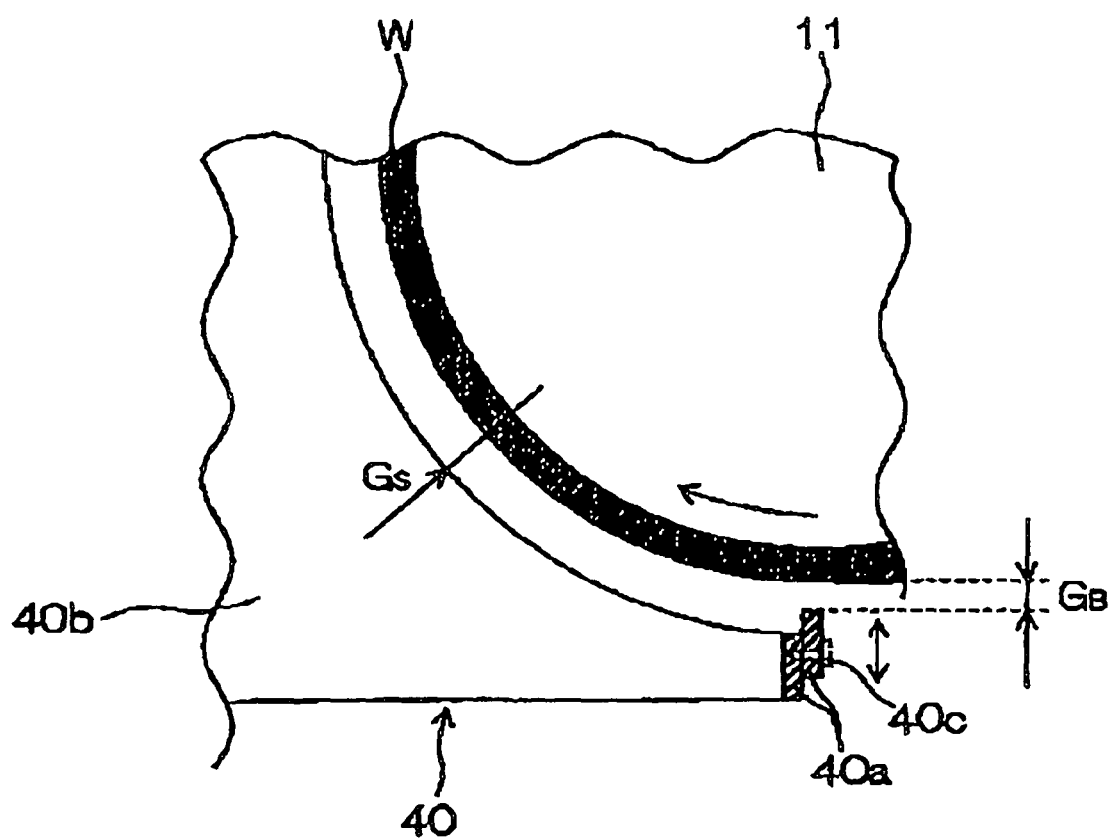
FIG. 10 is a sectional view showing the same members as in FIG. 9. (The back plate 40a is fixed to the chamber 40 with screws 40c.)

FIG. 8 is a slant view illustrating a slot die and peripheral devices in a coating step in which the invention is practiced. A vacuum chamber 40 is disposed on the side opposite to the web W traveling direction in a non-contact position so that the bead 14a can undergo sufficient vacuum regulation. The vacuum chamber 40 has a back plate 40a and a side plate 40b for retaining its working efficiency. There are gaps $G_B$ and $G_S$ between the back plate 40a and the web W and between the side plate 40b and the web W, respectively. FIG. 9 and FIG. 10 each are a sectional view showing the vacuum chamber 40 and a web W located close to the chamber 40. The side plate and the back plate may be ones which have been united with the chamber main body as shown in FIG. 9, or may have a structure in which the plates are fixed to the chamber with, e.g., screws 40c so as to suitably change the gaps as shown in FIG. 10. Whichever structure the slot die may have, the actual space between the back plate 40a and the web W and that between the side plate 40b and the web W are defined as gaps $G_B$ and $G_S$, respectively. The gap $G_B$ between the back plate 40a of the vacuum chamber 40 and the web W means the gap between the uppermost end of the back plate 40a and the web W when the vacuum chamber 40 has been disposed below the web W and the slot die 13 as shown in FIG. 8.

It is preferred that the gap $G_B$ between the back plate 40a and the web W be regulated so as to be larger than the gap $G_L$ between the end lips 17 of the slot die 13 and the web W. This constitution is effective in inhibiting the degree of vacuum around the bead from fluctuating due to the eccentricity of the back-up roll 11. For example, when the gap $G_L$ between the end lips 17 of the slot die 13 and the web W is 30-100 μm, then the gap $G_S$ between the back plate 40a and the web W preferably is 100-500 μm.

The polarizing plate is constituted mainly of a polarizing film and two protective films between which the polarizing film is sandwiched. It is preferred that the antireflection film of the invention be used as or in at least one of the two protective films between which the polarizing film is sandwiched. By thus using the antireflection film of the invention so as to serve also as a protective film, the cost of polarizing plate production can be reduced. Furthermore, when the antireflection film of the invention is used as an outermost layer, then the polarizing plate can be prevented from suffering external-light reflection or the like therein and is excellent in marring resistance, antifouling properties, etc.

As the polarizing film may be used a known polarizing film. Alternatively, use may be made of a polarizing film cut out of a continuous polarizing film in which the absorption axis is neither parallel nor perpendicular to the longitudinal direction for the polarizing film. The continuous polarizing film in which the absorption axis is neither parallel nor perpendicular to the longitudinal direction for the polarizing film can be produced by the following method.

Namely, it is a polarizing film obtained by stretching a continuously supplied polymer film by applying a tension thereto while holding the side edges of the film with holding devices. This polarizing film can be produced by a stretching method which comprises stretching the film at least in the film width direction at a stretch ratio of 1.1-20.0 and in which the film traveling direction is deflected while holding the film side edges so that the difference in longitudinal-direction traveling speed between the holding device at one side edge of the film and that at the other side edge is within 3% and that the film traveling direction at the outlet of the step of holding the film side edges is inclined at an angle of 20-70° with the substantial film stretching direction.

Methods for polymer film stretching are described in detail in JP-A-2002-86554, paragraphs 0020 to 0030.

It is also preferred that of the two protective films in the polarizing plate, the film other than the antireflection film be an optical compensation film having an optical compensation layer comprising an optically anisotropic layer. An optical compensation film (retardation film) can improve the viewing angle characteristics of a liquid-crystal display.

As the optical compensation film, a known one can be used. However, the optical compensation film described in JP-A-2001-100042 is preferred from the standpoint of widening a viewing angle.

Modes of Use of the Invention

The antireflection film of the invention is used in displays such as a liquid-crystal display (LCD), plasma display panel (PDP), electroluminescent display (ELD), and cathode ray tub display (CRT).

(1) Liquid-Crystal Display

The film and polarizing plate of the invention can be advantageously used in image displays including liquid-crystal displays, and are preferably used as the outermost layer of such a display.

A liquid-crystal display comprises a liquid-crystal cell and two polarizers disposed respectively on both sides of the cell. The liquid-crystal cell comprises two electrode substrates and a liquid crystal interposed between these. There are cases where one optically anisotropic layer is disposed between the liquid-crystal cell and one of the polarizing plates or two optically anisotropic layers are disposed respectively between the liquid-crystal cell and one of the polarizing plates and between the cell and the other polarizing plate.

The liquid-crystal cell preferably is one which is operated in the TN mode, VA mode, OCB mode, IPS mode, or ECB mode.

<TN Mode>

In a TN-mode liquid-crystal cell, the liquid-crystalline molecules in a rod shape are oriented substantially horizontally and twisted at 60-120° when no voltage is applied.

Liquid-crystal cells working in the TN mode are most frequently used in color TFT liquid-crystal displays, and are described in many documents.

<VA Mode>

In a VA-mode liquid-crystal cell, the liquid-crystalline molecules in a rod shape are oriented substantially perpendicularly when no voltage is applied.

Liquid-crystal cells working in the VA mode include (1) a liquid-crystal cell in the VA mode in the narrow sense in which the rod-shape liquid-crystalline molecules are oriented substantially perpendicularly when no voltage is applied and are oriented substantially horizontally during voltage application (described in JP-A-2-176625), and further include (2) a (MVA mode) liquid-crystal cell made to work in the multi-domain VA mode for viewing angle enlargement (described in SID97, Digest of Tech. Papers (Preprints), 28 (1997) 845), (3) a liquid-crystal cell which is operated in a mode in which the rod-shape liquid-crystalline molecules are oriented substantially perpendicularly when no voltage is applied and are caused to undergo twisted multi-domain orientation during voltage application (n-ASM mode) (described in Preprints of Japan Symposium on Liquid Crystals, 58-59 (1998)), and (4) a liquid-crystal cell in the SURVAIVAL mode (announced at LCD International 98).

<OCB Mode>

An OCB-mode liquid-crystal cell is a liquid-crystal cell working in the bend orientation mode in which the rod-shape liquid-crystalline molecules located in an upper part of the liquid-crystal cell and those located in a lower part of the cell are oriented substantially in opposite directions (symmetrically). It is disclosed in U.S. Pat. Nos. 4,583,825 and 5,410,422. The liquid-crystal cell working in the bond orientation mode has the function of optical self-compensation since the orientation of rod-shape liquid-crystalline molecules in an upper part of the liquid-crystal cell and that in a lower part of the cell are symmetrical. Because of this, this liquid-crystal mode is called OCB (optionally compensatory bend) liquid-crystal mode. Liquid-crystal displays working in the bend orientation mode have an advantage of a high response rate.

<IPS Mode>

An IPS-mode liquid-crystal cell is of the type in which a transverse electric field is applied to a nematic liquid crystal to thereby conduct switching. Details thereof are described in Proc. IDRC (Asia Display '95), pp. 577-580 and pp. 707-710.

<ECB Mode>

In an ECB-mode liquid-crystal cell, the rod-shape liquid-crystalline molecules are oriented substantially horizontally when no voltage is applied. The ECB mode is one of the liquid-crystal display modes having the simplest structure. Details thereof are described in, e.g., JP-A-5-203946.

(2) Displays Other than Liquid-Crystal Displays

<PDP>

A plasma display panel (PDP) is generally constituted of a gas, glass substrates, electrodes, electrode lead materials, a thick printed material, and a phosphor. The glass substrates are two, i.e., a front glass substrate and a back glass substrate. An electrode and an insulating layer are formed on the two glass substrates. On the back glass substrate is further formed a phosphor layer. These two glass substrates are assembled and a gas is enclosed in the space between these. The assembly is then sealed.

Plasma display panels (PDPs) are already on the market. Plasma display panels are described in JP-A-5-205643 and JP-A-9-306366.

There are cases where a front plate is disposed in front of the plasma display panel. The front plate preferably is one having strength sufficient for protecting the plasma display panel. The front plate may be used so as to be spaced from the plasma display panel or may be used in the state of being directly bonded to the plasma display main body.

In image displays such as plasma display panels, an optical filter can be directly applied to the display surface. In the case of a display having a front plate disposed in front, an optical filter may be applied to the front side (outer side) or back side (display side) of the front plate.

<Touch Panel>

The films of the invention can be applied to the touch panels described in, e.g., JP-A-5-127822 and JP-A-2002-48913 or the like.

<Organic EL Element>

The films of the invention can be used as a substrate (base film) or protective film for organic EL elements or the like.

When the films of the invention are used for an organic EL element or the like, the contents of JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, JP-A-2002-056976, etc. can be applied. It is preferred to use such contents in combination with the contents of JP-A-2001-148291, JP-A-2001-221916, and JP-A-2001-231443.

Values of Various Properties

Methods for determining various properties relating to the invention and preferred values of the properties are shown below.

(1) Reflectance

For measuring mirror reflectance and color, spectrophotometer "V-550" (manufactured by Nippon Bunko K.K.) having adapter "ARV-474" attached thereto is used. In a wavelength range of 380-780 nm, light is caused to strike at an incidence angle of 5° and mirror reflectances are measured at an emission angle of −5°. An average reflectance for the 450-650 nm range is calculated. Antireflection properties can be evaluated based on this average.

(2) Color

The polarizing plate having antireflection function of the invention can be evaluated for color by using a CIE standard illuminant $D_{65}$ to cause light in a wavelength range of 380-780 nm to strike on the polarizing plate at an incidence angle of 5° and determining the color, i.e., the values of L*, a*, and b* in the CIE 1976 L*a*b* color space, of the regular-reflection light.

The values of L*, a*, and b* preferably are in the ranges of $3 \leq L^* \leq 20$, $-7 \leq a^* \leq 7$, and $-1 \leq b^* \leq -10$. When the values of L*, a*, and b* are within these ranges, the purplish-red to bluish-red color of reflected light which has been a problem in conventional polarizing plates is diminished. This color is considerably diminished when $3 \leq *10$, $0 \leq a^* \leq 5$ and $-7 \leq b^* \leq 0$. In the case where this polarizing plate is applied to a liquid-crystal display, even when external light having a high luminance, such as the light from an indoor fluorescent lamp, is slightly reflected in the display, the reflected light has a neutral color and is unobstrusive. Specifically, when $a^* \leq 7$ then too high redness is avoided, and when $a^* \geq -7$, then too intense a cyan tint is avoided. Values of a* within this range are hence preferred. On the other hand, when $b^* \geq -7$, then too high blueness is avoided, and when $b^* \leq 0$, then too high yellowness is avoided. Values of b* within this range are hence preferred.

Furthermore, the color evenness of reflected light can be obtained in terms of the degree of color change according to the following numerical expression 21 from the values of a* and b* on an L*a*bt chromaticity diagram determined from a reflection spectrum at 380-680=n for the reflected light.

Degree of color change $(a^*) = (a^*_{max} - a^*_{min})/a^*_{av} \times 100$

Degree of color change $(b^*) = (b^*_{max} - b^*_{min})/b^*_{av} \times 100$   Numerical expression (21)

In the numerical expression, $a^*_{max}$ and $a^*_{min}$ respectively are the maximum value and minimum value of a*; $b^*_{max}$ and $b^*_{min}$ respectively are the maximum value and minimum value of b*; and $a^*_{av}$ and $b^*_{av}$ are the average of a* values and the average of b* values, respectively. The degree of color change for each of a* and b* is preferably 30% or lower, more preferably 20% or lower, most preferably 8% or lower.

The films of the invention preferably have a value of $\Delta E_w$, which indicates a color change through a weathering test, of 15 or lower, more preferably 10 or lower, most preferably 5 or lower. When the value of $\Delta E_w$ thereof is within this range, low reflection can be reconciled with the reduced color of reflected light. Because of this, when the films of the invention are applied to the outermost surface of a liquid-crystal display and external light having a high luminance, such as the light from an indoor fluorescent lamp, is slightly reflected in the display, then the reflected light has a neutral color. This is preferred because the images on the screen have satisfactory quality.

The color chance $\Delta E_w$ can be determined according to the following numerical expression (22).

$$\Delta E_w = [(\Delta L_w)^2 + (\Delta a_w)^2 + (\Delta b_w)^2]^{1/2}$$   Numerical expression (22)

In the numerical expression, $\Delta L_w$, $\Delta a_w$, and $\Delta b_w$ are the amounts of change of L*, a*, and b* values, respectively, through the weathering test.

(3) Visibility of Transmitted Image

The visibility of a transmitted image can be measured in accordance with JIS K 7105 with an image clarity meter (ICM-2D) manufactured by Suga Test Instruments Co., Ltd. using an optical comb having a slit width of 0.5 mm.

The visibility of images transmitted through the films of the invention is preferably 60% or higher. The visibility of a transmitted image generally is an index to the degree of blurring of an image viewed through a film. The larger the value of this property, the more the image viewed through the film is clear and satisfactory. The visibility of the transmitted images is preferably 70% or higher, more preferably 80% or higher.

(4) Surface Roughness

Center-line average surface roughness (Pa) can be measured in accordance with JIS-B0601.

(5) Haze

The haze of the films of the invention is expressed in terms of the value of haze, i.e., (diffused light/all transmitted light)× 100 (%), automatically measured with turbidimeter "NDH-1001DP", manufactured by Nippon Denshoku Kogyo K.K.

The haze of the films is preferably 1.5% or lower, more preferably 1.2% or lower, most preferably 1.0% or lower.

(6) Goniophotometer Scattered-Light Intensity Ratio

Automatic varied-angle photometer Type GP-5 (manufactured by Murakami Color Research laboratory) was used to determine a scattered-light profile over all directions, with the antireflection film disposed perpendicularly to the incident light. The ratio can be determined as the ratio of the intensity of scattered light emitted at an angle of 30° to the intensity of light emitted at an angle of 0°.

(7) Marring Resistance

<Evaluation of Resistance to Marring with Steel Wool>

A rubbing tester is used to conduct a test under the following conditions. The results thereof can be used as an index to marring resistance.

Evaluation environment conditions: 25° C., 60% RH

Rubbing material: Steel wool (manufactured by Japan Steel Wool Co., Ltd.; Grade No. 0000) wound around the rubbing end (1 cm×1 cm) of the tester to be in contact with a sample and fixed thereto with a band.

Traveling distance (one way): 13 cm

Rubbing speed: 13 cm/sec

Load: 500 g/cm$^2$ and 200 g/cm$^2$

End contact area: 1 cm×1 cm

Number of rubbing operations: 10 forward-and-backward movements

An oil-based black ink is applied to the back side of the sample which has undergone the rubbing. This sample is visually examined for mars in the rubbed area using reflected light. Furthermore, the sample is examined to determine a difference in the amount of reflected light between the rubbed area and the other area. Marring resistance is evaluated based on the results of these.

<Evaluation of Resistance to Marring by Eraser Rubbing>

A rubbing tester is used to conduct a test under the following conditions. The results thereof can be used as an index to marring resistance.

Evaluation environment conditions: 25° C., 60% RH

Rubbing material: Eraser made of plastic (MONO, manufactured by Tombow Pencil Co., Ltd.) fixed to the rubbing end (1 cm×1 cm) of the tester to be in contact with a sample.

Traveling distance (one way): 4 cm

Rubbing speed: 2 cm/sec

Load: 500 g/cm$^2$

End contact area: 1 cm×1 cm

Number of rubbing operations: 10 forward-and-backward movements

An oil-based black ink is applied to the back side of the sample which has undergone the rubbing. This sample is visually examined for mars in the rubbed area using reflected light. Furthermore, the sample is examined to determine a difference in the amount of reflected light between the rubbed area and the other area. Marring resistance is evaluated based on the results of these.

<Taber Test>

A Taber test in accordance with JIS K5400 is conducted. Marring resistance can be evaluated based on the amount of wear of the test piece through the test.

The smaller the amount of wear, the more the test piece is preferred.

(8) Hardness

<Pencil Hardness>

The strength of the films of the invention can be evaluated through a pencil hardness test in accordance with JIS K5400.

The pencil hardness of the films is preferably H or higher, more preferably 2H or higher, most preferably 3H or higher.

<Modulus of Surface Elasticity>

The values of the modulus of surface elasticity in the invention are ones obtained with a micro-surface hardness meter (Fischer Scope H100VP-HCU; manufactured by Fischer Instruments K.K.). Specifically, a quadrangular pyramid indenter made of diamond (point/surface angle: 136°) is used and indented into the surface under an appropriate test load to measure the indentation depth in an indentation depth range not exceeding 1 μm. The modulus of surface elasticity is the modulus determined from changes in load during load removal and from resultant changes in displacement.

Furthermore, the micro-surface hardness meter may be used to determine the surface hardness as a universal hardness. In determining the universal hardness, the depth in which the quadrangular pyramid indenter is indented under a test load is measured, and the surface area of the indentation mark formed under the test load is calculated from the geometrical shape of the indentation mark. The universal hardness is a value obtained by dividing the test load by the surface area. It is known that the modulus of surface elasticity has a positive correlation with the universal hardness.

(9) Antifouling Test

<Suitability for Magic Ink Wiping-Off>

A film is fixed to a glass surface with a pressure-sensitive adhesive. Under the conditions of 25° C. and 60% RH, three laps of a circle having a diameter of 5 mm are drawn on the film with the pen point "Hoso" of black Magic "Mackee Gokuboso" (trade name; manufactured by ZEBRA). At 5 seconds after the drawing, Bemcot (trade name; manufactured by Asahi Chemical Industry Co., Ltd.) which has been folded and bound into a ten-layer bundle is used to wipe off the Magic ink by moving the bundle forward and backward 20 times on the film while applying a load to the Bemcot bundle to such a degree that the bundle caves in. The drawing and wiping operations are repeated under those conditions until the Magic ink mark comes not to be wiped off. Antifouling properties can be evaluated in terms of the number of wiping operations by which the ink could be wiped off.

The number of wiping operations conducted before the ink mark comes not to be removed is preferably 5 or larger, more preferably 10 or larger.

With respect to a black Magic, a test may be conducted in which Magic Ink No. 700 (M700-TI Black) Gokuboso is used to draw a solid circle having a diameter of 1 cm on a sample and, at 24 hours thereafter, this sample is rubbed with Bemcot (manufactured by Asahi Chemical Industry Co., Ltd.). Antifouling properties can be evaluated based on whether the Magic ink can be wiped off or not.

(10) Surface Tension

The surface tension to be examined and evaluated in the invention is the surface tension of a coating solution for forming a functional layer. It can be measured in an atmosphere having a temperature of 25° C. with a surface tension meter (KYOWA CBVP SURFACE TENSIOMETER A3, manufactured by Kyowa Interface Science Co., Ltd.).

(11) Contact Angle

In a dry atmosphere (20° C./65% RH), a contact angle meter ["CA-X" manufactured by Kyowa Interface Science Co., Ltd.] was used to form at the needle tip a droplet of pure water, as a liquid, which had a diameter of 1.0 mm. This droplet was contacted with a surface of a film to form a droplet on the film. The angle which is formed by the film surface and the tangent to the liquid surface at a point where the film is in contact with the liquid and which includes the liquid is referred to as contact angle.

(12) Surface Free Energy

Surface energy can be determined by the contact angle method, wetting heat method, and adsorption method as described in *Nure No Kiso To Ôyô*, Realize Co., published on Dec. 10, 1989. In the case of the films of the invention, it is preferred to use the contact angle method.

Specifically, the method is as follows. Two solutions each having a known surface energy are dropped onto a cellulose acylate film. With respect to each droplet, the angle which is formed at a point of intersection between the droplet surface and the film surface by the tangent to the droplet surface and the film surface and which includes the droplet is defined as contact angle. The surface energy of the film can be calculated from the contact angles.

The surface free energy ($\gamma s^v$: unit, mN/m) of a film of the invention can be determined by reference to D. K Owens, *J. Appl. Polym. Sci*, 13, 1741 (1969). Namely, the surface free energy means the surface tension $\gamma s^v$ of the antireflection film defined as the sum of $\gamma s^d$ and $\gamma s^h$ ($\gamma s^v = \gamma s^d + \gamma s^h$), the values of $\gamma s^d$ and $\gamma s^h$ being determined using the following simultaneous equations a and b from the contact angles $\theta_{H2O}$ and $\theta_{CH212}$ of pure water $H_2O$ and methylene iodide $CH_2I_2$, respectively, experimentally determined on the antireflection film. The smaller the value of $\gamma s^v$ and the lower the surface free energy, the more the film surface is repellent and is generally superior in antifouling properties.

$$1 + \cos\theta_{H2O} = 2\sqrt{\gamma s^d}(\sqrt{\gamma_{H2O}^d/\gamma_{H2O}^v}) + 2\sqrt{\gamma s^h}(\sqrt{\gamma_{H2O}^h/\gamma_{H2O}^v}) \quad \text{a.}$$

$$1 + \cos\theta_{CH212} = 2\sqrt{\gamma s^d}(\sqrt{\gamma_{CH212}^d/\gamma_{CH212}^v}) + 2\sqrt{\gamma s^h}(\sqrt{\gamma_{CH212}^h/\gamma_{CH212}^v}) \quad \text{b.}$$

$\gamma_{H2O}^d = 21.8$, $\gamma_{H2O}^h = 51.0$, $\gamma_{H2O}^v = 720.8$ $\gamma_{CH212}^d = 49.5$, $\gamma_{CH212}^h = 1.3$, $\gamma_{CH212}^v = 50.8$ In preparation for the contact angle measurement, the film was conditioned under the conditions of 25° C. and 60% for 1 hour or longer. Thereafter, automatic contact angle meter Type CA-V150, manufactured by Kyowa Interface Science Co., Ltd., was used to drop a 2-μL droplet onto the film. At 30 seconds after the dropping, the contact angle was measured.

The surface free energy of the films of the invention is preferably 25 mN/m or lower, especially preferably 20 mN/m or lower.

(13) Curl

Curl is measured with the template for curl measurement as provided for in Method A in JIS K7619-1988 "Method of Curl Measurement for Photographic Films".

The measurement conditions include 25° C., a relative humidity of 60%, and a conditioning period of 10 hours.

The curl of the films of the invention, in terms of the value represented by the following numerical expression, is preferably in the range of −15 to +15, more preferably in the range of from −12 to +12, even more preferably in the range of from −10 to +10. In this measurement, the curl of the sample was measured in the direction of base conveyance in the case where the base has been coated in the form of web.

$$\text{Curl} = 1/R \quad \text{(Numerical Expression)}$$

R: radius of curvature (m)

This is an important property in order for the film not to undergo cracking or film peeling during the production and processing of the film and handling thereof in the market. It is preferred that the film be reduced in curling, with the value of curl being within that range.

That the value of curl is plus means that the film curls so that the coating side thereof faces inward. That the value of curl is minus means that the film curls so that the coating side thereof faces outward.

Furthermore, when the films of the invention are examined by the curl measurement method described above in Which the relative humidity only is changed to 80% and 10%, then the absolute value of the difference between the two curl values for the respective humidities is preferably 24-0, more preferably 15-0, most preferably 8-0. This is a property relating to handleability, peeling, and cracking in film application at various humidities.

(14) Evaluation of Adhesion

Adhesion between layers of a film or between the substrate and the coating layer can be evaluated by the following method.

That side of the film which has the coating layer is cross-hatch-wise incised with a cutting knife to make 11 incisions in the length direction and 11 incisions in the width direction at an interval of 1 mm and thereby form 100 squares in total. A pressure-sensitive adhesive polyester tape (NO. 31B) manufactured by Nitto Denko Corp. is press-bonded thereto, allowed to stand in this state for 24 hours, and then stripped off. This test is repeatedly conducted three times in the same place. The film is then visually examined for peeling.

It is preferred that the number of squares peeled of the 100 squares be 10 or less, more preferably 2 or less.

(15) Brittleness Test (Crack Resistance)

Crack resistance is an important property in order for the film not to crack during the handling of the film, such as the coating, processing, and cutting of the film, application of a pressure-sensitive adhesive to the film, and application of the film to various objects.

A film sample is cut into 35 mm×140 mm. This cut sample is allowed to stand for 2 hours under the conditions of a temperature of 25° C. and a relative humidity of 60% and then rolled into a cylindrical form. In this rolling, the radius of curvature at which cracking begins to occur is measured. Based on this, the surface crack resistance can be evaluated.

The crack resistance of the films of the invention is preferably 50 mm or less, more preferably 40 mm or less, most preferably 30 mm or less, in terms of the radius of curvature at which cracking occurs in the film roll in which the coating layer side faces outward. With respect to cracking in edge parts, it is preferred that the edge parts should develop no cracks or develop cracks the average length of which is shorter than 1 mm.

(16) Surface Resistance

The surface resistance of the films of the invention can be measured with high-megohmmeter/microammeter "TR8601" (manufactured by Advantest Corp.) under the conditions of 25° C. and a relative humidity of 60% RH. The common logarithm of the surface resistance ($\Omega/\square$) is calculated to obtain the value of logSPR.

(17) Dust Removability

A film of the invention is applied to a monitor, and dust particles (fibrous dust derived from bedclothes or cloths) are sprinkled on the monitor surface. The dust particles are wiped off with a cleaning cloth. Dust removability can be evaluated based on the results.

It is preferred that the dust particles can be completely removed by preferably up to 6 wiping operations, more preferably up to 3 wiping operations.

(18) Image Display Performance of Liquid-Crystal Display

Methods of evaluating image display properties of a display employing a film of the invention thereon are described below together with preferred states.

The viewing-side polarizing plate disposed on a liquid-crystal display (TH-15TA2, manufactured by Matsushita Electric Industrial Co., Ltd.), which employs a TN-mode liquid-crystal cell, is stripped off. The film or polarizing plate of the invention is applied to the display in place of that polarizing plate through a pressure-sensitive adhesive so that the coating side faces the viewing side and that the axis of transmission of this polarizing plate coincides with that of the polarizing plate which was bonded to the product. In a bright room of 500 lux, this liquid-crystal display is regulated so as to display a black picture, and viewed at various angles. Thus, the following various image display properties can be evaluated.

<Evaluation of Unevenness and Color of Display Image>

The liquid-crystal display in the state of displaying a black picture (L1) is visually examined by observers for image unevenness and color change using a measurement apparatus ("EZ-Contrast 160D" manufactured by ELDIM S.A.).

Ten observers evaluate the properties. The number of observers who can recognize unevenness, a difference in color between the left and the right side of the display, a color change with changing temperature or humidity, or a bright blur is preferably 3 or smaller, more preferably 0.

An examination concerning the reflection of external light in the display can be made with a fluorescent lamp. A relative difference in the reflection can be visually evaluated.

<Light Leakage from Black Picture>

The light leakage ratio is measured in a direction at an angle of 45° with the liquid-crystal display front direction and at an angle of elevation of 70°. The light leakage ratio is preferably 0.4% or lower, more preferably 0.1% or lower.

<Contrast and Viewing Angle>

With respect to contrast and viewing angle, a measuring apparatus ("EZ-Contrast 160D" manufactured by ELDIM S.A.) can be used to determine the contrast ratio and the viewing angle (angle of the range where the contrast ratio is 10 or higher) in the leftward/rightward direction (direction perpendicular to the cell rubbing direction).

[Methods of Curing Coating Film]

In the invention, the coating film which has been dried may be heat-cured and then further cured by irradiation with an ionizing radiation. Alternatively, the coating film which has been dried can be cured by directly irradiating it with an ionizing radiation. In either case, the curing by irradiation with an ionizing radiation is conducted by a step in which the coating film is irradiated with an ionizing radiation in an atmosphere having an oxygen concentration of 3% by volume or lower and the coating film is held in the atmosphere with an oxygen concentration of 3% by volume or lower for at least 0.5 seconds after initiation of the irradiation with an ionizing radiation. Use may be made of a method in which an inert gas is supplied to the ionizing-radiation irradiation chamber under such conditions that the inert gas slightly comes out on the web inlet side of the irradiation chamber. When this method is used, the air accompanying web conveyance can be eliminated and the oxygen concentration in the reaction chamber can be effectively reduced. In addition, the substantial oxygen concentration in an extreme surface layer, which may suffer considerable curing inhibition by oxygen, can be efficiently reduced. The direction of the flow of the inert gas on the web inlet side of the irradiation chamber can be controlled, for example, by regulating the gas supply/discharge balance in the irradiation chamber.

To directly blow an inert gas against the web surface also is a preferred method for removing the accompanying air.

In particular, it is preferred to use this method in curing the low-refractive-index layer which is an outermost layer and has a small thickness.

A pre-chamber may be disposed before the reaction chamber to remove the oxygen present around the web surface beforehand, whereby curing can proceed more efficiently. From the standpoint of efficiently using the inert gas, the gap between the side constituting the web inlet side of the ionizing-radiation reaction chamber or pre-chamber and the web surface is preferably 0.2-15 mm, more preferably 0.2-10 mm, most preferably 0.2-5 mm. However, the following should be noted. For continuous web production, it is necessary to join webs end to end by bonding. A method extensively employed for the bonding is to bond with a bonding tape or the like. Because of this, when the gap between the inlet side of the ionizing-radiation reaction chamber or pre-chamber and the web is regulated so as to be too narrow, a problem arises that the bonding member such as a bonding tape is caught at the gap. It is therefore preferred for narrowing the gap that at least part of the inlet side of the ionizing-radiation reaction chamber or pre-chamber be made movable and the gap be widened by a distance corresponding to the bonding part thickness when each bonding part enters the chamber or pre-chamber. For realizing this, use can be made of: a method in which the inlet side of the ionizing-radiation reaction chamber or pre-chamber is constituted so as to be movable in the web traveling direction and is moved forward/backward when each bonding part passes through the gap to thereby widen the gap; or a method in which the inlet side of the ionizing-radiation reaction chamber or pre-chamber is constituted so as to be movable in a direction perpendicular to the plane of the web and is moved upward/downward when each bonding part passes through the gap to thereby widen the gap.

The oxygen concentration of the atmosphere in which the coating film is irradiated with an ionizing radiation is 3% by volume or lower, preferably 1% by volume or lower, even more preferably 0.5% by volume or lower. To unnecessarily reduce the oxygen concentration is undesirable from the standpoint of production cost because of the necessity of using a large amount of an inert gas such as nitrogen. A preferred method for reducing the oxygen concentration is to replace the air (nitrogen concentration, about 79% by volume; oxygen concentration, about 21% by volume) by an inert gas, especially preferably by nitrogen (nitrogen purging).

In the invention, at least one layer superposed on a transparent substrate is irradiated with an ionizing radiation in an atmosphere having an oxygen concentration of 3% by volume or lower and is held in the atmosphere with an oxygen concentration of 3% by volume or lower for a period of at least 0.5 seconds after initiation of the irradiation with an ionizing radiation. The period is preferably 0.7-60 seconds, more preferably 0.7-10 seconds. In case where the period is shorter than 0.5 seconds, the curing reaction cannot be completed and sufficient curing is impossible. On the other hand, to maintain low-oxygen conditions for a long time is undesirable because a larger apparatus is necessary and the inert gas should be used in a large amount.

In the invention, at least one layer superposed on a transparent substrate can be cured by irradiating the layer with an ionizing radiation two or more times. In this case, it is preferred that the ionizing-radiation irradiation be conducted at least twice in a continuous reaction chamber having an oxygen concentration not exceeding 20% by volume. By conducting the ionizing-radiation irradiation two or more times in the same reaction chamber having a low oxygen concentration, the reaction time necessary for the curing reaction can be effectively secured.

Especially when a higher production rate is used for heightening productivity, it is necessary to conduct the irradiation with an ionizing radiation two or more times for securing the energy of an ionizing radiation necessary for the curing reaction. The method described above is hence effective also from the standpoint of securing the reaction time necessary for the curing reaction.

The kind of the ionizing radiation to be used in the invention is not particularly limited. A suitable one can be selected from ultraviolet rays, electron beams, near ultraviolet rays, visible light, near infrared rays, infrared rays, X-rays, and the like according to the kind of the curable composition for film formation. Irradiation with ultraviolet rays is preferred in the invention. Curing with ultraviolet is preferred because a high polymerization rate is possible and a smaller apparatus is usable and because there is a wider choice of compounds and the irradiation is inexpensive.

In the case of ultraviolet rays, use can be made of an ultrahigh-pressure mercury lamp, high-pressure mercury lamp, low-pressure mercury lamp, carbon arc lamp, xenon arc lamp, metal halide lamp, or the like. In the case of electron beam irradiation, use may be made of electron beams having an energy of 50-1,000 keV emitted from any of various electron beam accelerators such as the Cockcroft-Walton type, van de Graaff type, resonance transformation type, insulated-core transformer type, linear type, dynatron type, and high frequency type.

EXAMPLES

The invention will be explained below in more detail by reference to Examples, but the invention should not be construed as being limited to the following Examples.

(Preparation of Sol Liquid a-1)

Into a 1,000-mL reactor equipped with a thermometer, nitrogen introduction tube, and dropping funnel were introduced 187 g (0.80 mol) of 3-acryloyloxypropyltrimethoxysitane, 27.2 g (0.20 mol) of methyltrimethoxysilane, 320 g (10 mol) of methanol, and 0.06 g (0.001 mol) of KF. At room temperature, 15.1 (0.86 mol) of water was gradually added thereto with stirring. After completion of the dropwise addition, the mixture was stirred at room temperature for 3 hours and then heated/stirred with methanol refluxing for 2 hours. Thereafter, low-boiling matters were distilled off and the residue was filtered. Thus, sol liquid a-1 was obtained in an amount of 120 g. The substance thus obtained was analyzed by GPC. As a result, the substance was found to have a mass-average molecular weight of 1,500. The proportion of components having a molecular weight of 1,000 in the components consisting of oligomers and higher-molecular components was found to be 30%.

It was further found from the results of $^1$H-NMR spectroscopy that the substance obtained had the structure represented by the following formula.

(Synthesis of Compound 1-4 Shown Hereinabove)

In 25 cm$^3$ of 2-butanone were dissolved 5.27 g of compound A and 2.97 g of 3-isocyanatopropyltriethoxysilane. Thereto was added 25 mg of di-n-butyltin diacetate. The resultant mixture was stirred with heating at 50° C. for 10 hours. Thereafter, the reaction mixture Was cooled to room temperature, filtered, and then dropped into 300 cm$^3$ of hexane. The crystals precipitated were taken out by vacuum filtration, washed with hexane, and then vacuum dried. Thus, a photo-radical generator containing a silane coupling group (compound No. 1-4) was obtained as an organosilane compound in an amount of 3.90 g.

$^1$H-NMR (DMSO-d$_6$): 0.60 (m, 2H), 1.17 (t, J=9.4 Hz, 9H), 1.55 (m, 2H), 3.07 (m, 2H), 3.77 (q, J=9.4 HZ, 6H), 7.29 (d, J=11.2 Hz, 2H), 7.92 (t, J=7.5 Hz, 1H), 8.03 (d, J=11.6 Hz, 2H), 8.13 (d, J=11.6 Hz, 2H), 8.58 (d, J=12.0 Hz, 2H), 10.76 (s, 1H).

Melting point: 177.2-180.0° C.

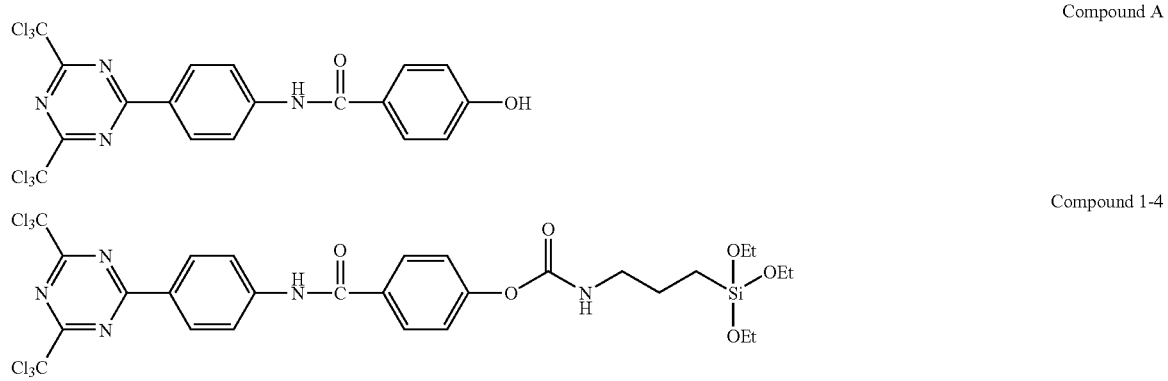

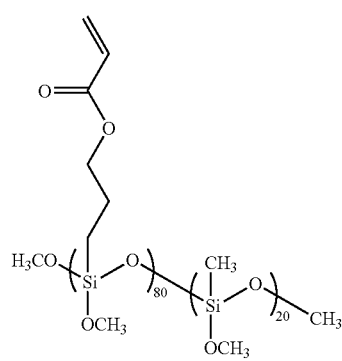

(80 and 20 mean molar proportions)

Analysis by $^{29}$Si-NMR spectroscopy revealed that the degree of condensation α was 0.56. It was found from the results that the structure of this silane coupling agent sol was mostly linear.

Furthermore, analysis by gas chromatography revealed that the percentage residual amount of the 3-acryloyloxypropyltrimethoxysilane used as a starting material was 5% or lower.

(Preparation of Sol Liquid b-1)

The same procedure as in the preparation of sol liquid a-1 was conducted, except that the 3-acryloyloxypropyltrimethoxysilane was replaced by compound 1-4 shown hereinabove. Thus, sol liquid b-1 was obtained.

(Preparation of Sol Liquid b-2)

The same procedure as in the preparation of sol liquid a-1 was conducted, except that the 3-acryloyloxypropyltrimethoxysilane was replaced by compound 3-3 shown hereinabove. Thus, sol liquid b-2 was obtained.

(Preparation of Sol Liquid b-3)

The same procedure as in the preparation of sol liquid a-1 was conducted, except that the 3-acryloyloxypropyltrimethoxysilane was replaced by compound 5-2 shown hereinabove. Thus, sol liquid b-3 was obtained.

| (Preparation of Coating solution A for Hard-Coat Layer Formation) | |
|---|---|
| DPHA | 150.0 g |
| Methyl ethyl ketone/cyclohexanone = 50/50 | 206.0 g |
| MEK-ST | 333.0 g |
| Irgacure 184 | 7.5 g |
| Methyl ethyl ketone | 49.0 g |

A liquid mixture composed of the ingredients shown above was filtered through a polypropylene filter having a pore diameter of 30 μm to prepare coating solution A for hard-coat layer formation.

(Preparation of Coating solution B for Hard-Coat Layer Formation)

| | |
|---|---:|
| Commercial silica-containing UV-curable hard coating solution DeSolite Z7526 | 347.0 g |
| Methyl ethyl ketone/cyclohexanone = 50/50 | 403.0 g |

A liquid mixture composed of the ingredients shown above was filtered through a polypropylene filter having a pore diameter of 30 μm to prepare coating solution B for hard-coat layer formation.

(Preparation of Coating solution C for Hard-Coat Layer Formation)

| | |
|---|---:|
| DPHA | 135.0 g |
| Methyl ethyl ketone/cyclohexanone = 50/50 | 196.0 g |
| MEK-ST | 300.0 g |
| Sol liquid a-1 | 25.0 g |
| Methyl ethyl ketone | 82.0 g |

A liquid mixture composed of the ingredients shown above was filtered through a polypropylene filter having a pore diameter of 30 μm to prepare coating solution C for hard-coat layer formation.

(Preparation of Coating solution D for Hard-Coat Layer Formation)

| | |
|---|---:|
| PETA | 50.0 g |
| Irgacure 184 | 2.0 g |
| SX-350 (30%) | 1.7 g |
| Crosslinked acrylic-styrene particles (30%) | 13.3 g |
| FP-132 | 0.75 g |
| KBM-5103 | 10.0 g |
| Toluene | 38.5 g |

A liquid mixture composed of the ingredients shown above was filtered through a polypropylene filter having a pore diameter of 30 μm to prepare coating solution D for hard-coat layer formation.

(Preparation of Coating solution E for Hard-Coat Layer Formation)

| | |
|---|---:|
| Commercial silica-containing UV-curable hard coating solution DeSolite Z7401 | 195.0 g |
| DPHA | 82.0 g |
| Sol liquid a-1 | 25.8 g |
| SX-350 (30%) | 1.7 g |
| Methyl ethyl ketone/cyclohexanone = 50/50 | 368.0 g |

A liquid mixture composed of the ingredients shown above was filtered through a polypropylene filter having a pore diameter of 30 μm to prepare coating solution E for hard-coat layer formation.

Compounds used above are shown below.

PETA: A pentaerythritol triacrylate/pentaerythritol tetraacrylate mixture (manufactured by Nippon Kayaku Co., Ltd.)

DPHA: A dipentaerythritol pentaacrylate/dipentaerythritol hexaacrylate mixture (manufactured by Nippon Kayaku Co., Ltd.)

Commercial silica-containing UV-curable hard coating solution DeSolite Z7526 (manufactured by JSR; solid concentration 72%; silica content 38%; average particle diameter, 20 nm)

MEK-ST (silica particles manufactured by Nissan Chemical Industries, Ltd.; average particle diameter, 15 nm)

Irgacure 184: Polymerization initiator (manufactured by Ciba Specialty Chemicals Co.)

SX-350: Particles of crosslinked polystyrene having an average particle diameter of 3.5 μm (refractive index, 1.60; manufactured by Soken Chemical & Engineering Co., Ltd.; 30% toluene dispersion; used after 20-minute dispersion treatment with disperser Polytron at 10,000 rpm)

Crosslinked acrylic-styrene particles: average particle diameter, 3.5 μm (refractive index, 1.55; manufactured by Soken Chemical & Engineering Co., Ltd.; 30% toluene dispersion)

"KBM-5103": Silane coupling agent; acryloyloxypropyltrimethoxysilane; manufactured by Shin-Etsu Chemical Co., Ltd.

FP-132: Fluorochemical surface modifier:

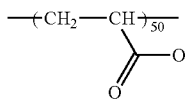 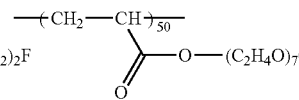

FP-132
Mw 15,000

| (Preparation of Coating solution F for Hard-Coat Layer Formation) | |
| --- | --- |
| PETA | 285.0 g |
| "Irgacure 184" | 15.0 g |
| Sol liquid (a-1) | 25.8 g |
| Aggregated silica | 1.7 g |
| (secondary-particle diameter, 1.0 μm; 30% by mass) | |
| Fluorochemical leveling agent R-30 | 0.5 g |
| Methyl isobutyl ketone | 175.0 g |

A liquid mixture composed of the ingredients shown above was filtered through a polypropylene filter having a pore diameter of 30 μm to prepare coating solution F for hard-coat layer formation.

| (Preparation of Coating solution G for Hard-Coat Layer Formation) | |
| --- | --- |
| PETA | 285 g |
| "Irgacure 184" | 15.0 g |
| Aggregated silica | 1.7 g |
| (secondary-particle diameter, 1.0 μm; 30% by mass) | |
| Fluorochemical leveling agent R-30 | 0.5 g |
| Methyl isobutyl ketone | 175.0 g |

A liquid mixture composed of the ingredients shown above was filtered through a polypropylene filter having a pore diameter of 30 μm to prepare coating solution G for hard-coat layer formation.

| (Preparation of Coating solution H for Hard-Coat Layer Formation) | |
| --- | --- |
| PETA | 285.0 g |
| "Irgacure 184" | 15.0 g |
| Sol liquid (a-1) | 25.8 g |
| Sol liquid (b-1) | 1.0 g |
| Aggregated silica | 1.7 g |
| (secondary-particle diameter, 1.0 μm; 30% by mass) | |
| Fluorochemical leveling agent R-30 | 0.5 g |
| Methyl isobutyl ketone | 175.0 g |

A liquid mixture composed of the ingredients shown above was filtered through a polypropylene filter having a pore diameter of 30 μm to prepare coating solution H for hard-coat layer formation.

Compounds used above are shown below.

Aggregated silica (secondary-particle diameter, 1.0 μm): manufactured by Nippon Silica Industrial Co., Ltd.

Fluorochemical leveling agent R-30: manufactured by Dainippon Ink & Chemicals, Inc. (commercial product)

| (Preparation of Coating solution A for Low-Refractive-Index Layer Formation) | |
| --- | --- |
| Heat-crosslinkable fluoropolymer JN-7228 | 177.0 g |
| MEK-ST (30.0%) | 15.2 g |
| Methyl ethyl ketone | 116.0 g |
| Cyclohexanone | 9.0 g |

A liquid mixture composed of the ingredients shown above was filtered through a polypropylene filter having a pore diameter of 1 μm to prepare coating solution A for low-refractive-index layer formation.

| (Preparation of Coating solution B for Low-Refractive-Index Layer Formation) | |
| --- | --- |
| Heat-crosslinkable fluoropolymer JN-7228 | 177.0 g |
| MEK-ST (30.0%) | 15.2 g |
| Sol liquid a-1 | 7.3 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution B for low-refractive-index layer formation.

| (Preparation of Coating solution C for Low-Refractive-Index Layer Formation) | |
| --- | --- |
| Heat-crosslinkable fluoropolymer JN-7228 | 177.0 g |
| MEK-ST (30.0%) | 15.2 g |
| Sol liquid a-1 | 7.3 g |
| Sol liquid b-1 | 0.4 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution C for low-refractive-index layer formation.

| (Preparation of Coating solution D for Low-Refractive-Index Layer Formation) | |
| --- | --- |
| Heat-crosslinkable fluoropolymer JN-7228 | 177.0 g |
| MEK-ST (30.0%) | 15.2 g |
| Sol liquid a-1 | 7.3 g |
| Sol liquid b-2 | 0.4 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution D for low-refractive-index layer formation.

(Preparation of Coating solution E for Low-Refractive-Index Layer Formation)

| | |
|---|---|
| Heat-crosslinkable fluoropolymer JTA-113 | 177.0 g |
| MEK-ST (30.0%) | 15.2 g |
| Sol liquid a-1 | 7.3 g |
| Sol liquid b-2 | 0.4 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution E for low-refractive-index layer formation.

(Preparation of Coating solution F for Low-Refractive-Index Layer Formation)

| | |
|---|---|
| Heat-crosslinkable fluoropolymer JN-7228 | 177.0 g |
| MEK-ST (30.0%) | 15.2 g |
| Sol liquid a-1 | 7.3 g |
| Sol liquid b-3 | 0.4 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution F for low-refractive-index layer formation.

(Preparation of Coating solution G for Low-Refractive-Index Layer Formation)

| | |
|---|---|
| Photocrosslinkable fluoropolymer P-3 (23.8%/MEK) | 9.0 g |
| RMS-033 | 3.3 g |
| MEK-ST (30.0%) | 7.34 g |
| MP-Triazine | 0.11 g |
| Sol liquid a-1 | 1.14 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution G for low-refractive-index layer formation.

(Preparation of Coating solution H for Low-Refractive-Index Layer Formation)

| | |
|---|---|
| Photocrosslinkable fluoropolymer P-3 (23.8%/MEK) | 9.0 g |
| RMS-033 | 3.3 g |
| MEK-ST (30.0%) | 7.34 g |
| MP-Triazine | 0.11 g |
| Sol liquid a-1 | 1.14 g |
| Sol liquid b-1 | 0.04 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution H for low-refractive-index layer formation.

(Preparation of Coating solution I for Low-Refractive-Index Layer Formation)

| | |
|---|---|
| Photocrosslinkable fluoropolymer P-3 (23.8%/MEK) | 9.0 g |
| RMS-033 | 3.3 g |
| Hollow-silica dispersion (18.0%) | 12.2 g |
| MP-Triazine | 0.11 g |
| Sol liquid a-1 | 1.14 g |
| Methyl ethyl ketone | 85.0 g |
| Cyclohexanone | 5.5 g |

A liquid mixture composed of the ingredients shown above was filtered through a polypropylene filter having a pore diameter of 1 μm to prepare coating solution I for low-refractive-index layer formation.

(Preparation of Coating solution J for Low-Refractive-Index Layer Formation)

| | |
|---|---|
| Photocrosslinkable fluoropolymer P-3 (23.8%/MEK) | 9.0 g |
| RMS-033 | 3.3 g |
| Hollow-silica dispersion (18.0%) | 12.2 g |
| MP-Triazine | 0.11 g |
| Sol liquid a-1 | 1.14 g |
| Sol liquid b-1 | 0.04 g |
| Methyl ethyl ketone | 85.0 g |
| Cyclohexanone | 5.5 g |

A liquid mixture composed of the ingredients shown above was filtered through a polypropylene filter having a pore diameter of 1 μm to prepare coating solution J for low-refractive-index layer formation.

(Preparation of Coating solution K for Low-Refractive-Index Layer Formation)

| | |
|---|---|
| Photocrosslinkable fluoropolymer P-3 (23.8%/MEK) | 9.0 g |
| RMS-033 | 3.3 g |
| Hollow-silica dispersion (18.0%) | 12.2 g |
| MP-Triazine | 0.11 g |
| Sol liquid a-1 | 1.14 g |
| Sol liquid b-2 | 0.04 g |
| Methyl ethyl ketone | 85.0 g |
| Cyclohexanone | 5.5 g |

A liquid mixture composed of the ingredients shown above was filtered through a polypropylene filter having a pore diameter of 1 μm to prepare coating solution K for low-refractive-index layer formation.

(Preparation of Coating solution L for Low-Refractive-Index Layer Formation)

| | |
|---|---|
| Heat-crosslinkable fluoropolymer JN-7228 | 177.0 g |
| Hollow-silica dispersion (18.0%) | 15.2 g |
| DPHA | 5.0 g |
| Sol liquid a-1 | 7.3 g |
| Sol liquid b-1 | 0.4 g |
| Methyl ethyl ketone | 90.0 g |
| Cyclohexanone | 9.0 g |

A liquid mixture composed of the ingredients shown above was filtered through a polypropylene filter having a pore diameter of 1 μm to prepare coating solution L for low-refractive-index layer formation.

Compounds used above are shown below.

JN-7228: Heat-crosslinkable fluoropolymer (refractive index, 1.42; solid concentration, 6%; manufactured by JSR Co., Ltd.)

JTA-113: Heat-crosslinkable fluoropolymer (refractive index, 1.44; solid concentration, 6%; manufactured by JSR Co., Ltd.)

P-3: The fluorine-containing copolymer P-3 described in JP-A-2004-45462 (weight-average molecular weight, about 50,000; solid concentration, 23.8%/MEK)

MEK-ST-L: Silica sol (silica; same as MBK-ST, except for particle size; average particle diameter, 45 nm; solid concentration 30%; manufactured by Nissan Chemical Industries, Ltd.)

Hollow-silica dispersion: CS-60 IPA (manufactured by Catalysts & Chemicals Industries Co., Ltd.); refractive index, 1.31; average particle diameter 60 nm; shell thickness, 10 nm; solid concentration, 18.2%

KBM-5103: Surface-modified hollow-silica sol (degree of surface modification, 30 wt % based on silica)

RMS-033: Reactive silicone (manufactured by Gelest Inc.)

MP-Triazine; Photopolymerization initiator (manufactured by Sanwa Chemical Co., Ltd.)

Example 1

Hard coat layers A to H and low-refractive-index layers A to L were formed through coating solution application in the manners shown below to obtain antireflection film samples. The combinations of layers superposed are as shown in Tables 1 and 2.

(1) Formation of Hard Coat Layer

A triacetyl cellulose film having a thickness of 80 μm (TD80V (trade name), manufactured by Fuji Photo Film Co., Ltd.) in a roll form was unwound. The coating solution for hard-coat layer formation was applied to the film with a doctor blade and a microgravure roll having a diameter of 50 mm and having a gravure pattern with a line density of 180 lines/inch and a depth of 40 μm, under the conditions of a gravure roll rotation speed of 30 rpm and a conveyance speed of 10 m/min. The coating layer formed was dried at 120° C. for 2 minutes and then cured by irradiating it with ultraviolet at an irradiance of 400 mW/cm² in an exposure dose of 110 mJ/cm² using a 160 W/cm air-cooled metal halide lamp (manufactured by Eyegraphics Co., Ltd.) with purging of nitrogen having an oxygen concentration of 0.1% or lower. Thus, a hard coat layer having a thickness of 0.6 μm was formed. The film coated was wound up.

(2) Formation of Low-Refractive-Index Layer: 1 (Heat Curing+Ionizing-Radiation Curing System)

The triacetyl cellulose film coated with the hard coat layer was unwound again. The coating solution for low-refractive-index layer formation was applied to the film with a doctor blade and a microgravure roll having a diameter of 50 mm and having a gravure pattern with a line density of 180 lines/inch and a depth of 40 μm, under the conditions of a gravure roll rotation speed of 30 rpm and a conveyance speed of 10 m/min. The coating layer formed was dried at 80° C. for 2 minutes and then heat-cured at 10° C. for 10 minutes. Furthermore, the coating layer was irradiated with ultraviolet in an exposure dose of 300 mJ/cm² using a 240 W/cm air-cooled metal halide lamp (manufactured by Eyegraphics Co., Ltd.) with nitrogen purging (oxygen concentration, 200 ppm or lower). Thus, a low-refractive-index layer having a thickness of 95 nm was formed. The film thus coated was wound up (samples Nos. 101-207).

TABLE 1

| Sample No. | Hard coat layer | Low-refractive-index layer | |
|---|---|---|---|
| 101 | A | A | Comparative Example |
| 102 | A | B | Comparative Example |
| 103 | A | C | Present invention |
| 104 | A | D | Present invention |
| 105 | A | E | Present invention |
| 106 | A | F | Present invention |
| 107 | A | L | Present invention |
| 201 | B | E | Present invention |
| 202 | C | E | Present invention |
| 203 | D | E | Present invention |
| 204 | E | E | Present invention |
| 205 | F | F | Present invention |
| 206 | G | F | Present invention |
| 207 | H | F | Present invention |

(3) Formation of Low-Refractive-Index Layer: 2 (Ionizing-Radiation Curing System)

The triacetyl cellulose film coated with the hard coat layer was unwound again. The coating solution for low-refractive-index layer formation was applied thereto with a die coater at a coating rate of 25 m/min. The coating layer formed was dried at 120° C. for 70 seconds and then irradiated with ultraviolet in an exposure dose of 400 mJ/cm² using a 240 W/cm air-cooled metal halide lamp (manufactured by Eyegraphics Co., Ltd.) with nitrogen purging (oxygen concentration, 200 ppm or lower). Thus, a low-refractive-index layer having a thickness of 95 nm was formed. The film thus coated was wound up (samples Nos. 301-503).

TABLE 2

| Sample No. | Hard coat layer | Low-refractive-index layer | |
|---|---|---|---|
| 301 | A | G | Comparative Example |
| 302 | A | H | Present invention |
| 303 | A | I | Comparative Example |
| 304 | A | J | Present invention |
| 305 | A | K | Present invention |
| 401 | D | G | Comparative Example |
| 402 | D | H | Present invention |
| 403 | D | I | Comparative Example |
| 404 | D | J | Present invention |
| 405 | D | K | Present invention |
| 501 | F | J | Present invention |

TABLE 2-continued

| Sample No. | Hard coat layer | Low-refractive-index layer | |
|---|---|---|---|
| 502 | G | J | Present invention |
| 503 | H | J | Present invention |

The films obtained were evaluated for the following items. The results obtained are shown in Tables 3 and 4.

[Mirror Reflectance]

Spectrophotometer V-550 (manufactured by Nippon Bunko K.K.) having adapter ARV-474 attached thereto was used. In a wavelength range of 380-780 nm, light was caused to strike at an incidence angle of 5° and mirror reflectances were measured at an emission angle of −5°. An average reflectance for the 450-650 nm range was calculated to evaluate antireflection properties.

[Pencil Hardness]

The pencil hardness evaluation as provided for in JIS K 5400 was conducted. The antireflection film was conditioned at a temperature of 25° C. and a humidity of 60% RH for 2 hours and then examined with test pencils of H to 5H as provided for in JIS S 6006 under a load of 500 g. The results were judged based on the following criteria, and the highest hardness at which the judgment was OK was taken as the rating.
 Zero or one scratch in n=5 evaluation: OK
 Two or more scratches in N=5 evaluation: NG

[Resistance to Rubbing with Steel Wool]

The antireflection film was rubbed by moving #0000 steel wool forward and backward 30 times thereon while applying a load of 1.96 N/cm² to the steel wool. The film surface was then examined for mars and evaluated in the following five grades.
 A: one which suffered no mars
 B: one which slightly suffered almost invisible mars
 C: one which suffered clearly visible mars
 D: one which considerably suffered clearly visible mars
 E: one which suffered film peeling

TABLE 3

| Sample No. | Reflectance (%) | Pencil hardness | Steel wool resistance | Remarks |
|---|---|---|---|---|
| 101 | 0.32 | 3H | D-C | Comparative Example |
| 102 | 0.32 | 3H | C-B | Comparative Example |
| 103 | 0.32 | 4H | A | Present invention |
| 104 | 0.32 | 4H | A | Present invention |
| 105 | 0.32 | 4H | A | Present invention |
| 106 | 0.32 | 4H | A | Present invention |
| *106-2 | 0.32 | 4H | A | Present invention |
| 201 | 0.32 | 4H | A | Present invention |
| 202 | 0.32 | 4H | A | Present invention |
| 203 | 0.32 | 3H | A | Present invention |
| 204 | 0.32 | 3H | A | Present invention |
| 205 | 0.32 | 3H | A | Present invention |
| 206 | 0.32 | 3H | A | Present invention |
| 207 | 0.32 | 3H | A | Present invention |

*106-2 was cured only by heat curing at 110° C. for 10 minutes and underwent no ultraviolet irradiation thereafter.

TABLE 4

| Sample No. | Reflectance (%) | Pencil hardness | Steel wool resistance | Remarks |
|---|---|---|---|---|
| 301 | 0.32 | 3H | C-B | Comparative Example |
| 302 | 0.32 | 4H | A | Present invention |
| 303 | 0.32 | 3H | C-B | Comparative Example |
| 304 | 0.32 | 4H | A | Present invention |
| 305 | 0.32 | 4H | A | Present invention |
| 401 | 0.32 | 3H | C-B | Comparative Example |
| 402 | 0.32 | 4H | A | Present invention |
| 403 | 0.32 | 3H | C-B | Comparative Example |
| 404 | 0.32 | 4H | A | Present invention |
| 405 | 0.32 | 3H | A | Present invention |
| 501 | 0.32 | 3H | A | Present invention |
| 502 | 0.32 | 3H | A | Present invention |
| 503 | 0.32 | 3H | A | Present invention |

It can be seen that when the sol liquids formed from organosilane compounds represented by formula (A) according to the invention are used, then the antireflection films obtained have excellent marring resistance while possessing sufficient antireflection performance. Furthermore, as apparent from the results for *106-2, the film samples obtained using compound 5-2 as an organosilane compound represented by formula (A) have excellent marring resistance. This is because in these samples, radical generation occurred even upon heating only, resulting in sufficient film curing.

Example 2

Samples 101-1 to 503-1 were produced in the same manners as for Samples 101 to 503 in Example 1, except that the ultraviolet exposure dose in the formation of a low-refractive-index layer was changed to those shown in Tables 5 and 6. These samples were subjected to the same evaluations.

The ultraviolet exposure dose was regulated by changing the amount of light emitted by the ultraviolet source or the speed of coating.

TABLE 5

| Sample No. | Ultraviolet exposure dose (mJ/cm$^2$) | Reflectance (%) | Pencil hardness | Steel wool resistance | Remarks |
|---|---|---|---|---|---|
| 101-1 | 150 | 0.32 | 3H | D | Comparative Example |
| 102-1 | 150 | 0.32 | 3H | D-C | Comparative Example |
| 103-1 | 150 | 0.32 | 4H | A | Present invention |
| 103-2 | 100 | 0.32 | 4H | A | Present invention |
| 104-1 | 150 | 0.32 | 4H | B-A | Present invention |
| 105-1 | 150 | 0.32 | 4H | B-A | Present invention |
| 106-1 | 150 | 0.32 | 4H | A | Present invention |
| 201-1 | 150 | 0.32 | 4H | A | Present invention |
| 202-1 | 150 | 0.32 | 4H | A | Present invention |
| 203-1 | 150 | 0.32 | 3H | A | Present invention |
| 204-1 | 150 | 0.32 | 3H | A | Present invention |
| 205-1 | 150 | 0.32 | 4H | A | Present invention |
| 206-1 | 150 | 0.32 | 4H | A | Present invention |
| 207-1 | 150 | 0.32 | 4H | A | Present invention |

TABLE 6

| Sample No. | Ultraviolet exposure dose (mJ/cm$^2$) | Reflectance (%) | Pencil hardness | Steel wool resistance | Remarks |
|---|---|---|---|---|---|
| 301-1 | 200 | 0.32 | 3H | D-C | Comparative Example |
| 302-1 | 200 | 0.32 | 4H | A | Present invention |
| 303-1 | 200 | 0.32 | 3H | D-C | Comparative Example |
| 304-1 | 200 | 0.32 | 4H | A | Present invention |
| 305-1 | 200 | 0.32 | 4H | A | Present invention |
| 401-1 | 200 | 0.32 | 3H | D-C | Comparative Example |
| 402-1 | 200 | 0.32 | 4H | A | Present invention |
| 403-1 | 200 | 0.32 | 3H | D-C | Comparative Example |
| 404-1 | 200 | 0.32 | 4H | A | Present invention |
| 405-1 | 200 | 0.32 | 3H | A | Present invention |
| 501-1 | 200 | 0.32 | 3H | A | Present invention |
| 502-1 | 200 | 0.32 | 3H | A | Present invention |
| 503-1 | 200 | 0.32 | 3H | A | Present invention |

It can be seen that use of the sol liquids formed from organosilane compounds represented by formula (A) according to the invention enabled the antireflection films produced through ultraviolet irradiation in an exposure dose reduced by half to retain marring resistance while possessing sufficient antireflection performance. It is apparent that the use of those sol liquids is advantageous also for high-rate production.

Example 3

(Production of Protective Films for Polarizing Plate)

A 1.5 mol/L aqueous solution of sodium hydroxide was prepared as a saponification liquid, and this solution was kept at 50° C. Furthermore, a 0.005 mmol/L dilute aqueous solution of sulfuric acid was prepared.

Each of the antireflection films produced in Examples 1 and 2 was subjected to a saponification treatment, in which that surface of the transparent substrate which was on the side opposite to the low-refractive-index layer according to the invention was saponified with the saponification liquid.

The aqueous sodium hydroxide solution remaining on the surface of the transparent substrate saponified was sufficiently washed away with water. Thereafter, the surface was rinsed with the dilute aqueous sulfuric acid solution, and the dilute aqueous sulfuric acid solution remaining on the surface was sufficiently washed away with water. This film was sufficiently dried at 100° C.

The saponified surface of the transparent substrate, i.e., that side of the antireflection film which was opposite to the low-refractive-index layer, was evaluated for contact angle with water. As a result, the contact angle was found to be 40° or smaller. Thus, protective films for polarizig plates were produced.

(Production of Polarizing Plates)

A poly(vinyl alcohol) film having a thickness of 75 μm (manufactured by Kuraray Co., Ltd.) was immersed for 5 minutes in an aqueous solution composed of 100 parts by mass of water, 7 parts by mass of iodine, and 105 parts by mass of potassium iodide to thereby adsorb iodine onto the film.

Subsequently, this film was uniaxially stretched in the machine direction in a stretch ratio of 4.4 in a 4% by mass aqueous solution of boric acid. Thereafter, the film was dried while maintaining the tensioned state. Thus, a polarizing film was produced.

Each of the antireflection films (protective films for polarizing plates) of the invention was bonded to one side of the polarizing film with a poly(vinyl alcohol)-based adhesive so that the saponified triacetyl cellulose side faced the polarizing film. Furthermore, a triacetyl cellulose film which had been saponified in the same manner as described above was bonded to the other side of the polarizing film with the same poly(vinyl alcohol)-based adhesive.

(Evaluation of Image Displays)

Transmission type, reflection type, or semi-transmission type liquid-crystal displays working in the TN, STN, IPS, VA, or OCB mode were produced in which the polarizing plates of the invention produced above had been attached so that the antireflection film constituted the outermost surface of the display. These displays had excellent antireflection performance and exceedingly high visibility. This effect was remarkable especially in the VA mode.

Example 4

(Production of Polarizing Plates)

An optical compensation film having an optical compensation layer (Wide View Film SA 12B, manufactured by Fuji Photo Film Co., Ltd.) was subjected to a saponification treatment, in which that surface of the film which was opposite to the optical compensation layer was saponified under the same conditions as in Example 3.

Each of the antireflection films (protective films for polarizing plates) produced in Examples 1 and 2 was bonded to one side of the polarizig film produced in Example 3 using a poly(vinyl alcohol)-based adhesive so that the saponified triacetyl cellulose side faced the polarizing film. Furthermore, the optical compensation film which had undergone the saponification treatment was bonded to the other side of the polarizing film with the same poly(vinyl alcohol)-based adhesive so that the triacetyl cellulose side faced the polarizing film.

(Evaluation of Image Displays)

Transmission type, reflection type, or semi-transmission type liquid-crystal displays working in the TN, STN, IPS, VA, or OCB mode were produced in which the polarizing plates of the invention produced above had been attached so that the antireflection film constituted the outermost surface of the display. Compared to liquid-crystal displays having attached thereto a polarizing plate employing no optical compensation film, the displays produced had better contract in a bright room and a far wider viewing angle in the vertical/horizontal directions. Furthermore, the displays according to the invention showed excellent antireflection performance and were highly excellent in visibility and image quality.

These effects were remarkable especially in the VA mode.

This application is based on Japanese Patent application JP 2005-234520, filed Aug. 12, 2005, the entire content of which is hereby incorporated by reference, the same as if set forth at length.

What is claimed is:

1. An optical film comprising a substrate and a layer, the layer comprising a cured object of a composition which comprises a polymerizable compound having an ethylenically unsaturated group, and at least one of: a hydrolyzate of at least one organosilane compound having a directly silicon-bonded hydroxyl or hydrolyzable group; or a partial condensate thereof, and further comprises a compound having a free-radical photopolymerization or heat polymerization initiator bonded to an organosilane wherein said free-radical photopolymerization initiator which is bonded to an organosilane comprises an acetophenone, benzoin, benzophenone, phosphine oxide, ketal, anthraquinone, thioxanthone, azo, peroxide, 2,3-dialkyldione, disulfide, fluoroamine, aromatic sulfonium or active halogen group, and wherein said free-radical heat polymerization initiator which is bonded to an organosilane comprises an organic or inorganic peroxide or an organic azo or diazo group.

2. A process for producing the optical film of claim 1, which comprises: applying a coating solution for forming the layer to a transparent substrate by die coating.

3. The process as claimed in claim 2, which further comprises: irradiating the applied solution with an ionizing radiation in an atmosphere having an oxygen concentration of 3% by volume or lower.

4. The process as claimed in claim 2, which further comprises: heat-curing the applied solution; and irradiating the cured solution with an ionizing radiation in an atmosphere having an oxygen concentration of 3% by volume or lower.

5. The optical film as claimed in claim 1, wherein the low-refractive-index layer comprises at least one inorganic filler selected from the group consisting of inorganic particles, hollow silica particles and magnesium fluoride.

6. The optical film as claimed in claim 5, wherein at least one of the inorganic particles and the hollow silica particles are surface-treated with an organosilane compound represented by the formula (A):

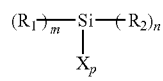

Formula (A)

wherein $R_1$ represents a substituted or unsubstituted alkyl or aryl group having a polymerization initiation site; $R_2$ represents a substituted or unsubstituted alkyl group or a substituted or unsubstituted alkyl group having a polymerizable group having an unsaturated bond; X represents a hydroxyl group or a hydrolyzable group; and m, n, and p represent an integer of from 1 to 3, an integer of from 0 to 2, and an integer of from 1 to 3, respectively, provided that a sum of m, n, and p is 4.

7. The optical film as claimed in claim 1, wherein the hard coat layer comprises an inorganic filler comprising an oxide of at least one member selected from the group consisting of zirconium, titanium, aluminum, indium, zinc, tin, antimony, and silicon.

8. The optical film as claimed in claim 1, wherein the low-refractive-index layer comprises at least one inorganic filler selected from the group consisting of inorganic particles, hollow silica particles and magnesium fluoride.

9. The optical film as claimed in claim 8, wherein at least one of the inorganic particles and the hollow silica particles are surface-treated with an organosilane compound represented by the formula (A):

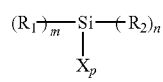

Formula (A)

wherein $R_1$ represents a substituted or unsubstituted alkyl or aryl group having a polymerization initiation site; $R_2$ represents a substituted or unsubstituted alkyl group or a substituted or unsubstituted alkyl group having a polymerizable group having an unsaturated bond; X represents a hydroxyl group or a hydrolyzable group; and m, n, and p represent an integer of from 1 to 3, an integer of from 0 to 2, and an integer of from 1 to 3, respectively, provided that a sum of m, n, and p is 4.

10. The optical film as claimed in claim 1, wherein the hard coat layer comprises an inorganic filler comprising an oxide of at least one member selected from the group consisting of zirconium, titanium, aluminum, indium, zinc, tin, antimony, and silicon.

11. An antireflection film comprising a substrate and at least one layer including an antireflection layer, wherein at least one of the at least one layer is a layer formed by curing, with at least one of a light and a heat energy, a composition which comprises a polymerizable compound having an ethylenically unsaturated group, and at least one of: a hydrolyzate of at least one organosilane compound having a directly silicon-bonded hydroxyl or hydrolyzable group; or a partial condensate thereof, and further comprises a compound having a free-radical photopolymerization or heat polymerization initiator bonded to an organosilane wherein said free-radical photopolymerization initiator which is bonded to an organosilane comprises an acetophenone, benzoin, benzophenone, phosphine oxide, ketal, anthraquinone, thioxanthone, azo, peroxide, 2,3-dialkyldione, disulfide, fluoroamine, aromatic sulfonium or active halogen group, and wherein said free-radical heat polymerization initiator which is bonded to an organosilane comprises an organic or inorganic peroxide or an organic azo or diazo group.

12. The antireflection film as claimed in claim 11, which comprises a transparent substrate, a hard coat layer and a low-refractive-index layer containing a binder polymer, wherein at least one of the hard coat layer and the low-refractive-index layer comprises a polymerizable compound having an ethylenically unsaturated group, and at least one of: a hydrolyzate of an organosilane compound having a directly silicon-bonded hydroxyl or hydrolyzable group, or a partial condensate thereof, and further comprises a hydrolyzate of an organosilane compound having a free-radical photopolymerization or heat polymerization initiator bonded to an organosilane.

13. The antireflection film as claimed in claim 12, wherein the low-refractive-index layer comprises at least one inorganic filler selected from the group consisting of inorganic particles, hollow silica particles and magnesium fluoride.

14. The antireflection film as claimed in claim 13, wherein at least one of the inorganic particles and the hollow silica particles are surface-treated with an organosilane compound represented by the formula (A):

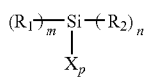

Formula (A)

wherein $R_1$ represents a substituted or unsubstituted alkyl or aryl group having a polymerization initiation site; $R_2$ represents a substituted or unsubstituted alkyl group or a substituted or unsubstituted alkyl group having a polymerizable group having an unsaturated bond; X represents a hydroxyl group or a hydrolyzable group; and m, n, and p represent an integer of from 1 to 3, an integer of from 0 to 2, and an integer of from 1 to 3, respectively, provided that a sum of m, n, and p is 4.

15. The antireflection film as claimed in claim 12, wherein the hard coat layer comprises an inorganic filler comprising an oxide of at least one member selected from the group consisting of zirconium, titanium, aluminum, indium, zinc, tin, antimony, and silicon.

16. The antireflection film as claimed in claim 12, wherein the binder polymer contained in the low-refractive-index layer is a heat-cured fluoropolymer, an ionizing-radiation-cured fluoropolymer, or a heat-cured and ionizing-radiation-cured fluoropolymer.

17. A process for producing the antireflection film of claim 12, which comprises: applying a coating solution for forming the hard coat layer and a coating solution for forming the low-refractive-index layer to a transparent substrate by die coating.

18. The process as claimed in claim 17, which further comprises: irradiating the applied solutions with an ionizing radiation in an atmosphere having an oxygen concentration of 3% by volume or lower.

19. The process as claimed in claim 17, which further comprises: heat-curing the applied solutions; and irradiating the cured solutions with an ionizing radiation in an atmosphere having an oxygen concentration of 3% by volume or lower.

20. A display comprising the antireflection film of claim 12, wherein the low-refractive-index layer is provided at a viewing side.

21. A polarizing plate comprising two protective films and a polarizing film provided between the two protective films, wherein at least one of the protective films comprises the antireflection film of claim 11.

* * * * *